(12) United States Patent
Takahashi

(10) Patent No.: US 11,976,233 B2
(45) Date of Patent: *May 7, 2024

(54) COMPOSITION, FILM, LAMINATE, AND DISPLAY DEVICE

(71) Applicant: Sumitomo Chemical Company, Limited, Tokyo (JP)

(72) Inventor: Keisuke Takahashi, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/629,086

(22) PCT Filed: Jun. 22, 2020

(86) PCT No.: PCT/JP2020/024359
§ 371 (c)(1),
(2) Date: Jan. 21, 2022

(87) PCT Pub. No.: WO2021/014856
PCT Pub. Date: Jan. 28, 2021

(65) Prior Publication Data
US 2022/0251451 A1    Aug. 11, 2022

(30) Foreign Application Priority Data

Jul. 23, 2019 (JP) ................ 2019-135645
Oct. 4, 2019 (JP) ................ 2019-184113

(51) Int. Cl.
| | |
|---|---|
| C09K 19/60 | (2006.01) |
| C09B 29/08 | (2006.01) |
| C09K 19/38 | (2006.01) |
| G02B 5/30 | (2006.01) |

(52) U.S. Cl.
CPC ........ C09K 19/601 (2013.01); C09B 29/0846 (2013.01); C09K 19/3857 (2013.01); G02B 5/3016 (2013.01)

(58) Field of Classification Search
CPC .................................... C09K 19/38
See application file for complete search history.

(56) References Cited

U.S. PATENT DOCUMENTS

| | | |
|---|---|---|
| 2007/0024970 A1 | 2/2007 | Lub et al. |
| 2010/0267858 A1 | 10/2010 | Lub et al. |
| 2016/0274274 A1 | 9/2016 | Yoo et al. |

FOREIGN PATENT DOCUMENTS

| | | | | |
|---|---|---|---|---|
| CN | 106833680 A | | 6/2017 | |
| JP | 10088142 A | * | 4/1998 | |
| JP | H1088142 A | | 4/1998 | |
| JP | 11012242 A | * | 1/1999 | |
| JP | H1112242 A | | 1/1999 | |
| JP | 2007510946 A | | 4/2007 | |
| JP | 2011236178 A | * | 11/2011 | |
| JP | 2011236178 A | | 11/2011 | |
| JP | 2013037353 A | | 2/2013 | |
| JP | 2013227531 A | * | 11/2013 | ......... C09B 29/0059 |
| JP | 2013227531 A | | 11/2013 | |
| JP | 2017504050 A | | 2/2017 | |
| JP | 2021017540 A | | 2/2021 | |
| JP | 2021018406 A | | 2/2021 | |
| WO | 2018127245 A1 | | 7/2018 | |

* cited by examiner

*Primary Examiner* — Chanceity N Robinson
(74) *Attorney, Agent, or Firm* — Panitch Schwarze Belisario & Nadel LLP

(57) ABSTRACT

A composition contains a compound of formula (1), and a polymerizable liquid crystal compound or a liquid crystalline polymer compound. n represents 1 or 2; $Ar^1$, $Ar^2$, and $Ar^3$ each represent a 1,4-phenylene group or a divalent sulfur-containing aromatic heterocyclic group; At least one of $Ar^1$ and $Ar^2$ has a fluorine atom; $R^1$ represents a single bond or a group selected from —OC(=O)—, —C(=O)O—, —C≡C—, —CH=CH—, —CH=N—, —N=N—, and —N=CH—; $R^2$ represents an alkylamino group or an alkoxy group; $R^3$ represents a group selected from an alkanediyl group, an alkanediyloxy group, an alkanediyloxycarbonyl group, and an alkanediylcarbonyloxy group; and $R^4$ represents a polymerizable group or a hydrogen atom.

$$R^4—R^3—Ar^1—(—R^1—Ar^2—)_n—N=N—Ar^3—R^2 \quad (1)$$

8 Claims, No Drawings

COMPOSITION, FILM, LAMINATE, AND DISPLAY DEVICE

CROSS-REFERENCE TO RELATED APPLICATIONS

This application is a Section 371 of International Application No. PCT/JP2020/024359, filed Jun. 22, 2020, which was published in the Japanese language on Jan. 28, 2021, under International Publication No. WO 2021/014856 A1, which claims priority under 35 U.S.C. § 119(b) to Japanese Application No. 2019-135645, filed Jul. 23, 2019 and Japanese Application No. 2019-184113, filed Oct. 4, 2019, the disclosure of each of which is incorporated herein by reference in its entirety.

TECHNICAL FIELD

The present invention relates to a composition, a film, a laminate, and a display device.

BACKGROUND ART

There is a continuous demand for reducing the thickness of a display such as an image display panel. There is also a demand for further reducing the thickness of a polarizing plate, a polarizer, or the like as one of constituent elements of the display. In response to such a demand, for example, a thin host-guest type polarizer including a polarizing film containing a polymerizable liquid crystal compound and a dichroic dye compound has been proposed (see, for example, Patent Documents 1 and 2).

PRIOR ART DOCUMENTS

Patent Documents

Patent Document 1: JP-A-2007-510946
Patent Document 2: JP-A-2013-37353

SUMMARY OF THE INVENTION

Problems to be Solved by the Invention

However, when ultraviolet (UV) exposure is used in a process for producing a polarizing film constituting a polarizing plate, a dichroic ratio (DR) of a polarizing plate to be obtained may be reduced.

An object of the present invention is to provide a composition capable of suppressing a decrease in a dichroic ratio of a polarizing plate to be produced.

Means for Solving the Problems

The present invention provides the following [1] to [10].

[1] A composition comprising: a compound represented by the following formula (1) and having a maximum absorption wavelength in a range of 420 nm or more and 520 nm or less; and at least one of a polymerizable liquid crystal compound and a liquid crystalline polymer compound:

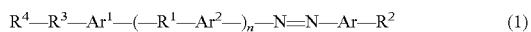
(1)

wherein n is an integer of 1 or 2;
$Ar^1$, $Ar^2$, and $Ar^3$ each independently represent a 1,4-phenylene group optionally having a substituent or a divalent sulfur-containing aromatic heterocyclic group optionally having a substituent, and at least one of $Ar^1$ and $Ar^2$ has a fluorine atom as a substituent; $R^1$ represents a single bond or at least one group selected from the group consisting of —OC(=O)—, —C(=O)O—, —C≡C—, —CH=CH—, —CH=N—, —N=N—, and —N=CH—;

$R^2$ represents an alkylamino group optionally having a polymerizable group or an alkoxy group optionally having a polymerizable group;

$R^3$ represents at least one group selected from the group consisting of an alkanediyl group having 4 to 20 carbon atoms, an alkanediyloxy group having 2 to 20 carbon atoms, an alkanediyloxycarbonyl group having 2 to 20 carbon atoms, and an alkanediylcarbonyloxy group having 2 to 20 carbon atoms;

$R^4$ represents a polymerizable group or a hydrogen atom; and when n is 2, two $R^1$s may be the same as or different from each other, and two $Ar^2$s may be the same as or different from each other.

[2] The composition according to [1], wherein the polymerizable liquid crystal compound and the liquid crystalline polymer compound are a polymerizable smectic liquid crystal compound and a smectic liquid crystalline polymer compound, respectively.

[3] The composition according to [1] or [2], wherein the polymerizable liquid crystal compound is a compound represented by the following formula (A):

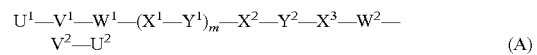
(A)

wherein m is an integer of 1 to 3;
$X^1$, $X^2$, and $X^3$ each independently represent a divalent aromatic group or a divalent alicyclic hydrocarbon group; when m is 2 or 3, a plurality of $X^1$s may be the same as or different from each other; at least three selected from the group consisting of $X^1$, $X^2$, and $X^3$ each represent a divalent hydrocarbon six-membered ring group;

$Y^1$, $Y^2$, $W^1$, and $W^2$ each independently represent a single bond or a divalent linking group;

when m is 2 or 3, a plurality of $Y^1$s may be the same as or different from each other;

$V^1$ and $V^2$ each independently represent an alkanediyl group having 1 to 20 carbon atoms and optionally having a substituent; at least one of —CH$_2$-s constituting the alkanediyl group may be substituted with —O—, —CO—, —S—, or —NH—; and $U^1$ and $U^2$ each independently represent a polymerizable group or a hydrogen atom, and at least one of $U^1$ and $U^2$ represents a polymerizable group.

[4] The composition according to any one of [1] to [3], wherein at least one of $Ar^3$ and $Ar^2$ has 1 to 4 fluorine atoms as a substituent in the formula (1).

[5] The composition according to any one of [1] to [4], wherein at least one of $Ar^1$ and $Ar^2$ has one or two fluorine atoms as a substituent in the formula (1).

[6] The composition according to any one of [1] to [5], wherein n is 1 in the formula (1).

[7] The composition according to any one of [1] to [6], wherein the polymerizable group is a radically polymerizable group.

[8] A film comprising the composition according to any one of [1] to [7] as a forming material.

[9] A laminate comprising the film according to [8].

[10] A display device comprising the laminate according to [9].

Effect of the Invention

The present invention can provide a composition capable of suppressing a decrease in a dichroic ratio of a polarizing plate to be produced.

Node for Carrying Out the Invention

In the present specification, the term "step" includes not only an independent step but also a step that cannot be clearly distinguished from other steps as long as an intended purpose of the step is achieved. In addition, when a plurality of substances corresponding to each component is present in a composition, the content of each component in the composition means the total amount of the plurality of substances present in the composition unless otherwise specified. Hereinafter, an embodiment of the present invention will be described in detail. Note that the scope of the present invention is not limited to the embodiment described here, and various modifications can be made without departing from the gist of the present invention.

<Composition>

A composition according to the present embodiment contains a compound represented by the following formula (1) and having a maximum absorption wavelength in a range of 420 nm or more and 520 nm or less, and a polymerizable liquid crystal compound. The composition is used, for example, as a material for forming a polarizing film. That is, the composition may be a composition for forming a polarizing film. A polarizing plate having a polarizing film obtained using the composition as a forming material can effectively suppress a decrease in a dichroic ratio of a polarizing plate derived from a production process.

Compound represented by formula (1)

The composition contains at least one compound represented by the following formula (1). The compound represented by formula (1) has an absorption maximum wavelength ($\lambda_{MAX}$) in a range of 420 nm or more and 520 nm or less, and is used, for example, as a dye compound in the composition.

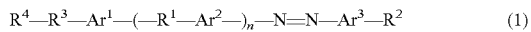

$$R^4—R^3—Ar^1—(—R^1—Ar^2—)_n—N=N—Ar^3—R^2 \quad (1)$$

In formula (1), n is an integer of 1 or 2, and n is preferably 1. The geometric isomerism of the azo group in formula (1) may be either cis or trans, but is preferably trans. In addition, the number of azo groups can be 1 to 3 depending on n, but may be 1, 2, or 3.

$Ar^1$, $Ar^2$, and $Ar^3$ in formula (1) each independently represent a 1,4-phenylene group optionally having a substituent or a divalent sulfur-containing aromatic heterocyclic group optionally having a substituent, and at least one of $Ar^1$ and $Ar^2$ has a fluorine atom as a substituent.

Examples of the substituent in $Ar^1$, $Ar^2$, and $Ar^3$ include an alkyl group having 1 to 10 carbon atoms, such as a methyl group, an ethyl group, or a butyl group; an alkoxy group having 1 to 10 carbon atoms, such as a methoxy group, an ethoxy group, or a butoxy group; a fluorinated alkyl group having 1 to 10 carbon atoms, such as a trifluoromethyl group; a cyano group; a nitro group; a halogen atom such as a chlorine atom or a fluorine atom; and a substituted or unsubstituted amino group such as an amino group, a diethylamino group, or a pyrrolidino group. Here, the substituted amino group means an amino group having one or two alkyl groups each having 1 to 10 carbon atoms on a nitrogen atom, or an amino group in which two alkyl groups on a nitrogen atom are bonded to each other to form an alkanediyl group having 2 to 8 carbon atoms. In addition, the unsubstituted amino group is —NH$_2$. Examples of the alkyl group having 1 to 10 carbon atoms include a methyl group, an ethyl group, and a hexyl group. Examples of the alkanediyl group having 2 to 8 carbon atoms include an ethylene group, a propane-1,3-diyl group, a butane-1,3-diyl group, a butane-1,4-diyl group, a pentane-1,5-diyl group, a hexane-1,6-diyl group, a heptane-1,7-diyl group, and an octane-1,8-diyl group.

In the compound according to the present embodiment, at least one of $Ar^1$ and $Ar^2$ has a fluorine atom as a substituent, and either one of $Ar^1$ and $Ar^2$ preferably has a fluorine atom as a substituent. The total number of fluorine atoms included in $Ar^1$ and $Ar^2$ is preferably 1 or more and 4 or less, more preferably 1 or 2, and still more preferably 1. Either one of $Ar^1$ and $Ar^2$ preferably has one or more and four or less fluorine atoms, more preferably has one or two fluorine atoms, and still more preferably has one fluorine atom.

The compound represented by formula (1) can exhibit excellent ultraviolet durability because at least one of $Ar^1$ and $Ar^2$ has a fluorine atom as a substituent. As a result, in a process for producing a polarizing plate including a polarizing film formed from a composition containing the compound represented by formula (1), a decrease in a dichroic ratio of a polarizing plate to be produced is suppressed even when ultraviolet exposure is used, limitations on the production process can be relaxed, and a range of options of the production process can be widened.

As a substituent other than the fluorine atom included in $Ar^1$, $Ar^2$, and $Ar^3$, a methyl group or a methoxy group is preferable. This makes it easier for the compound represented by formula (1) to be included in a highly ordered liquid crystal structure such as a smectic liquid crystal. In addition, the number of substituents other than a fluorine atom included in $Ar^1$, $Ar^2$, and $Ar^3$ is preferably one or two. This makes it easier for the compound represented by formula (1) to be included in a highly ordered liquid crystal structure such as a smectic liquid crystal.

In addition, when n is 1, at least two of $Ar^1$, $Ar^2$, and $Ar^3$ are preferably 1,4-phenylene groups in that the compound represented by formula (1) has both convenience in molecular synthesis and high performance.

Examples of the divalent sulfur-containing aromatic heterocyclic group in $Ar^1$, $Ar^2$, and $Ar^3$ include a group formed by removing two hydrogen atoms from a sulfur-containing aromatic heterocyclic compound selected from the group consisting of thiophene, benzothiophene, dibenzothiophene, benzodithiophene, thienofuran, thienothiophene, furothiazole, thienothiazole, and benzothiazole.

When the compound according to the present embodiment has a structure in which a divalent sulfur-containing aromatic heterocyclic group and a 1,4-phenylene group are directly bonded to each other, a dichroic ratio of a film containing the compound is improved.

$R^1$ represents a single bond or at least one linking group selected from, the group consisting of —OC(=O)—, —C(=O)O—, —C≡C—, —CH=CH—, —CH=N—, —N=N—, and —N=CH—. When there is a plurality of $R^1$s, $R^1$s may be the same as or different from each other. $R^1$ is preferably at least one selected from the group consisting of a single bond, —OC(=O)—, —C(=O)O—, and —N=N—, and more preferably a single bond or —N=N—.

$R^2$ represents an alkylamino group optionally having a polymerizable group or an alkoxy group optionally having a polymerizable group. As the polymerizable group in $R^2$, a radically polymerizable group is preferable, and examples of the radically polymerizable group include a radically polymerizable group such as a (meth)acrylate group ((meth)acryloyloxy group) or a styryl group (vinylphenyl group). Among these groups, a (meth)acrylate group is preferable. When $R^2$ has a polymerizable group, the number of the polymerizable groups is, for example, 1 or 2, and preferably 1.

Examples of the alkylamino group in $R^2$ include an amino group having one or two alkyl groups each having 1 to 10 carbon atoms on a nitrogen atom, and a cyclic amino group in which two alkyl groups on a nitrogen atom are bonded to each other to form an alkanediyl group having 2 to 8 carbon atoms. Specific examples of the alkylamino group in $R^2$ include a methylamino group, an ethylamino group, a dimethylamino group, a diethylamino group, a dipropylamino group, a methylethylamino group, a methylhexylamino group, a pyrrolidino group, a piperidino group, and a morpholino group. The alkylamino group in $R^2$ is preferably at least one selected from the group consisting of a dimethylamino group, a diethylamino group, a diisopropylamino group, a methylethylamino group, and a methylhexylamino group.

Examples of the alkoxy group in $R^2$ include an alkoxy group having 1 to 10 carbon atoms. Specific examples of the alkoxy group in $R^2$ include a methoxy group, an ethoxy group, a propyloxy group, a butyloxy group, a pentyloxy group, a hexyloxy group, a cyclopentyloxy group, and a cyclohexyloxy group. The alkoxy group in $R^2$ is preferably at least one selected from the group consisting of an ethoxy group and a propyloxy group.

$R^3$ in formula (1) represents at least one divalent group selected from the group consisting of an alkanediyl group having 4 to 20 carbon atoms, an alkanediyloxy group having 2 to 20 carbon atoms, an alkanediyloxycarbonyl group having 2 to 20 carbon atoms, and an alkanediylcarbonyloxy group having 2 to 20 carbon atoms.

Examples of the alkanediyl group having 4 to 20 carbon atoms include an alkanediyl group formed by removing one hydrogen atom from an unsubstituted (not having a substituent) linear or branched alkyl group having 4 to 20 carbon atoms, such as a n-butyl group, an isobutyl group, tert-butyl group, a n-pentyl group, an isopentyl group, a neopentyl group, a n-hexyl group, a n-heptyl group, a n-octyl group, a n-nonyl group, or a n-decyl group. The number of carbon atoms in the alkanediyl group is preferably 4 to 16, and more preferably 4 to 12.

One or more hydrogen atoms constituting the alkyl group having 4 to 20 carbon atoms may be substituted with a halogen atom (for example, a fluorine atom), a hydroxy group, an amino group, or a substituted amino group. Here, examples of the substituted amino group include an amino group substituted with one or two alkyl groups each having 1 to 20 carbon atoms, such as an N-methylamino group, an N-ethylamino group, an N,N-dimethylamino group, or an N,N-diethylamino group. Examples of the alkyl group in which one or more hydrogen atoms are substituted with a halogen atom, a hydroxy group, an amino group, or the like include: a haloalkyl group having 4 to 20 carbon atoms, such as a fluorobutyl group or an octafluorobutyl group; a hydroxyalkyl group having 4 to 20 carbon atoms, such as a hydroxybutyl group, a hydroxypentyl group, or a hydroxyhexyl group; and an alkyl group having 4 to 20 carbon atoms and having an unsubstituted amino group or a substituted amino group, such as an aminobutyl group or a 2-(N,N-dimethylamino) butyl group.

—O— or —NR*— may be inserted between carbon atoms constituting the alkyl group. Here, R* represents a hydrogen atom or an alkyl group having 1 to 6 carbon atoms, preferably 1 to 4 carbon atoms, and examples of the alkyl group having 1 to 6 carbon atoms include a methyl group, an ethyl group, a butyl group, and a hexyl group. Examples of the alkyl group having —O— or —NR*— inserted between carbon atoms include a 2-ethoxyethyl group, a 2-(2-ethoxyethoxy) ethyl group, and a 2-[2-(ethylamino) ethyl) amino] ethyl group.

Examples of the alkanediyloxy group having 2 to 20 carbon atoms include an alkanediyloxy group formed by removing one hydrogen atom from an unsubstituted linear or branched alkoxy group having 2 to 20 carbon atoms, such as an ethoxy group, a n-propoxy group, an isopropyloxy group, a n-butoxy group, an isobutyloxy group, a tert-butoxy group, a n-pentyloxy group, an isopentyloxy group, a neopentyloxy group, a n-hexyloxy group, a n-heptyloxy group, a n-octyloxy group, a n-nonyloxy group, or a n-decyloxy group. The number of carbon atoms in the alkanediyloxy group is preferably 2 to 16, and more preferably 2 to 12.

One or more hydrogen atoms constituting the alkoxy group having 2 to 20 carbon atoms may be substituted with a halogen atom (for example, a fluorine atom), a hydroxy group, an amino group, or an amino group having a substituent. The amino group having a substituent is similar to that described above. Examples of the alkoxy group in which one or more hydrogen atoms are substituted with a halogen atom, hydroxy, an amino group, or the like include: a haloalkoxy group having 2 to 20 carbon atom, such as a tetrafluoroethoxy group or an octafluorobutoxy group; a hydroxyalkoxy group having 2 to 20 carbon atoms, such as a 2-hydroxyethoxy group; and an alkoxy group having 2 to 20 carbon atoms and having an unsubstituted or substituted amino group, such as an aminoethoxy group or a 2-(N,N-dimethylamino) ethoxy group.

—O— or —NR*— may be inserted between carbon atoms constituting the alkoxy group. Examples of the alkoxy group in which —O— or —NR*— is inserted between carbon atoms include a methoxymethoxy group, a 2-ethoxyethoxy group, and a 2-(2-ethoxyethoxy) group. Note that R* is as described above.

Examples of the alkanediyloxycarbonyl group having 2 to 20 carbon atoms include an alkanediyloxycarbonyl group formed by removing one hydrogen atom from an unsubstituted alkoxycarbonyl group having 2 to 20 carbon atoms, such as a methoxycarbonyl group, an ethoxycarbonyl group, a n-propoxycarbonyl group, an isopropoxycarbonyl group, a n-butoxycarbonyl group, an isobutoxycarbonyl group, a tert-butoxycarbonyl group, a n-pentyloxycarbonyl group, an isopentyloxycarbonyl group, a neopentyloxycarbonyl group, a n-hexyloxycarbonyl group, a n-heptyloxycarbonyl group, a n-octyloxycarbonyl group, a n-nonyloxycarbonyl group, or a n-decyloxycarbonyl group. The number of carbon atoms in the alkanediyl moiety of the alkanediyloxycarbonyl group is preferably 1 to 16, and more preferably 1 to 12.

One or more hydrogen atoms constituting the alkoxycarbonyl group having 2 to 20 carbon atoms may be substituted with a halogen atom (for example, a fluorine atom), a hydroxy group, an amino group, or an amino group having a substituent. The amino group having a substituent is similar to that described above. Examples of the alkoxycarbonyl group in which one or more hydrogen atoms are substituted with a halogen atom, a hydroxy group, an amino group, or the like include a haloalkoxycarbonyl group having 2 to 20 carbon atoms, such as a fluoroethoxycarbonyl group, a trifluoroethoxycarbonyl group, a tetrafluoroethoxycarbonyl group, or an octafluorobutoxycarbonyl group.

Examples of the alkanediylcarbonyloxy group having 2 to 20 carbon atoms include an alkanediylcarbonyloxy group formed by removing one hydrogen atom from an unsubstituted alkanoyloxy group having 2 to 20 carbon atoms, such as an acetyloxy group, an ethylcarbonyloxy group, a n-propylcarbonyloxy group, an isopropylcarbonyloxy group, a n-butylcarbonyloxy group, an isobutylcarbonyloxy group, a tert-butylcarbonyloxy group, a n-pentylcarbonyloxy group, an isopentylcarbonyloxy group, a neopentylcarbonyloxy group, a n-hexylcarbonyloxy group, a n-heptylcarbonyloxy group, a n-octylcarbonyloxy group, a n-nonylcarbonyloxy group, or a n-decylcarbonyloxy group. The number of carbon atoms in the alkanediyl moiety of the alkanediylcarbonyloxy group is preferably 1 to 16, and more preferably 1 to 12.

One or more hydrogen atoms constituting the alkanoyloxy group having 2 to 20 carbon atoms may be substituted with a halogen atom (for example, a fluorine atom), a hydroxy group, an amino group, or an amino group having a substituent. The amino group having a substituent is similar to that described above. Examples of the alkanoyloxy group in which one or more hydrogen atoms are substituted with a halogen atom, a hydroxy group, or the like include a haloacyloxy group having 2 to 20 carbon atoms, such as a tetrafluoroethylcarbonyloxy group or an octafluorobutylcarbonyloxy group.

$R^4$ in formula (1) represents a polymerizable group or a hydrogen atom. As the polymerizable group in $R^4$, a radically polymerizable group is preferable, and examples of the radically polymerizable group include a (meth)acrylate group and a styryl group. Among these groups, a (meth)acrylate group is preferable.

Specific examples of the compound represented by formula (1) include the following compounds represented by formulae (2-2) to (2-192) below, but the present invention is not limited thereto.

[Chemical formula 1]

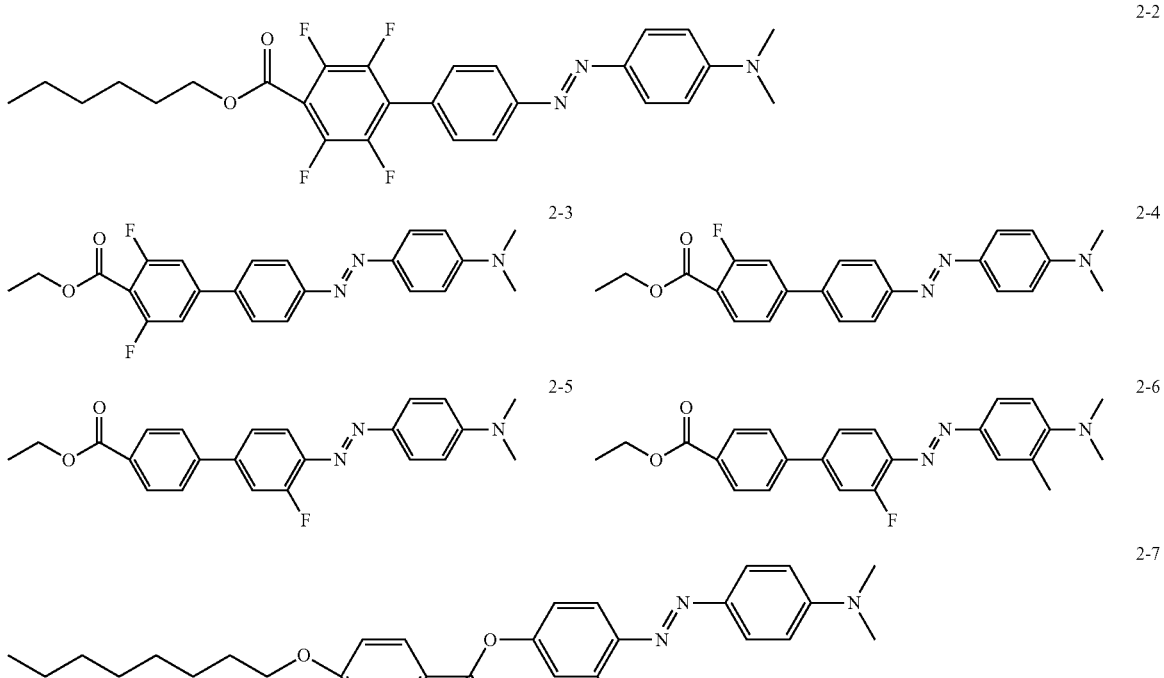

[Chemical formula 2]

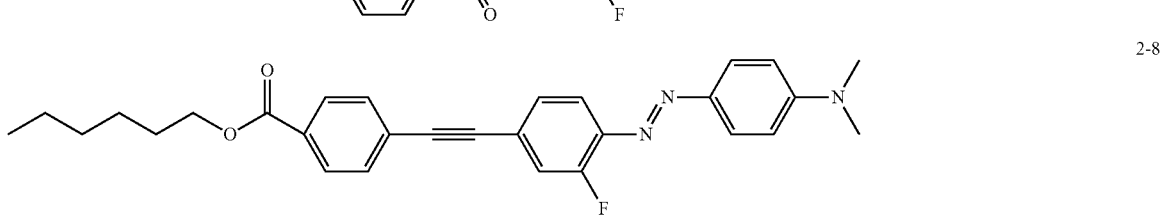

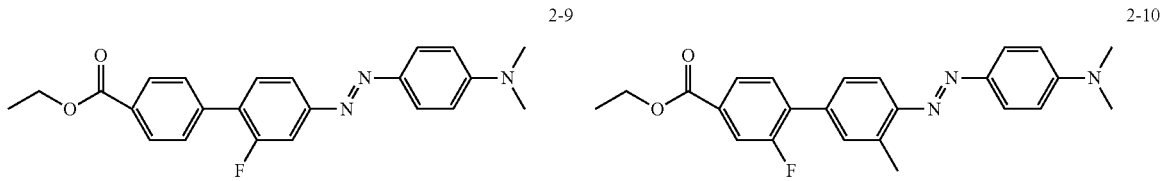

-continued
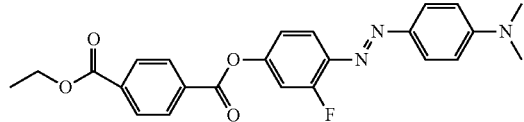
2-11
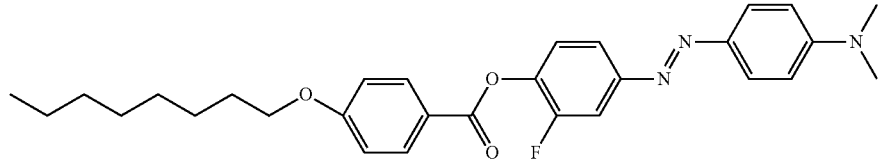
2-12
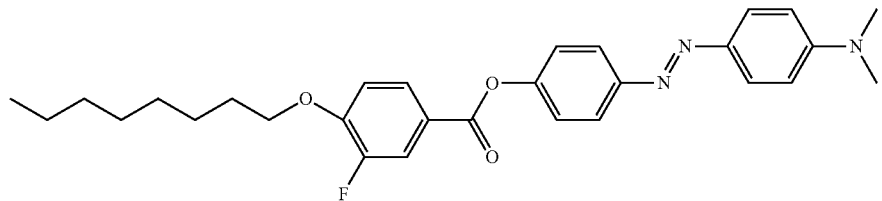
2-13
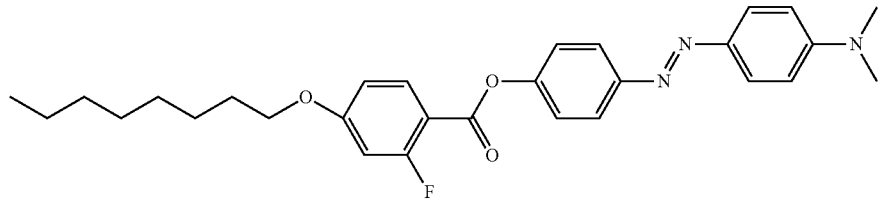
2-14
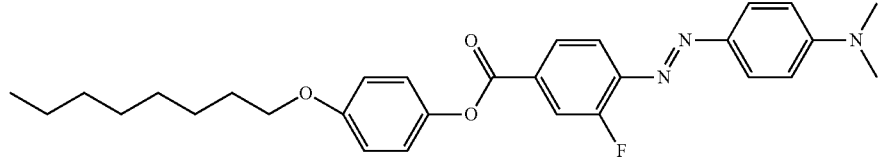
2-15
[Chemical formula 3]
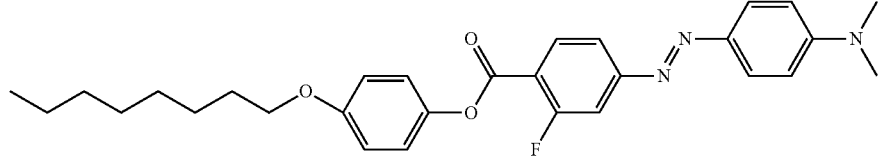
2-16
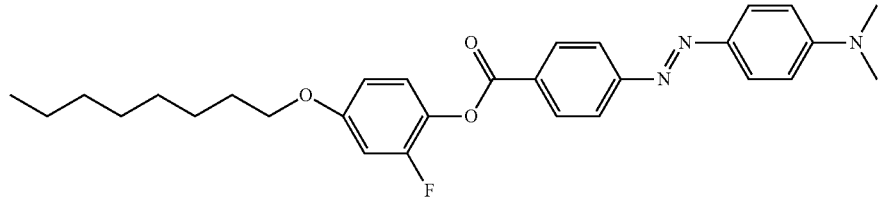
2-17
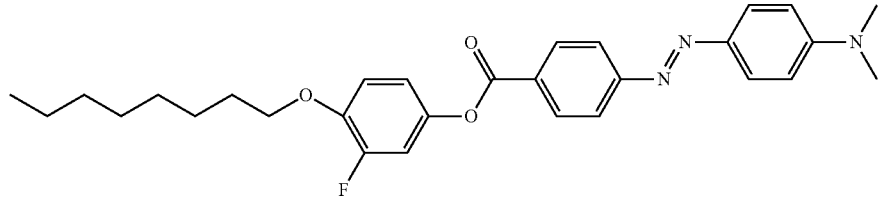
2-18

-continued
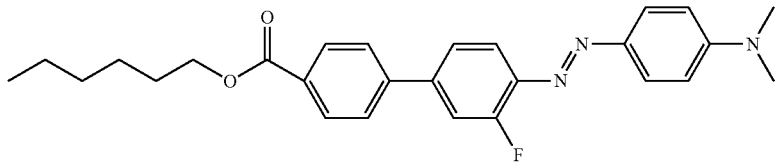
2-19
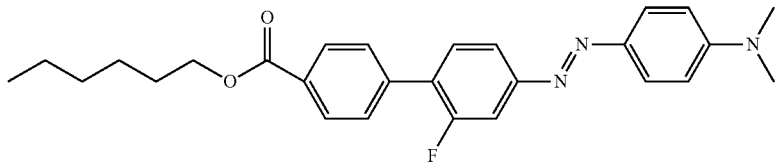
2-20
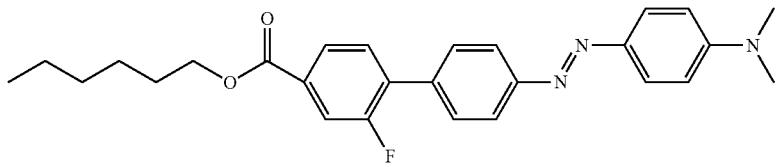
2-21
[Chemical formula 4]
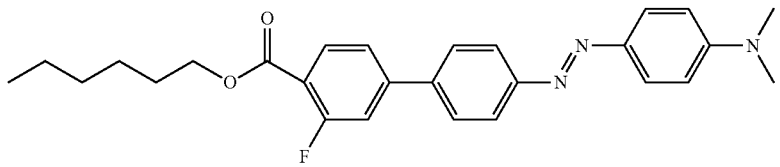
2-22
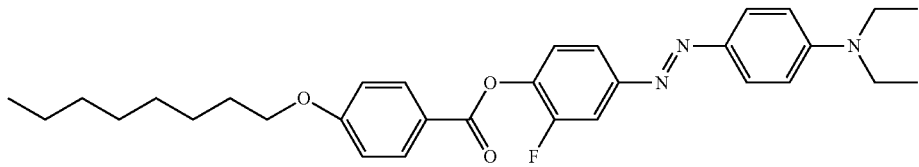
2-23
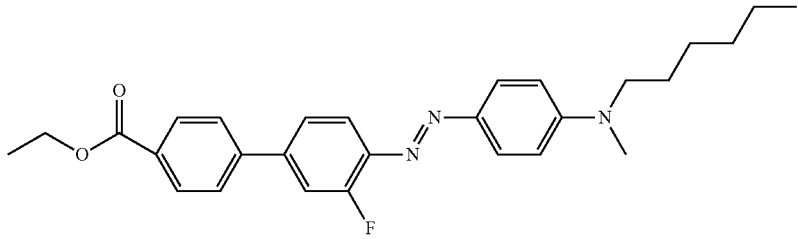
2-24
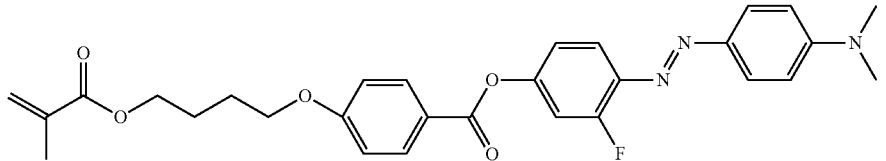
2-25
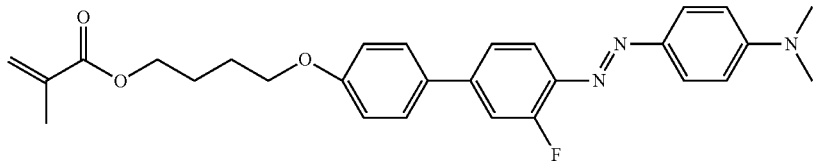
2-26

-continued
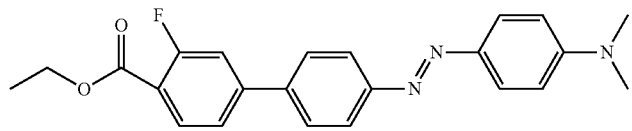
2-27
[Chemical formula 5]
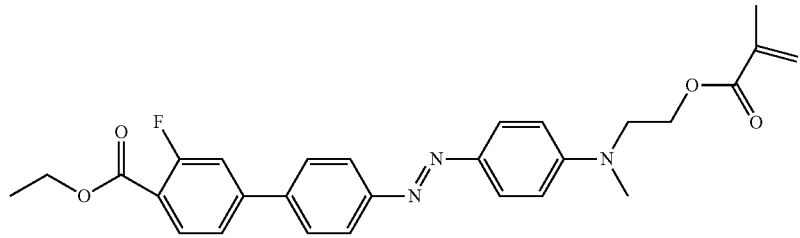
2-28
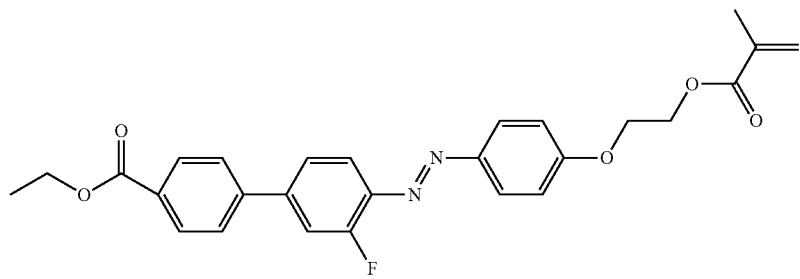
2-29
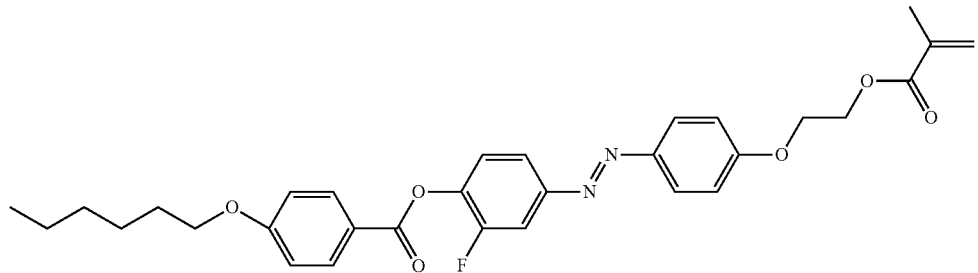
2-30
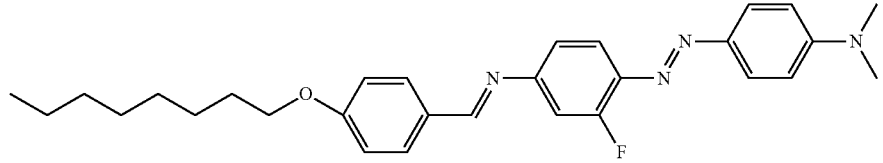
2-31
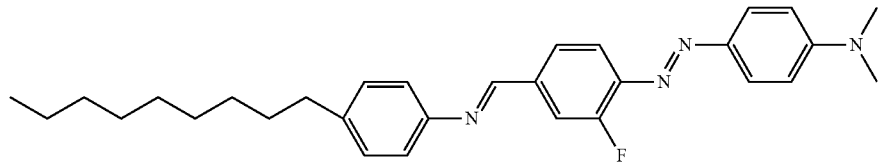
2-32
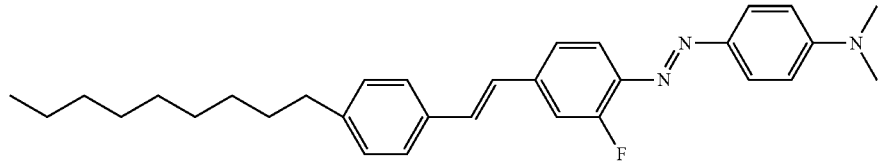
2-33

[Chemical formula 6]
2-34
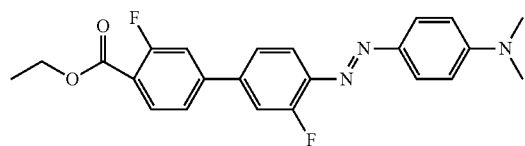
2-35
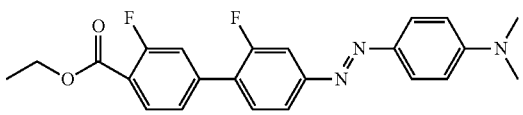
2-36
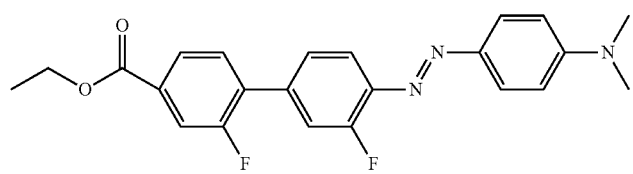
2-37
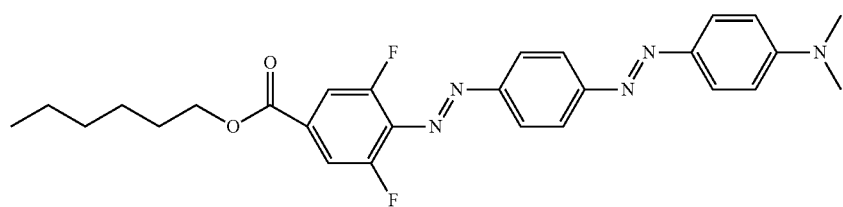
2-38
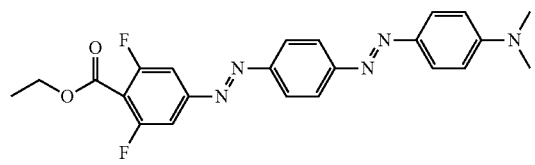
2-39
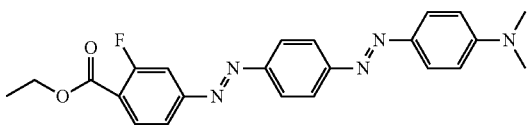
[Chemical formula 7]
2-40
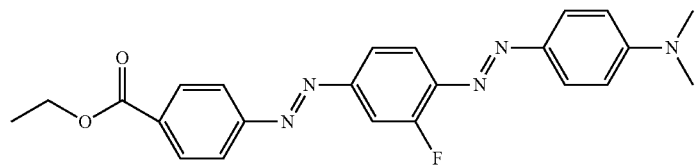
2-41
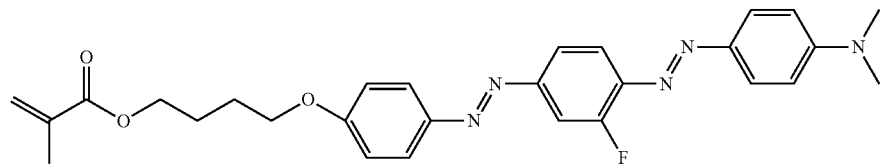
2-42
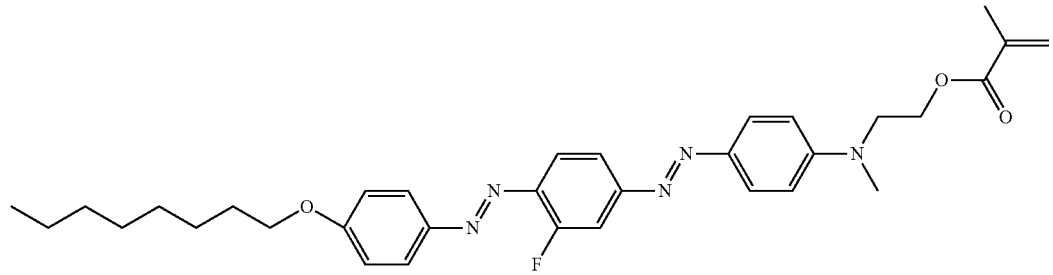

-continued
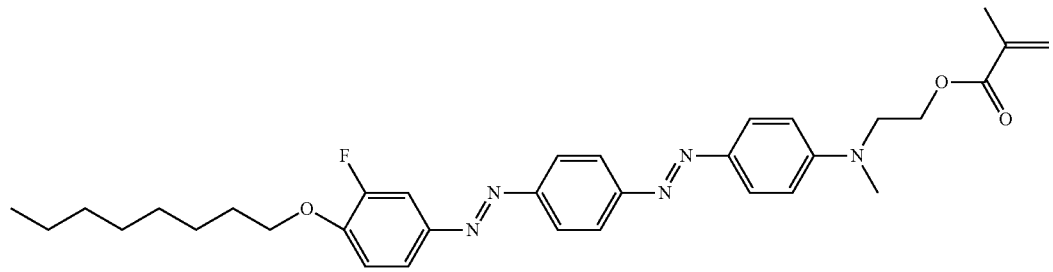
2-43
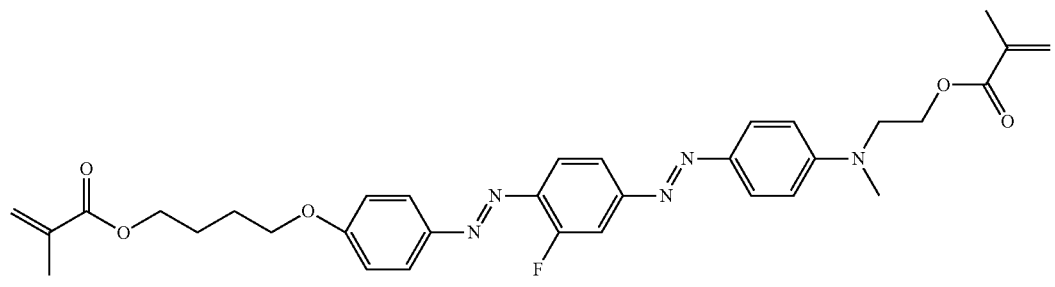
2-44
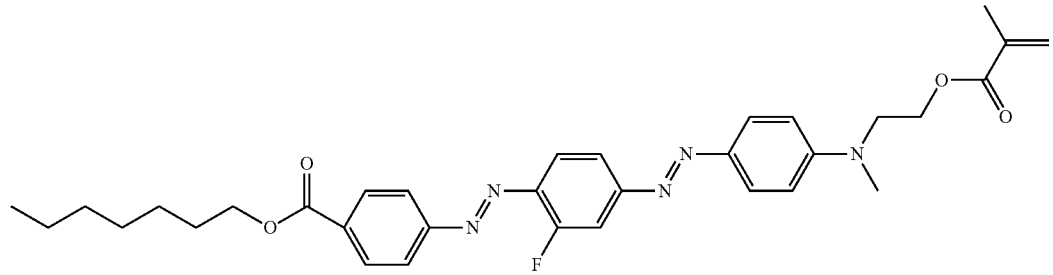
2-45
[Chemical formula 8]
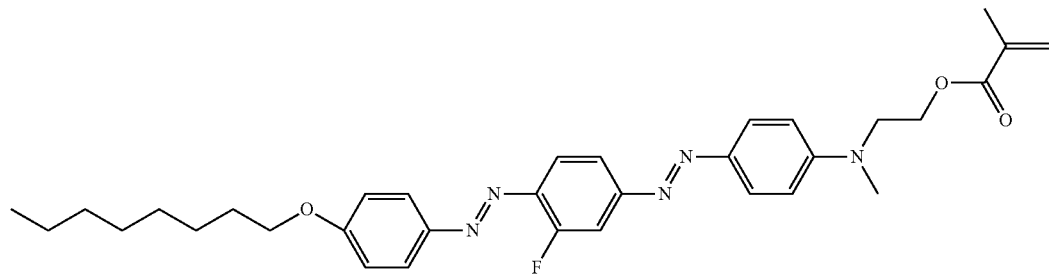
2-46
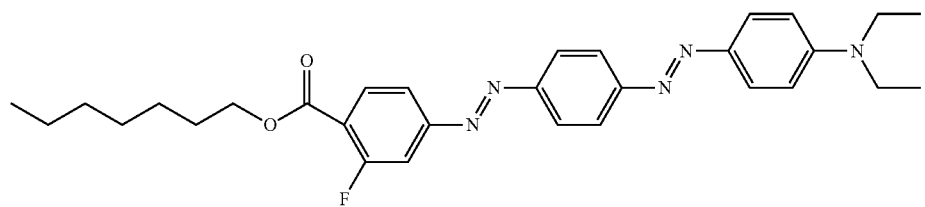
2-47
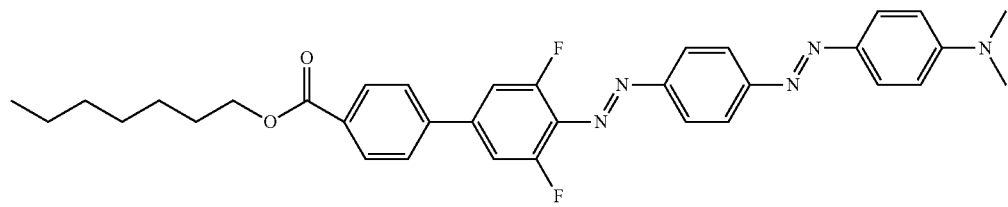
2-48

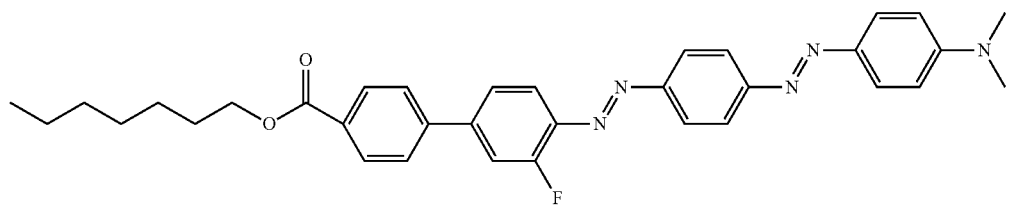
2-49
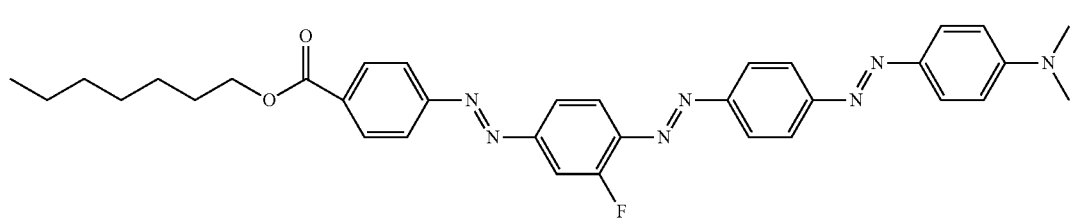
2-50
[Chemical formula 9]
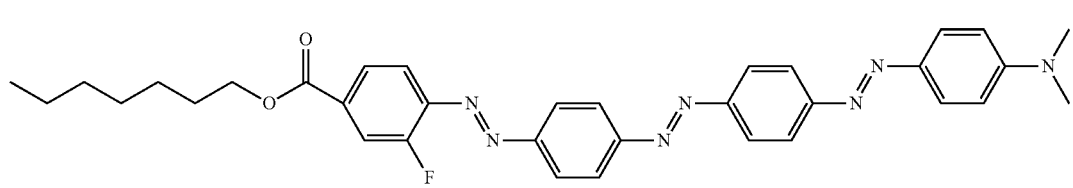
2-51
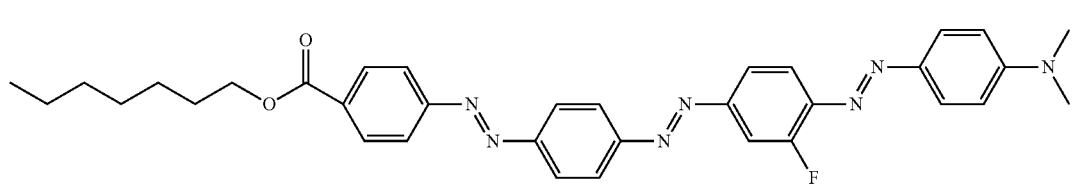
2-52
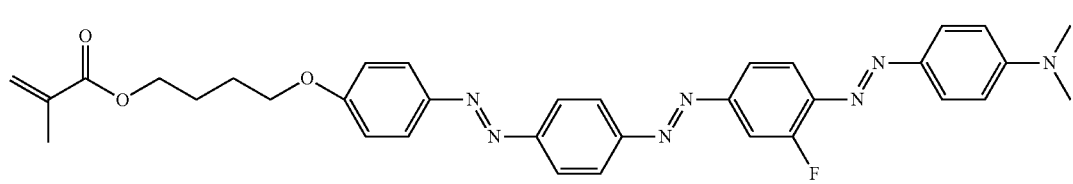
2-53
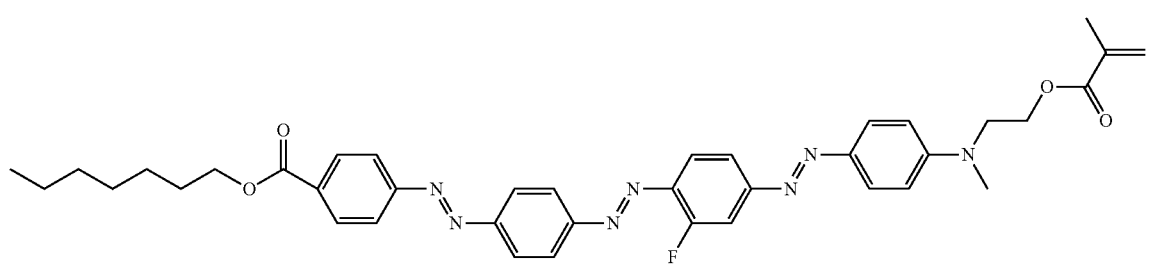
2-54
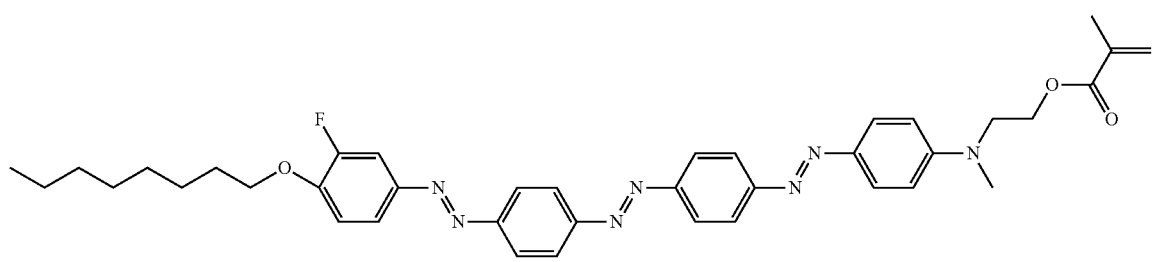
2-55

[Chemical formula 10]
2-56
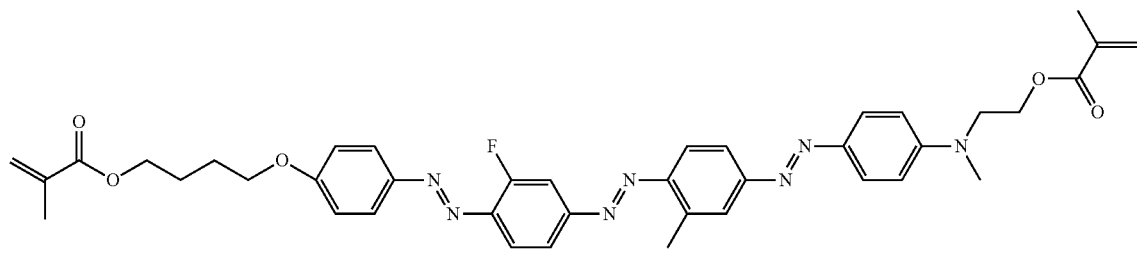
2-57
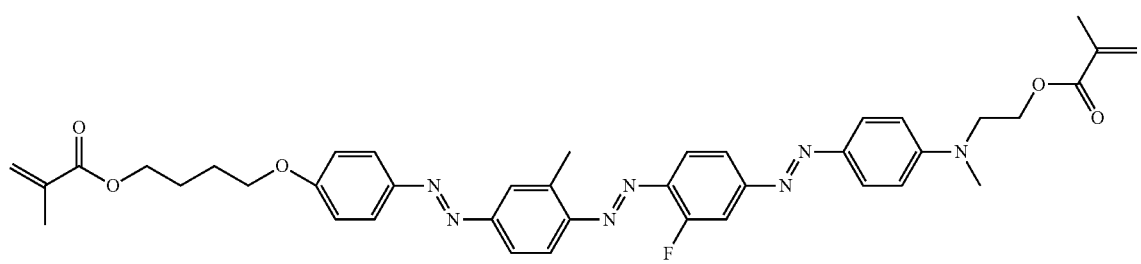
2-58
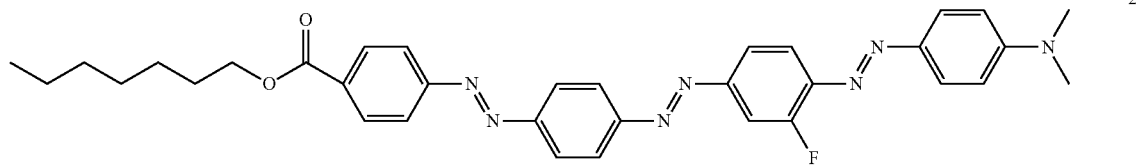
2-59
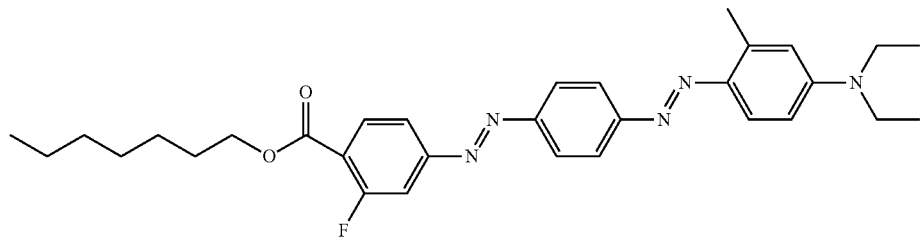
2-60
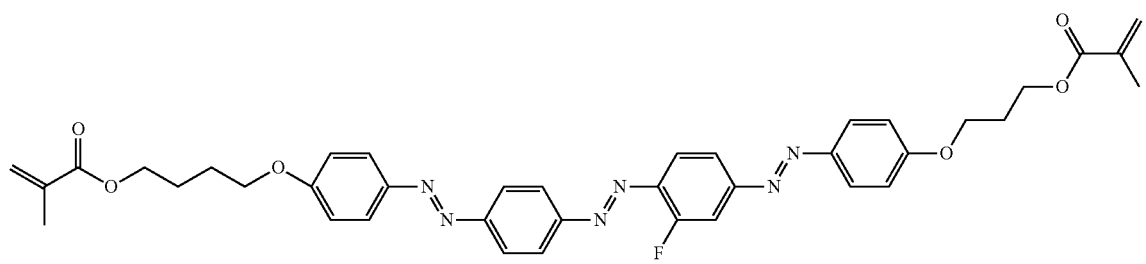
[Chemical formula 11]
2-61
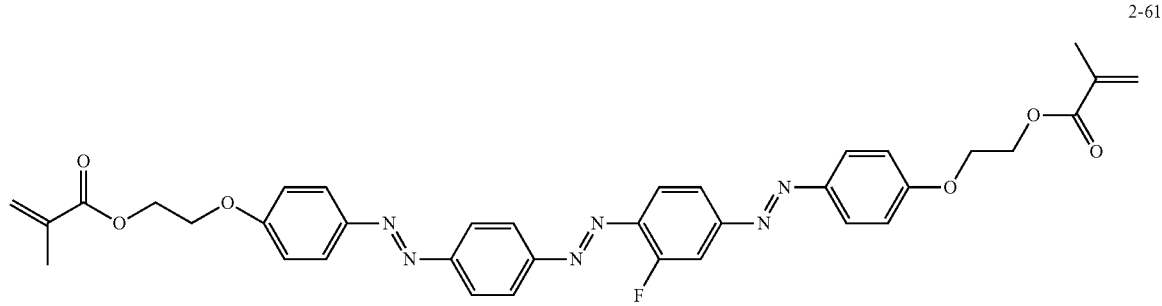

-continued
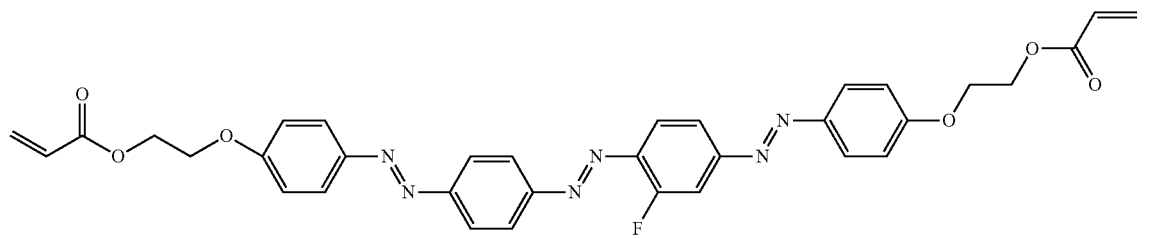
2-62
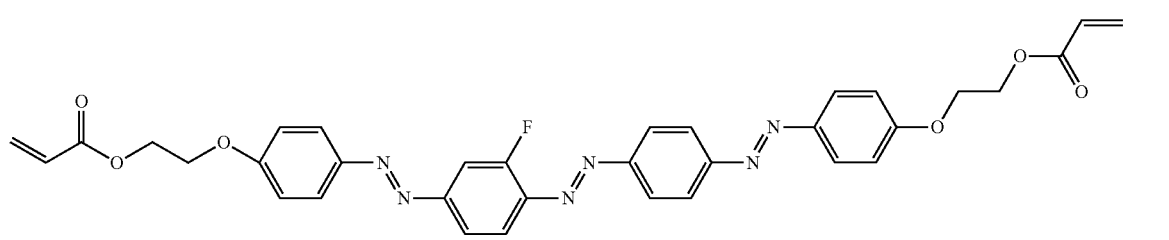
2-63
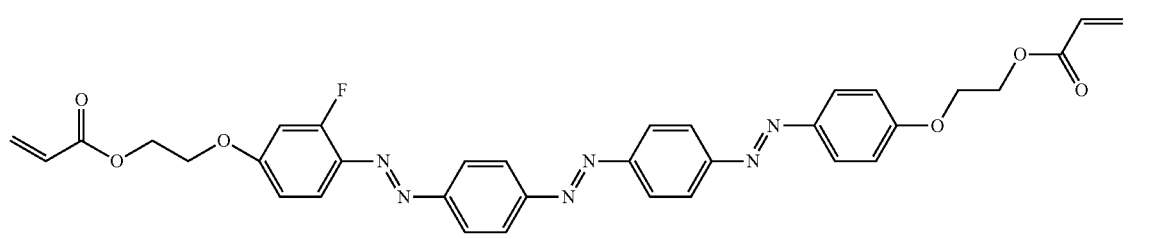
2-64
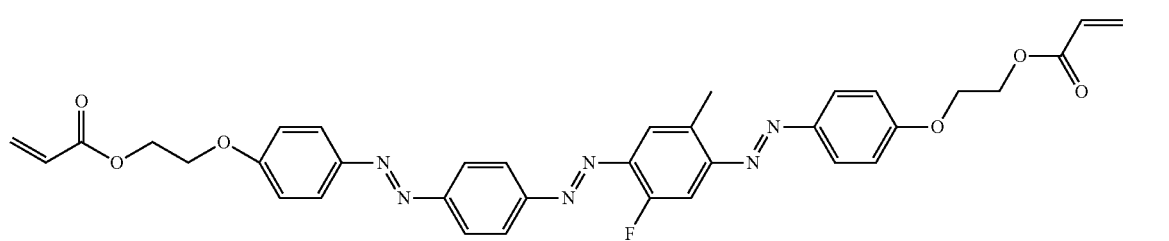
2-65
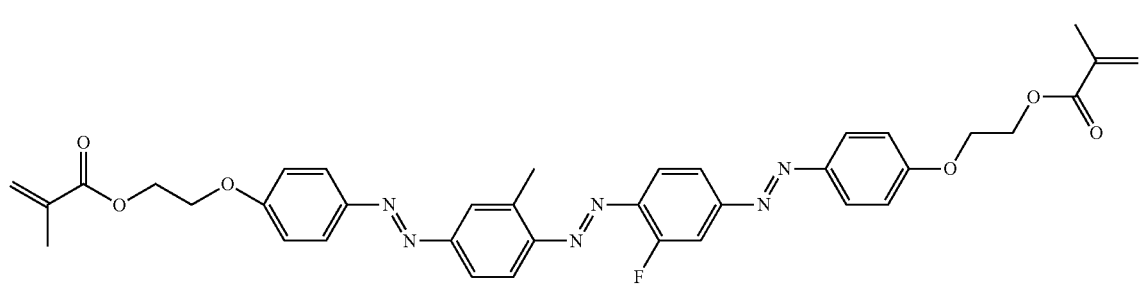
2-66
[Chemical formula 12]
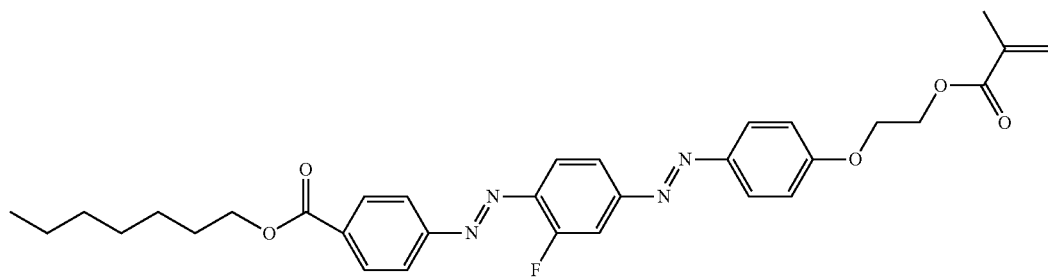
2-67

-continued
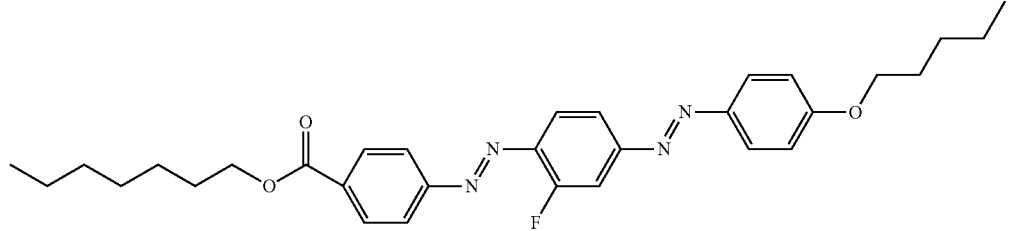
2-68
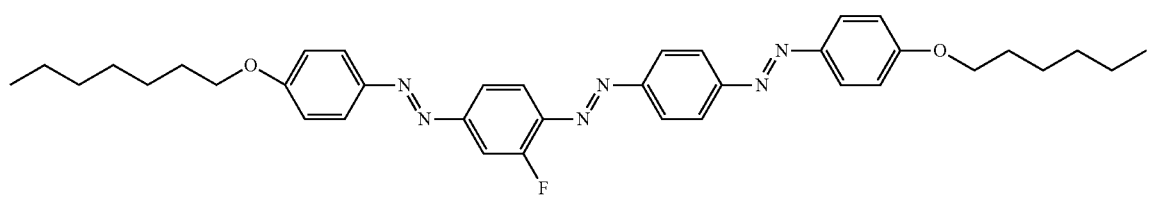
2-69
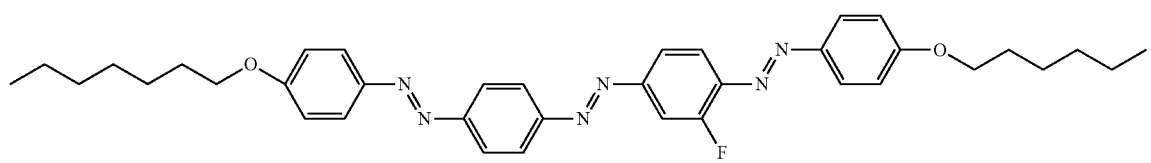
2-70
[Chemical formula 13]
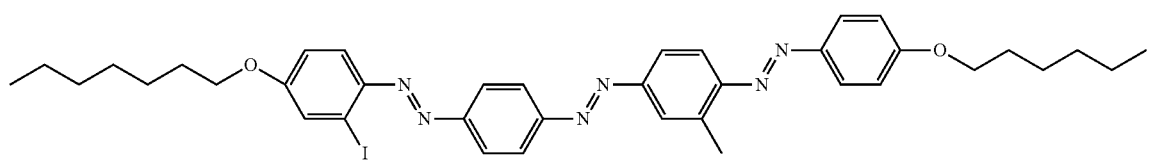
2-71
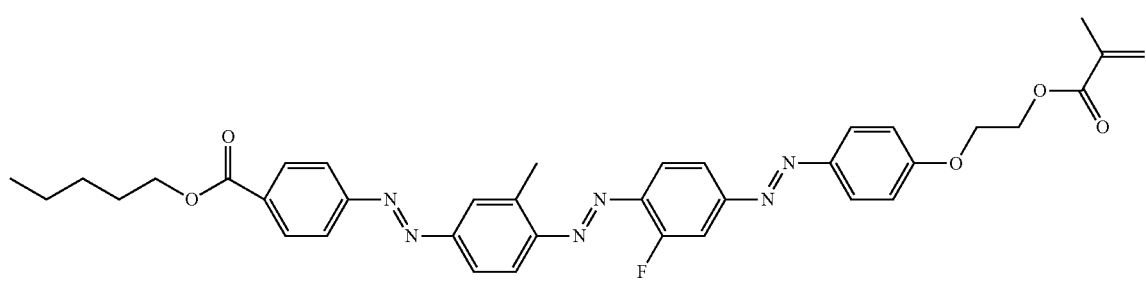
2-72
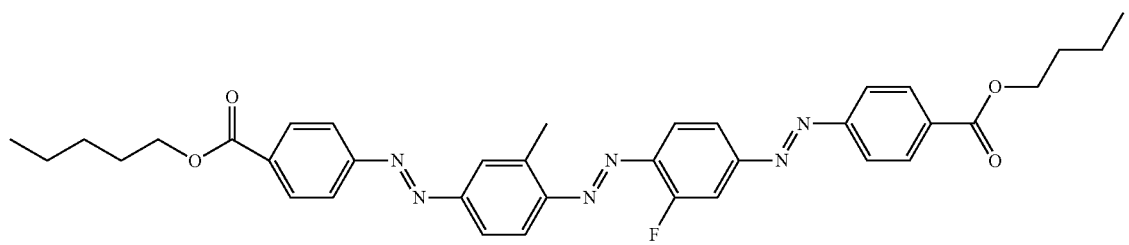
2-73

[Chemical formula 14]
2-74
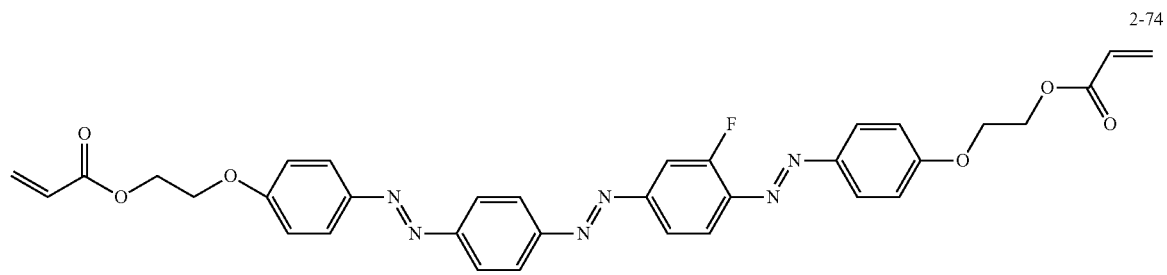
2-75
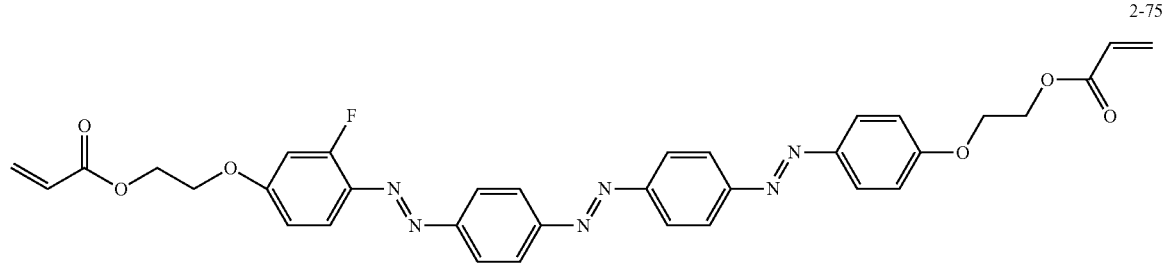
2-76
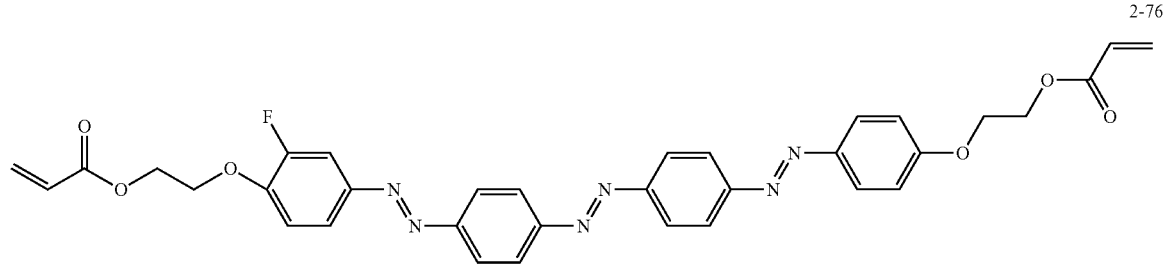
2-77
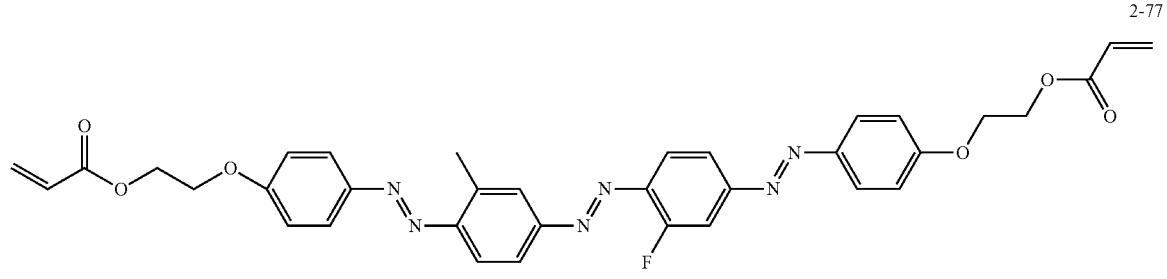
2-78
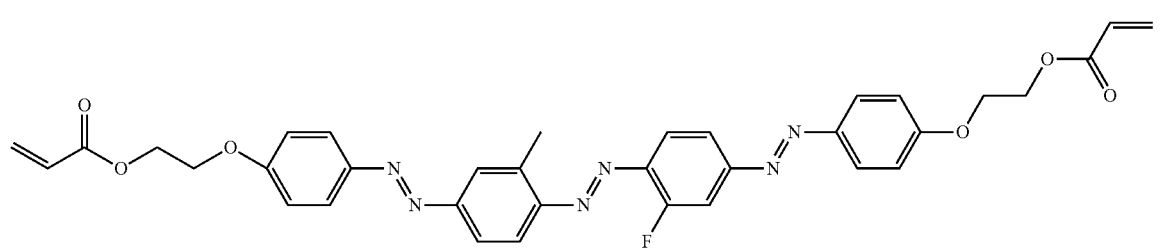
[Chemical formula 15]
2-79
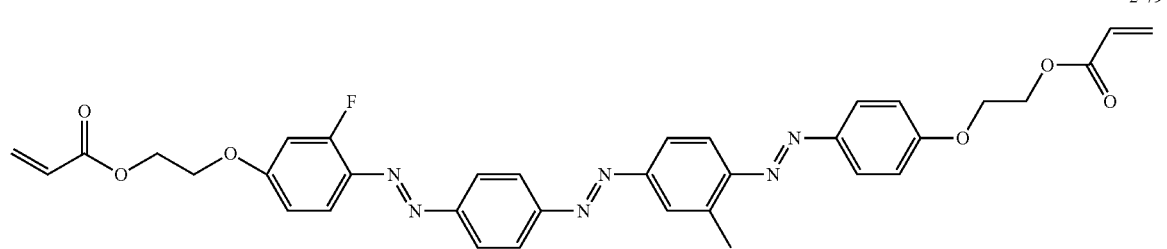

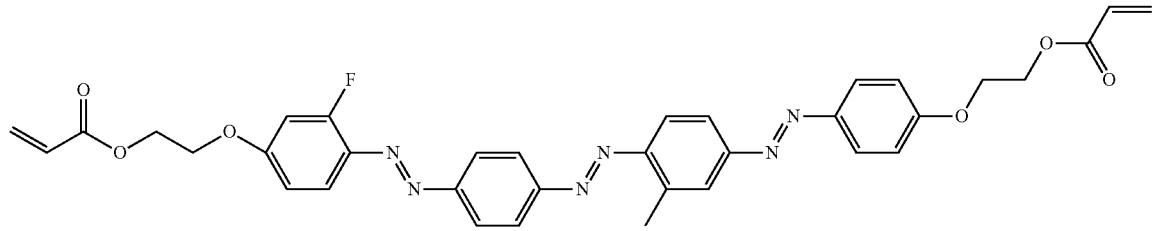
2-80
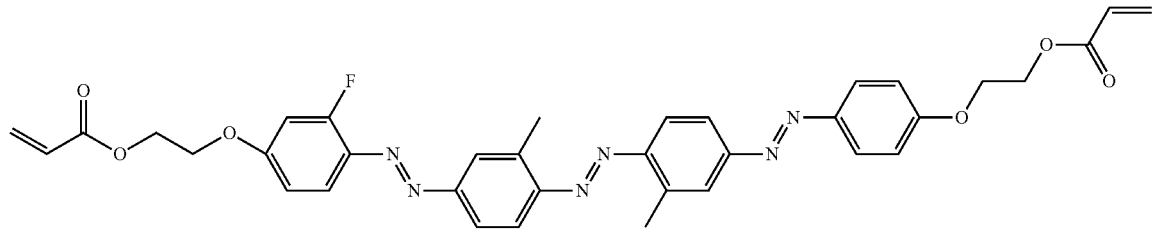
2-81
[Chemical formula 16]
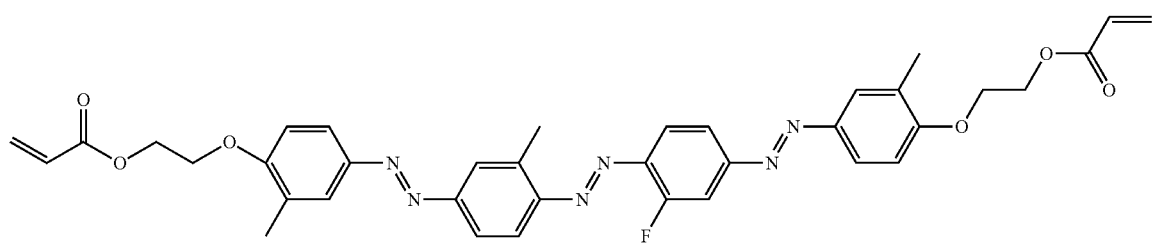
2-82
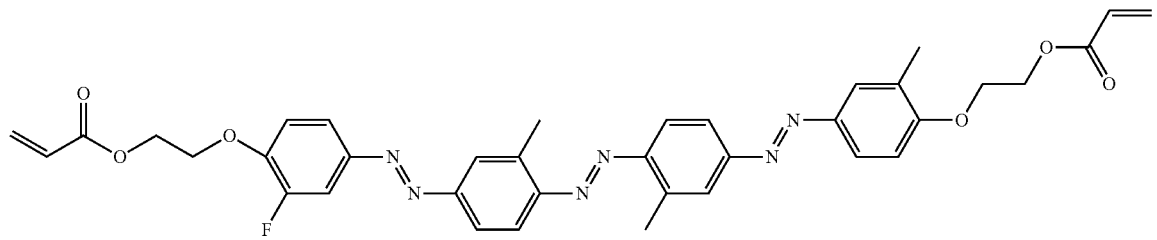
2-83
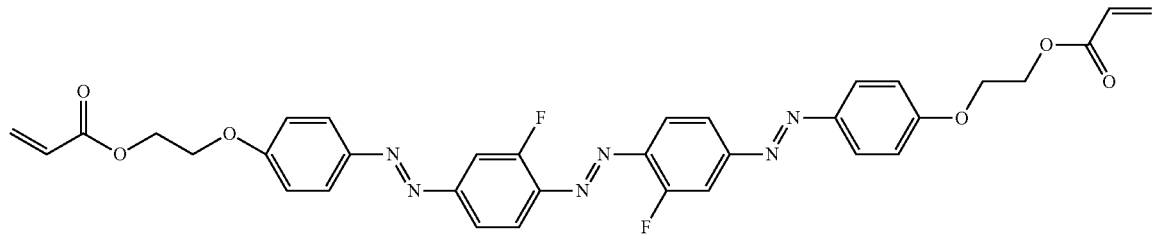
2-84
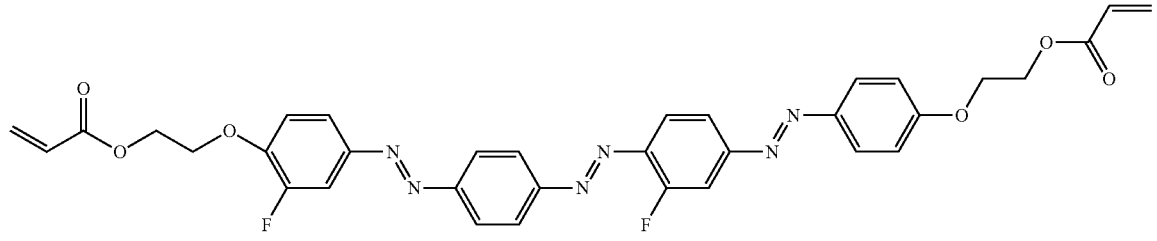
2-85

-continued
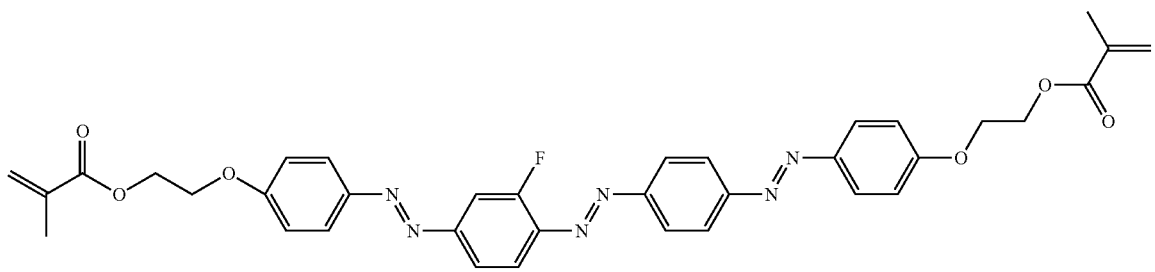
2-86
[Chemical formula 17]
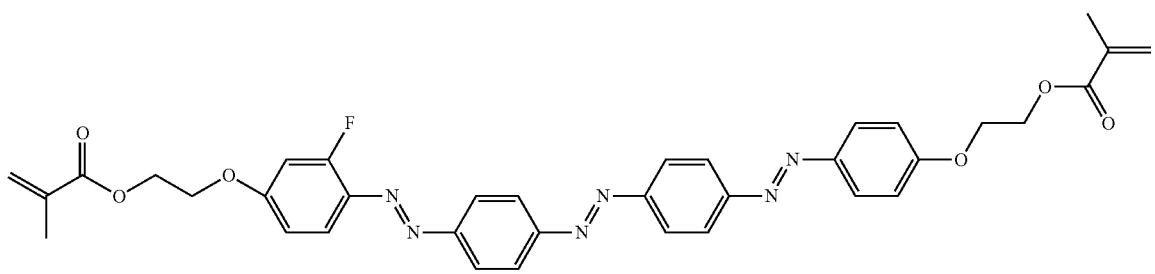
2-87
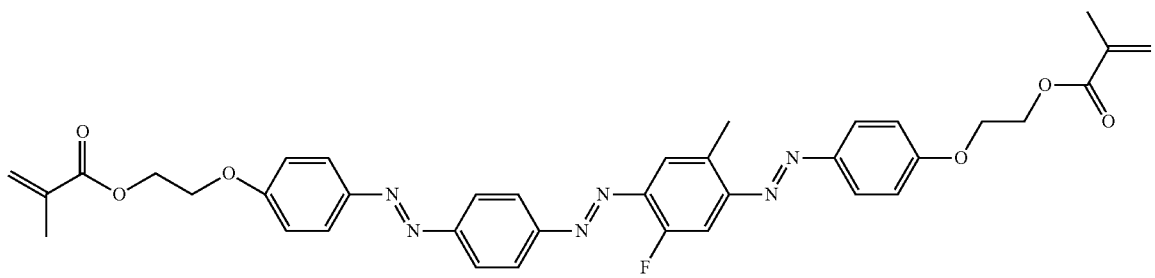
2-88
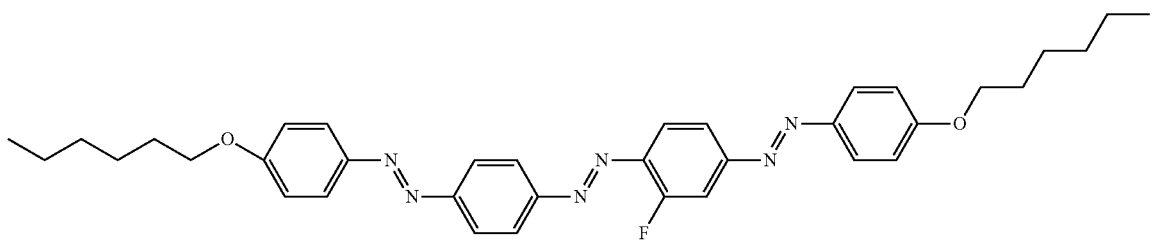
2-89
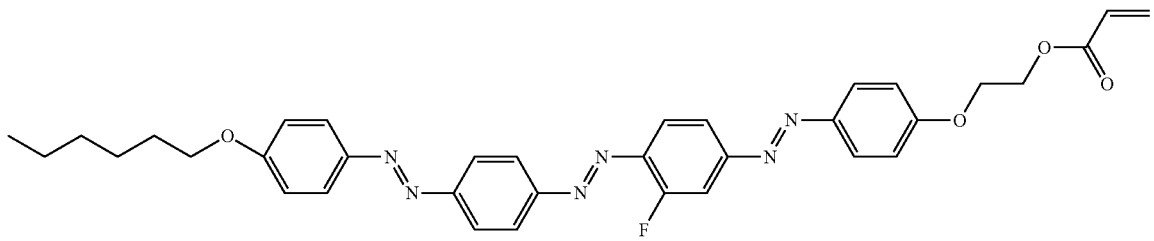
2-90

2-91
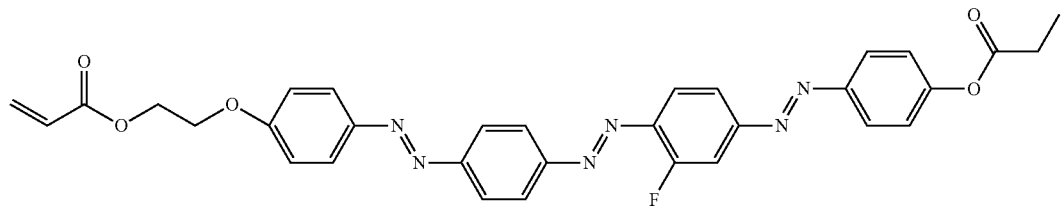
[Chemical formula 18]
2-92
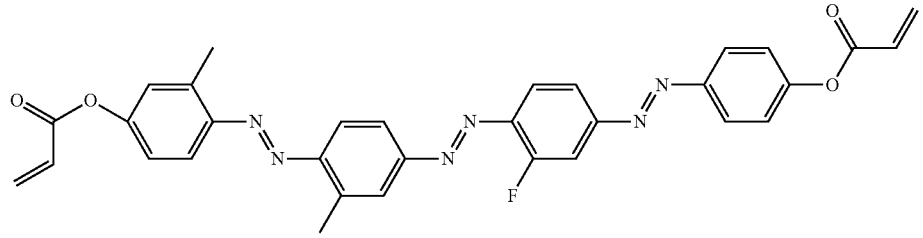
2-93
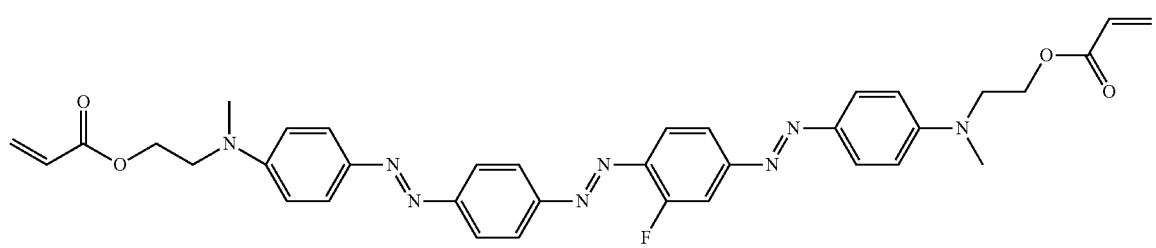
2-94
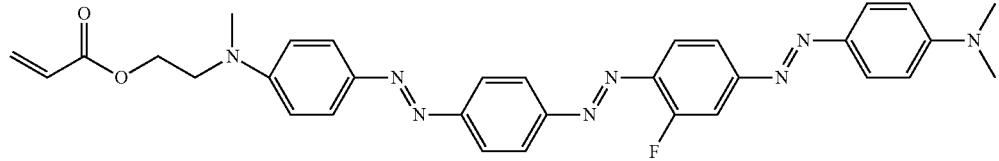
2-95
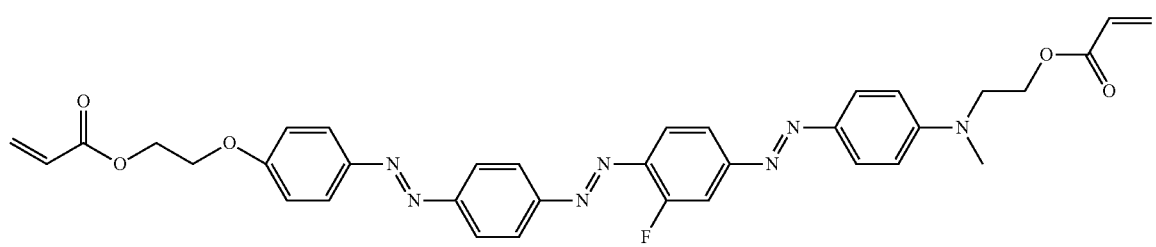
2-96
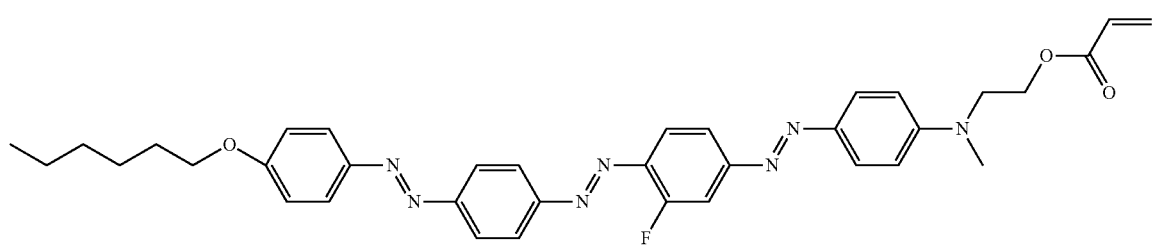

[Chemical formula 19]
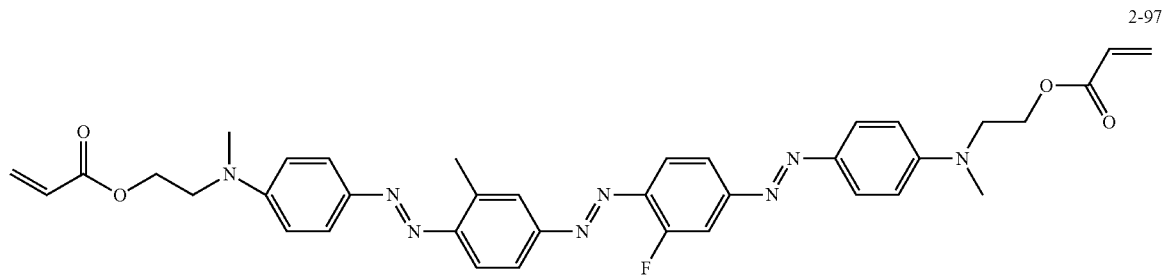
2-97
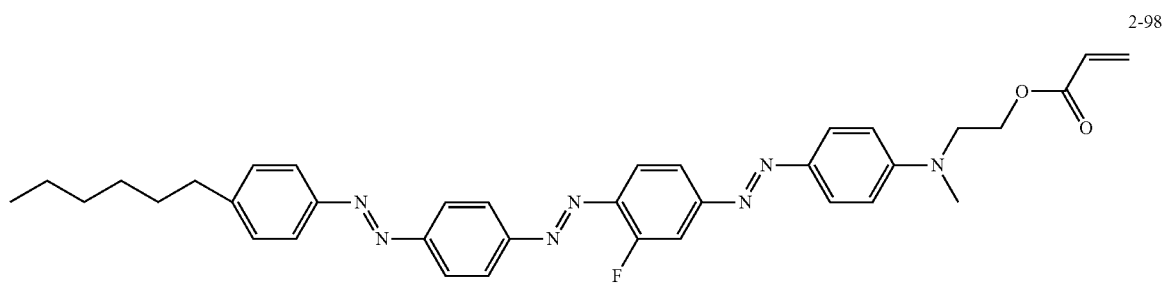
2-98
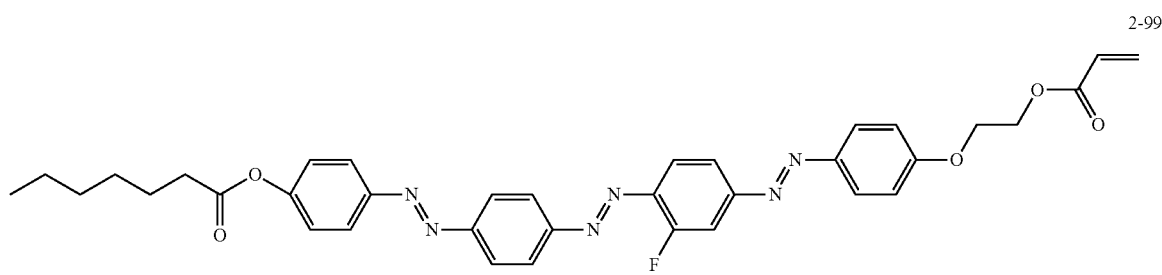
2-99
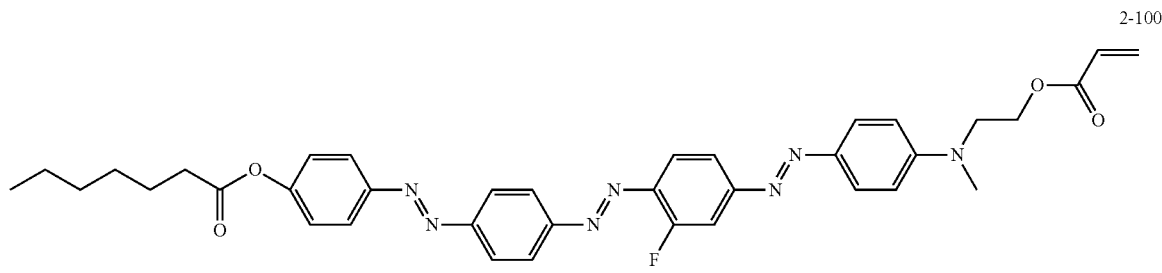
2-100
[Chemical formula 20]
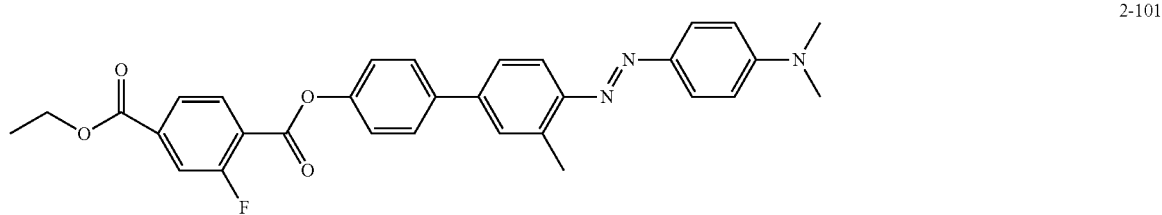
2-101
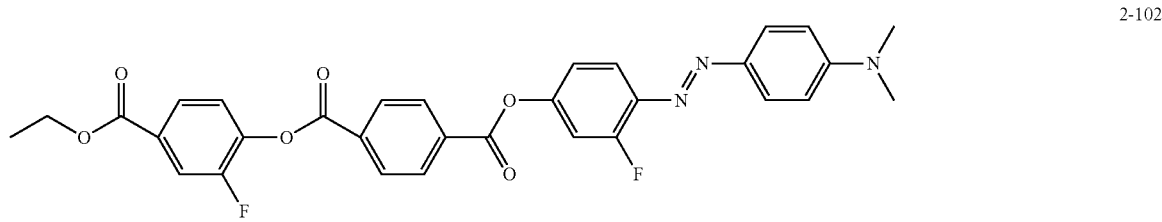
2-102

-continued
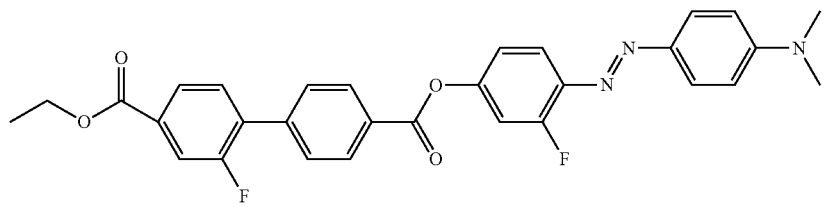
2-103
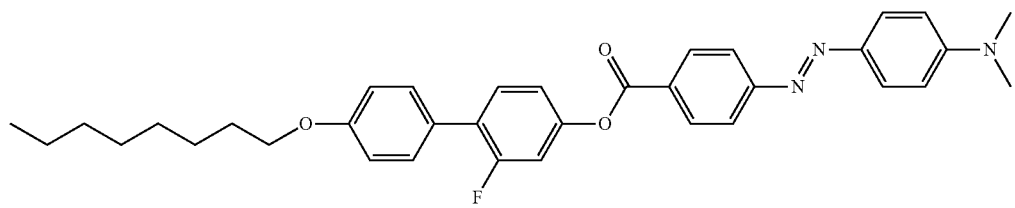
2-104
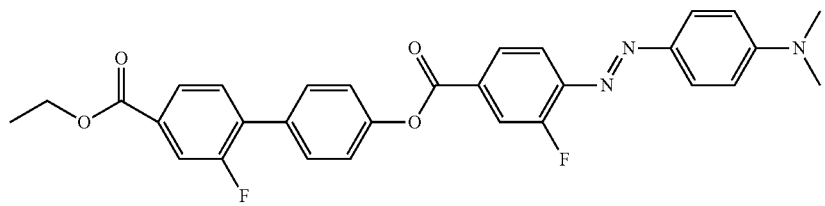
2-105
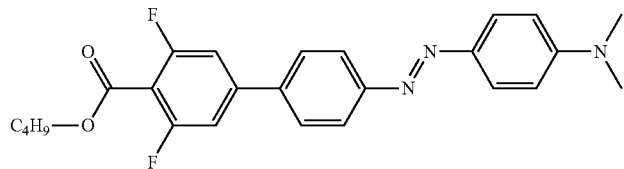
2-106
[Chemical formula 21]
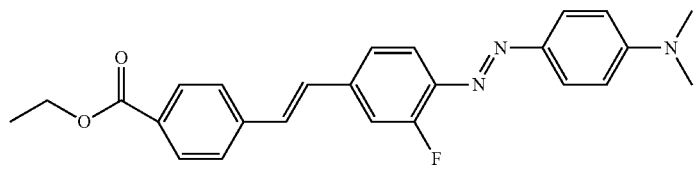
2-107
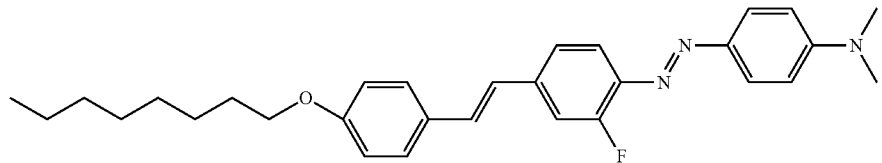
2-108
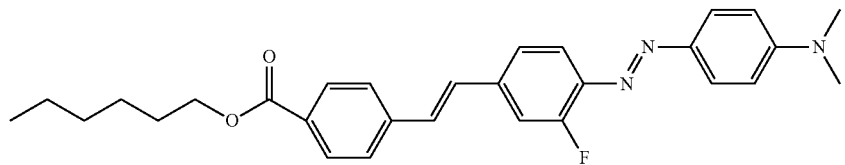
2-109
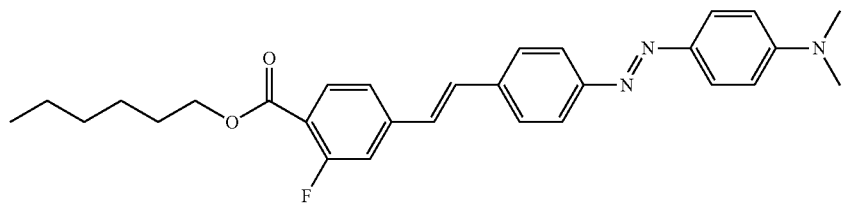
2-110

-continued
2-111
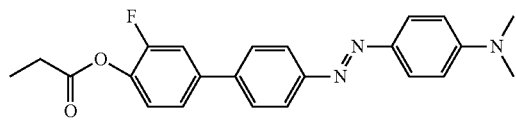
2-112
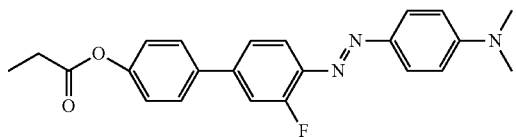
2-113
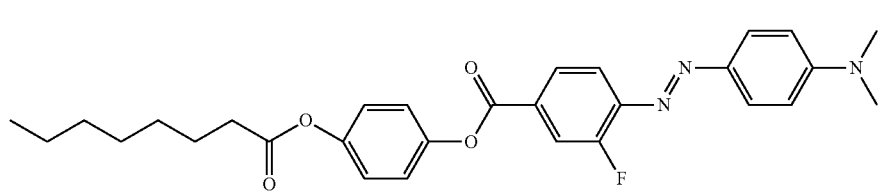
2-114
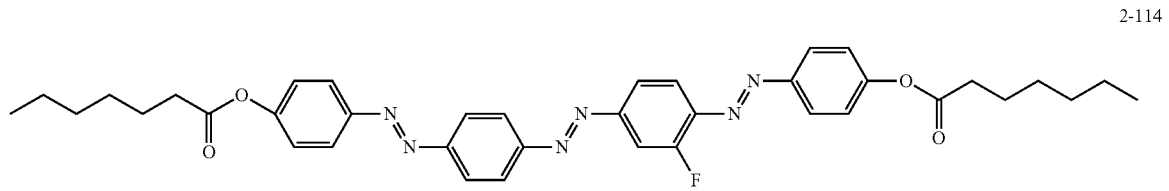
2-115
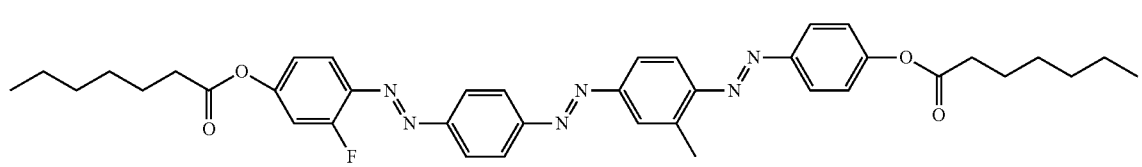
[Chemical formula 22]
2-116
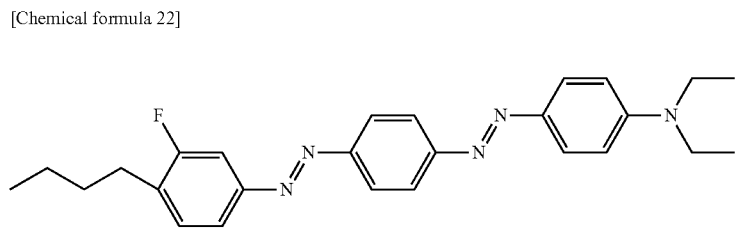
2-117
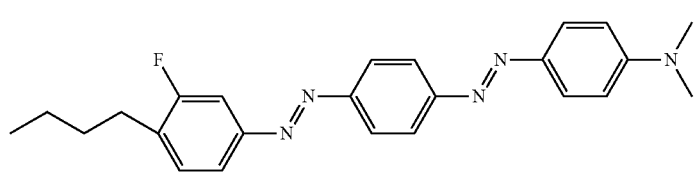
2-118
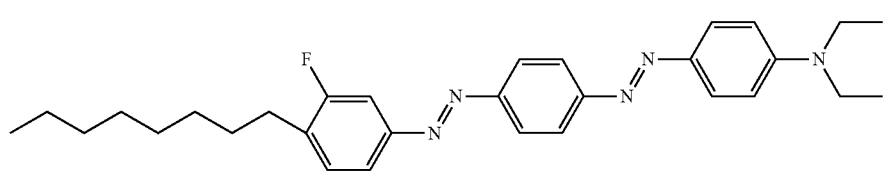
2-119
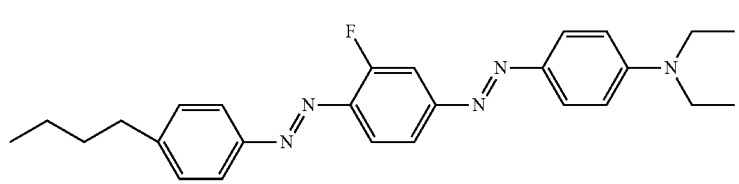

-continued
[Chemical formula 23]
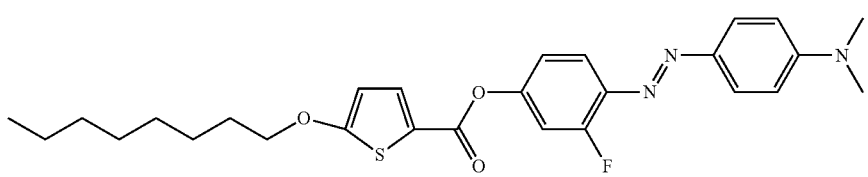
2-120
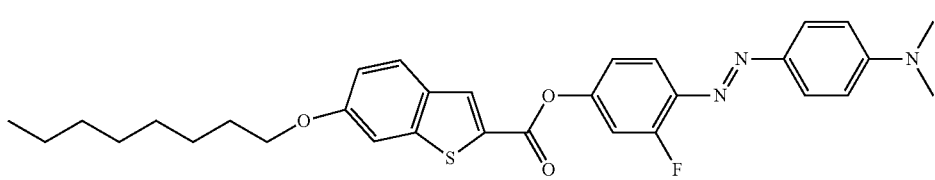
2-121
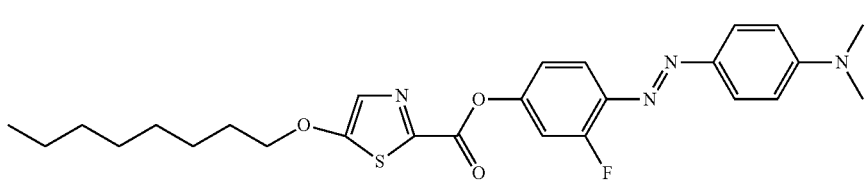
2-122
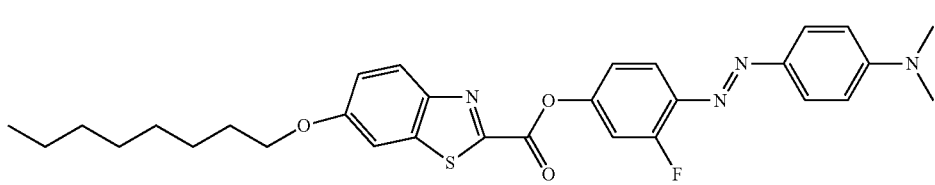
2-123
[Chemical formula 24]
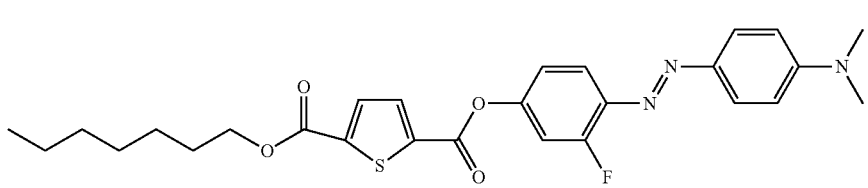
2-124
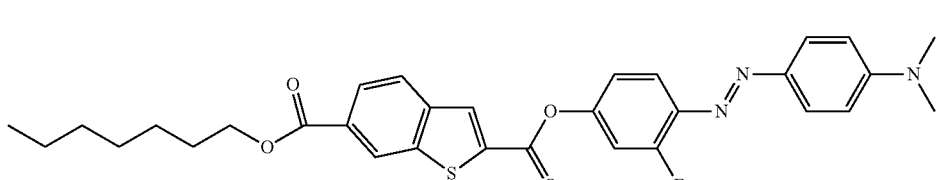
2-125
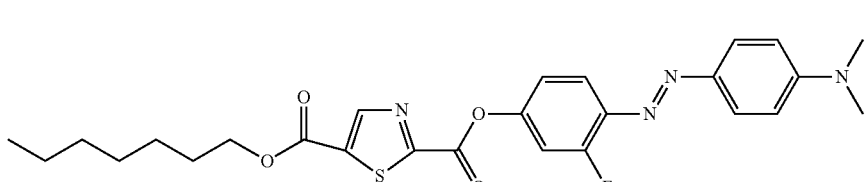
2-126
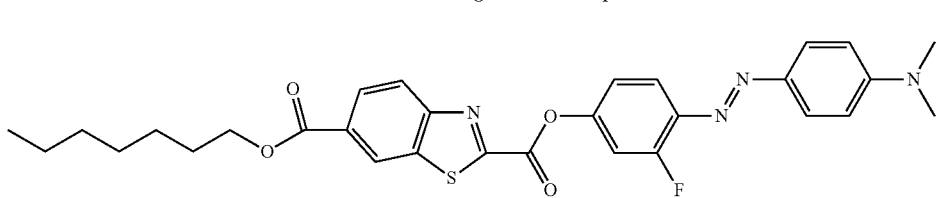
2-127

[Chemical formula 25]
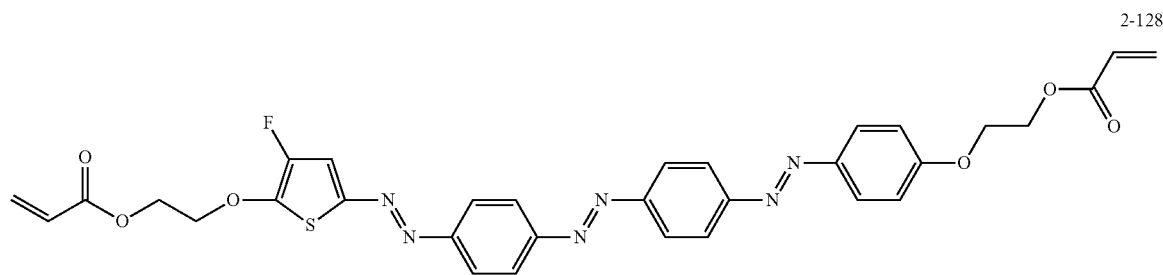
2-128
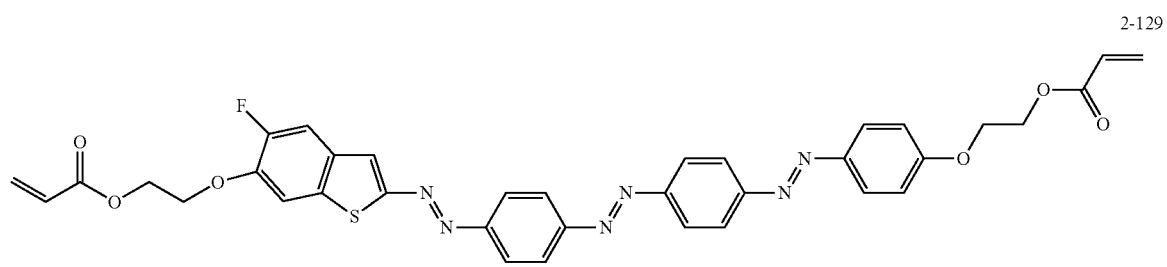
2-129
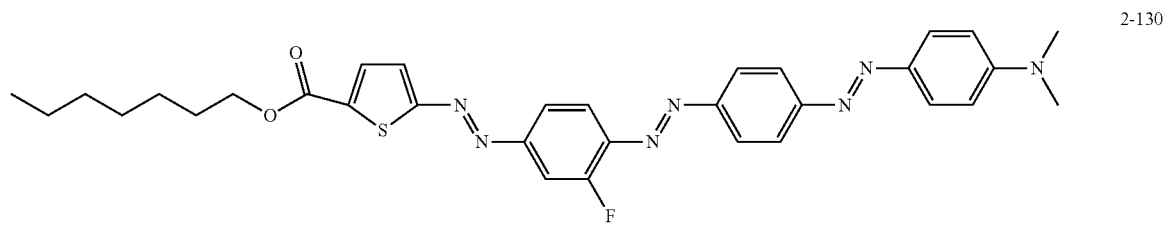
2-130
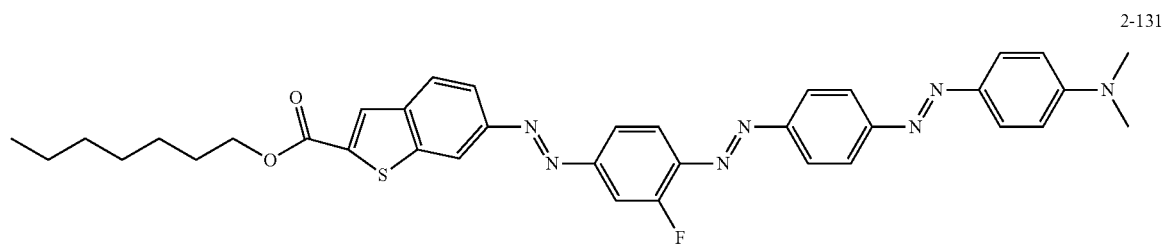
2-131
[Chemical formula 26]
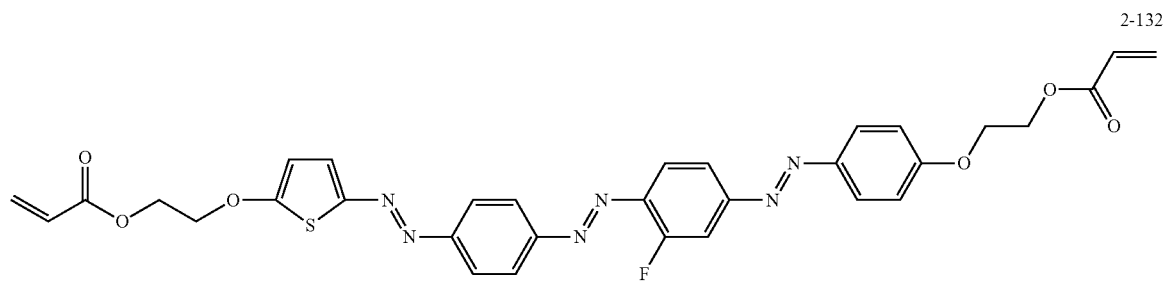
2-132
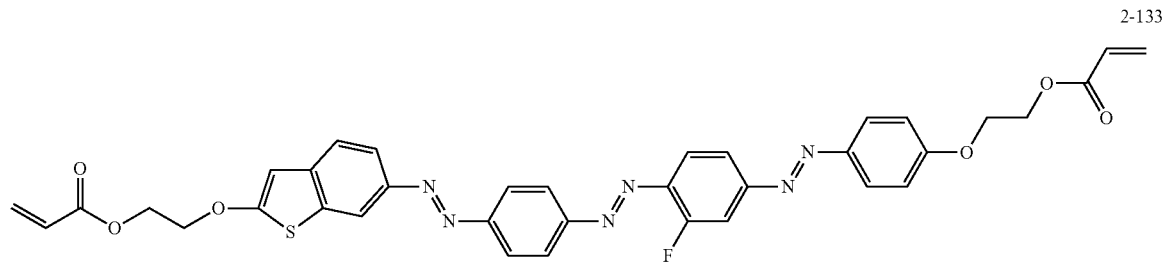
2-133

2-135
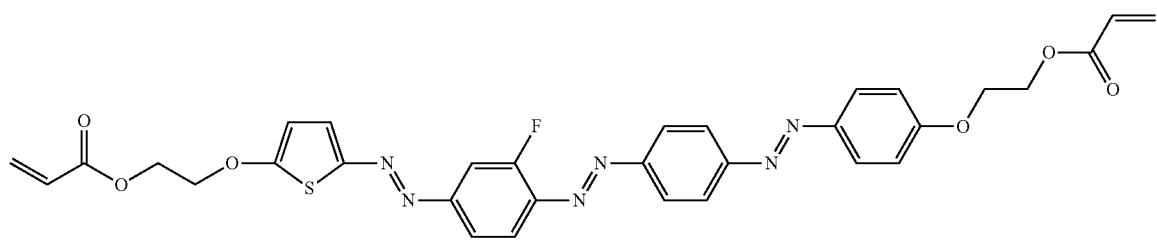
2-136
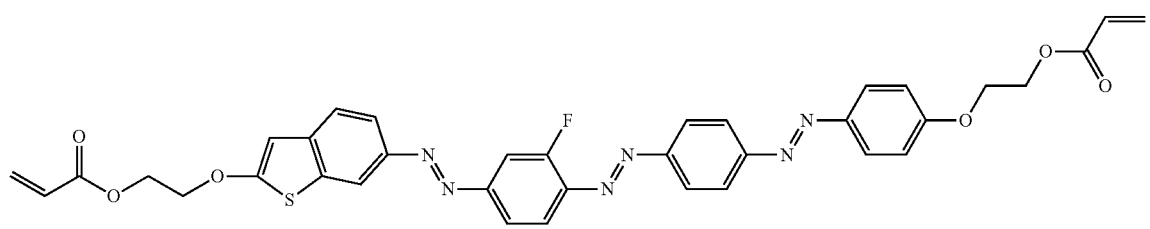
[Chemical formula 27]
2-137
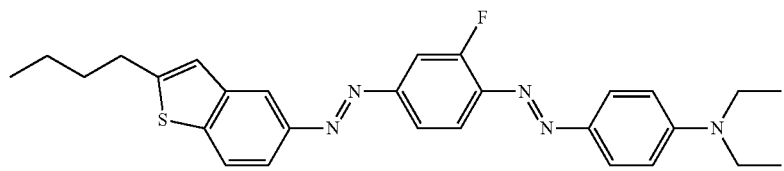
2-138
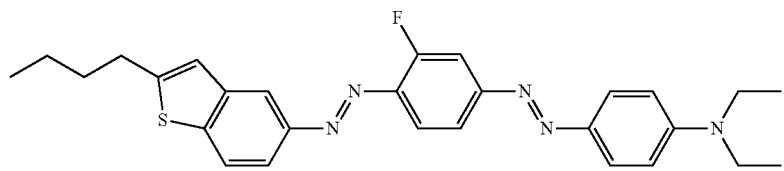
2-139
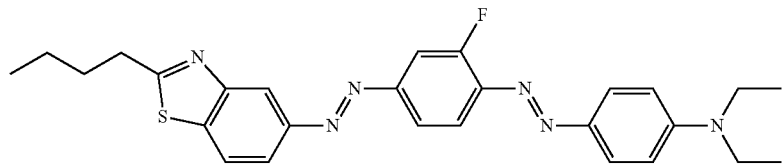
2-140
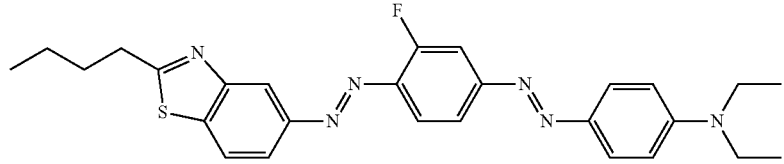
[Chemical formula 28]
2-141
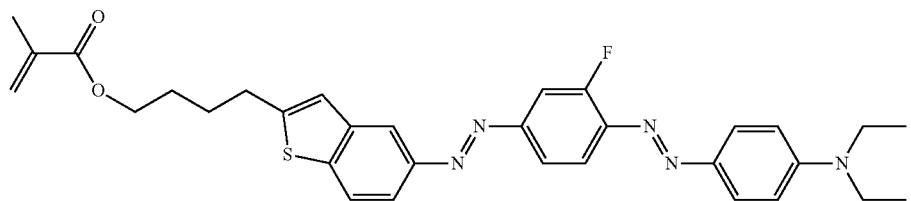

-continued
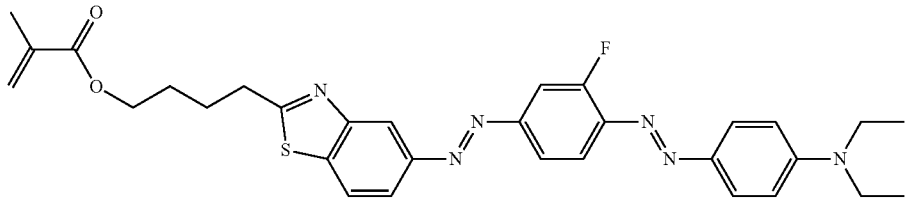
2-142
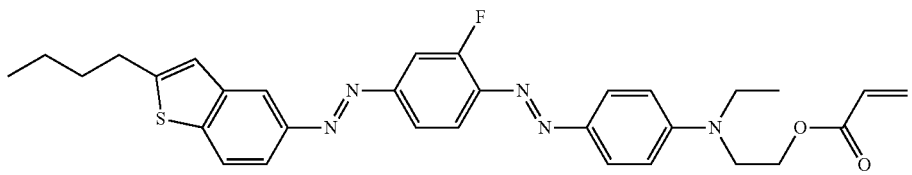
2-143
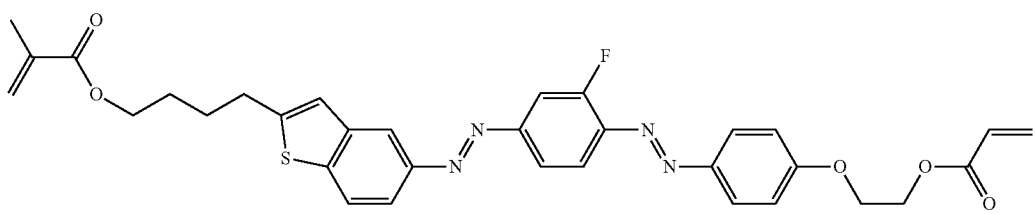
2-144
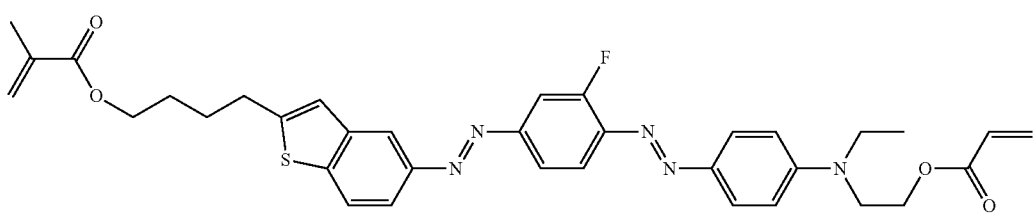
2-145
[Chemical formula 29]
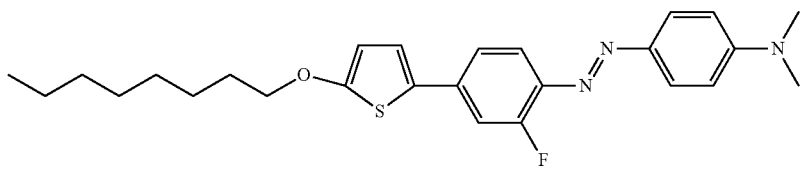
2-146
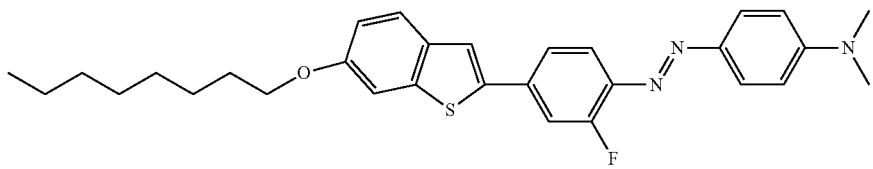
2-147
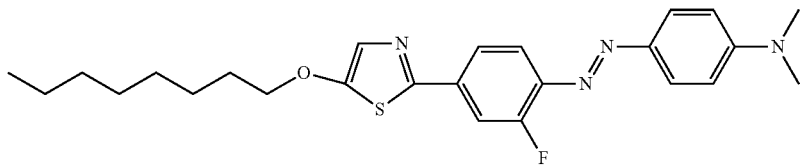
2-148
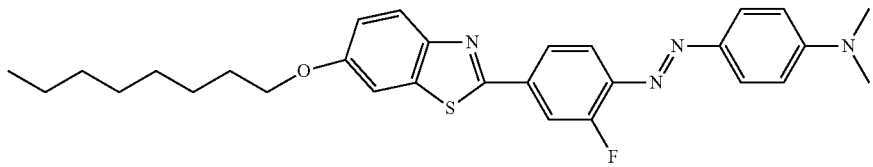
2-149

[Chemical formula 30]
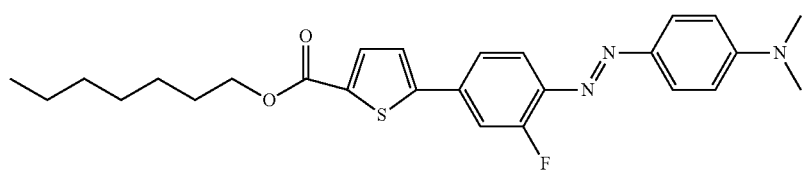
2-150
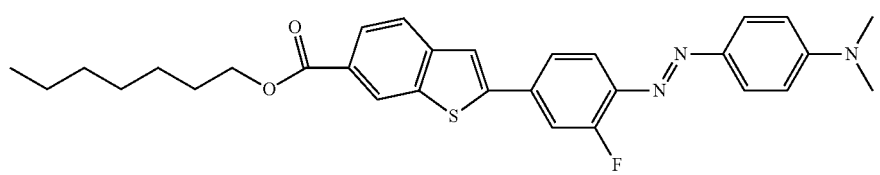
2-151
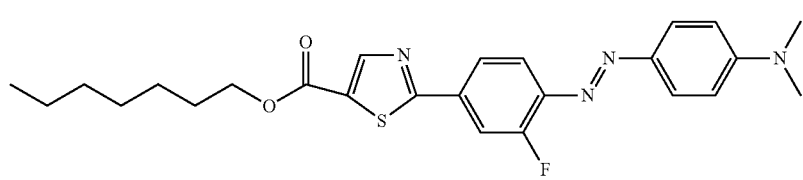
2-152
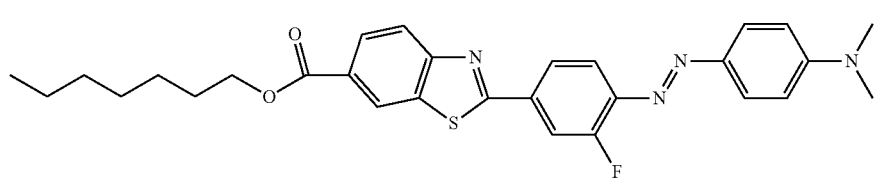
2-153
[Chemical formula 31]
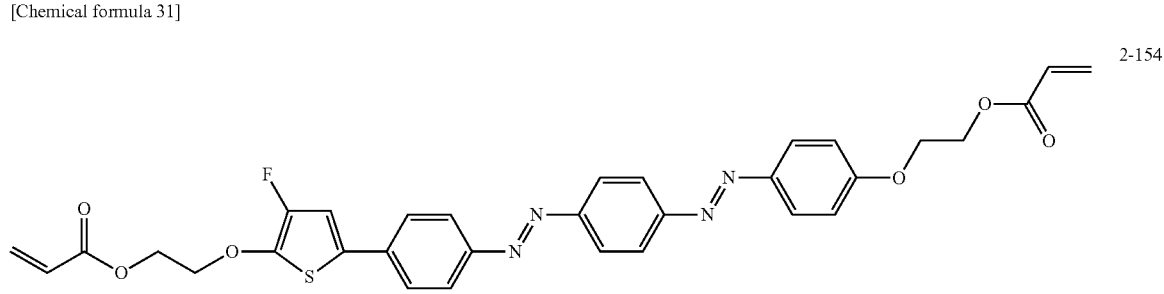
2-154
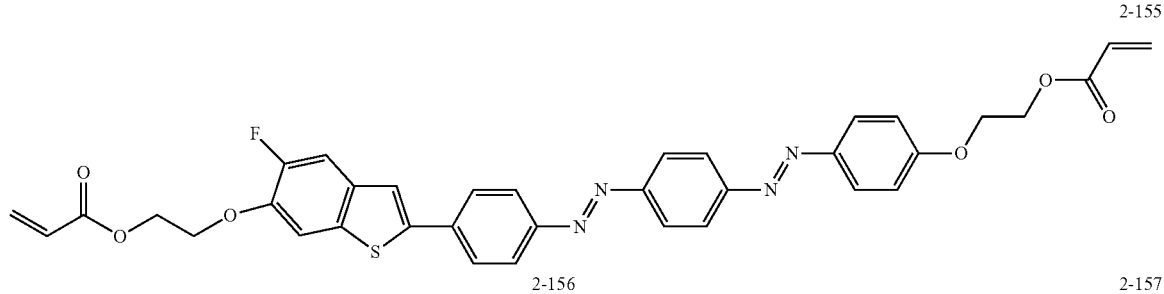
2-155
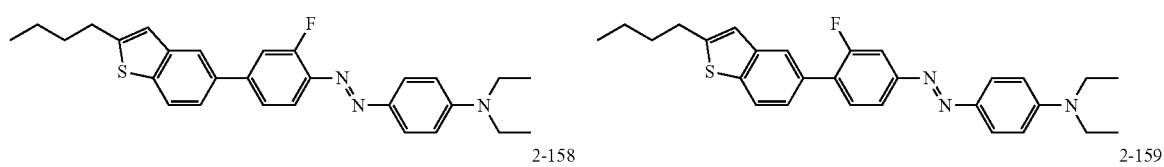
2-156   2-157
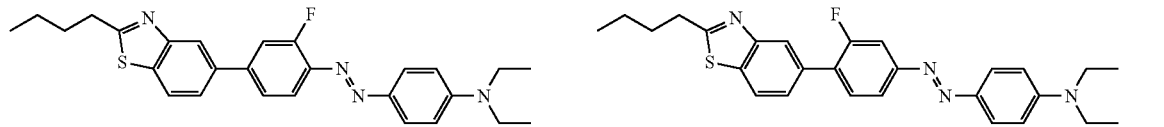
2-158   2-159

[Chemical formula 32]
2-160
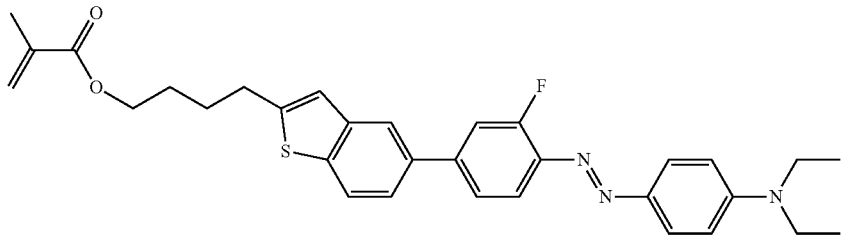
2-161
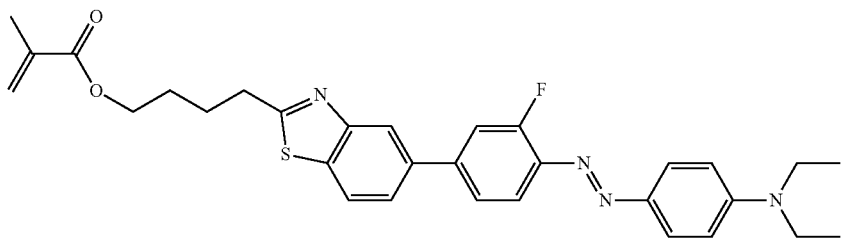
2-162
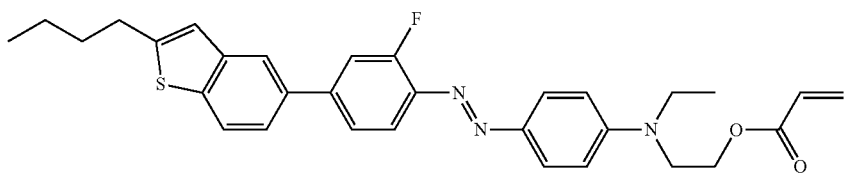
2-163
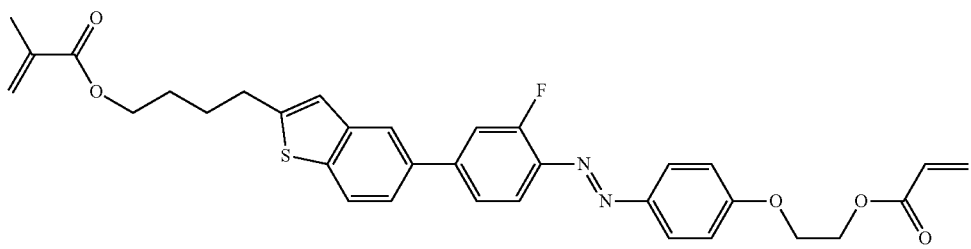
2-164
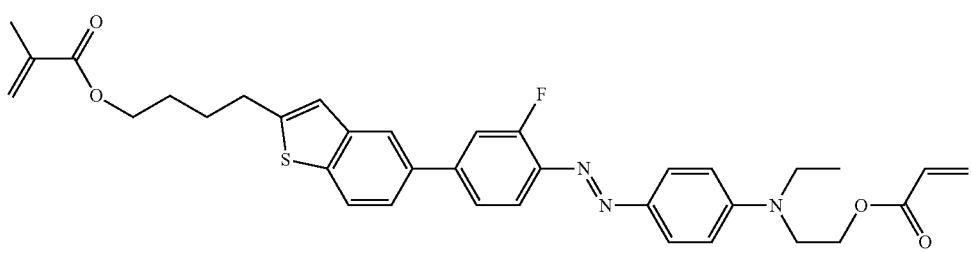
[Chemical formula 33]
2-165
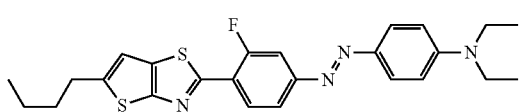
2-166
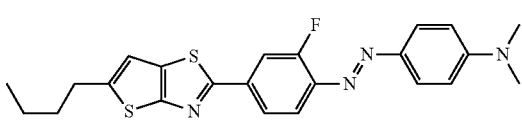
2-167
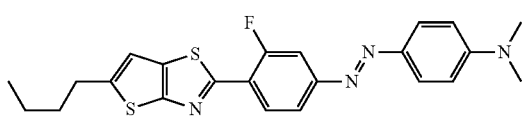
2-168
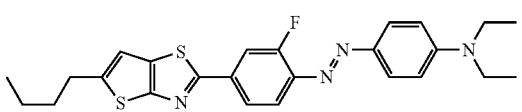

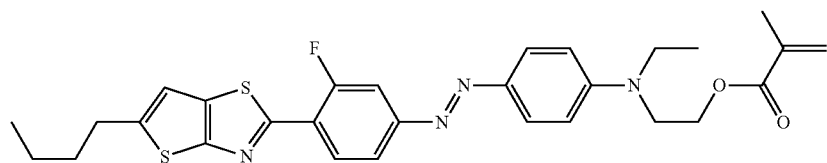
2-169
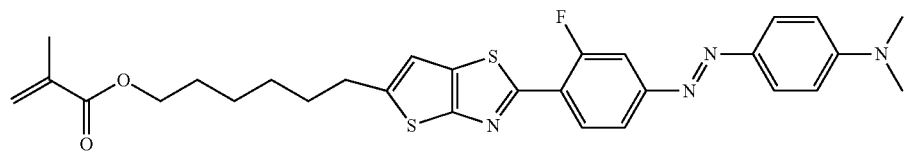
2-170
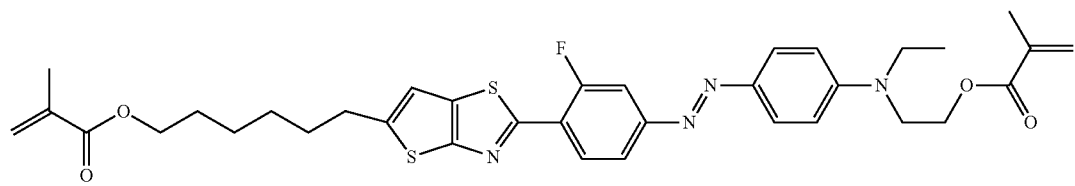
2-171
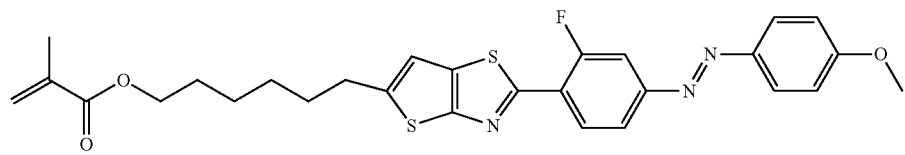
2-172
[Chemical formula 34]
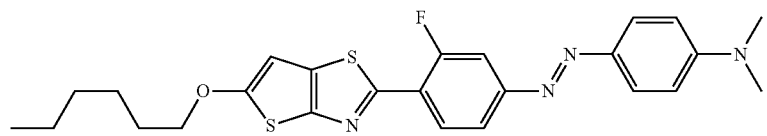
2-173
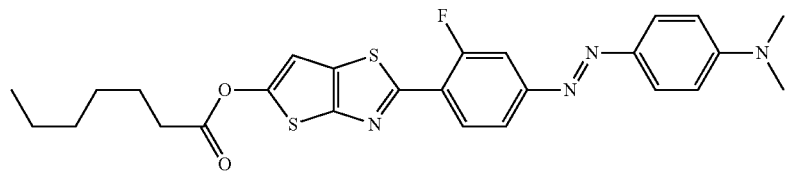
2-174
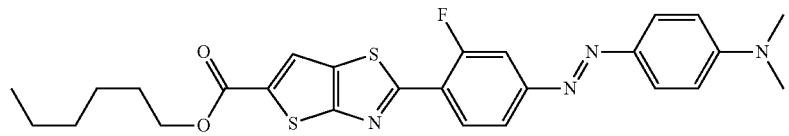
2-175
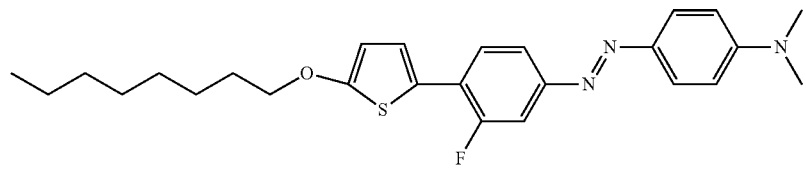
2-176
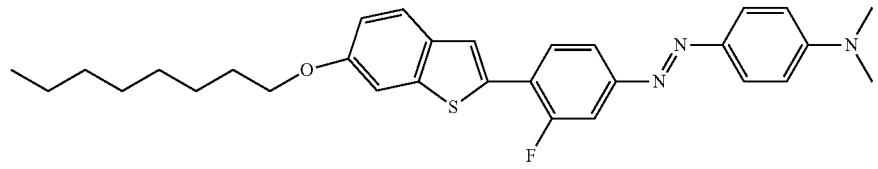
2-177

-continued
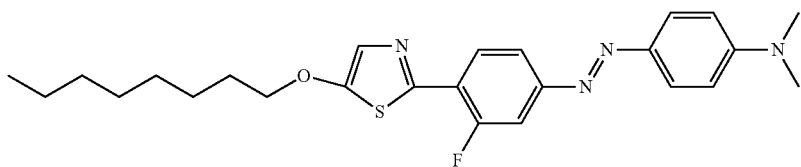
2-178
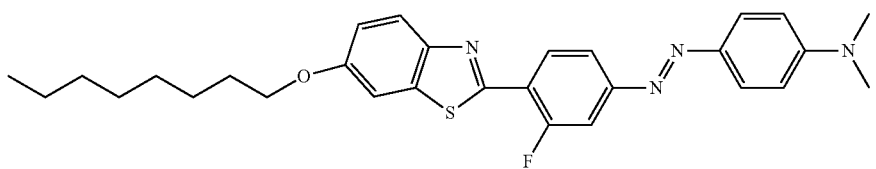
2-179
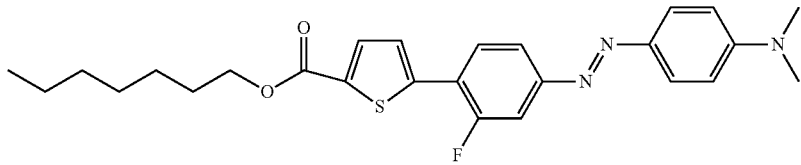
2-180
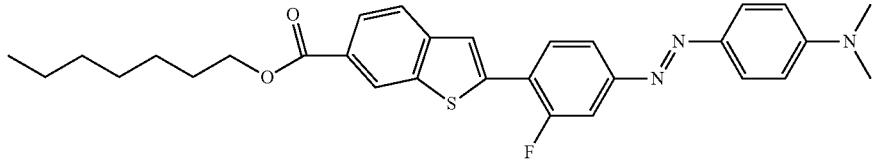
2-181
[Chemical formula 35]
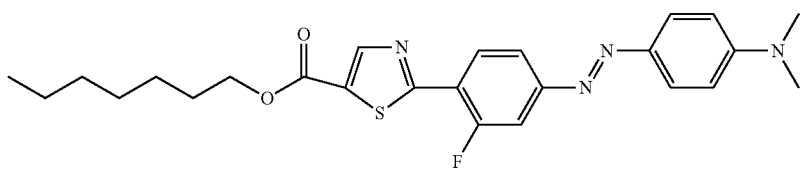
2-182
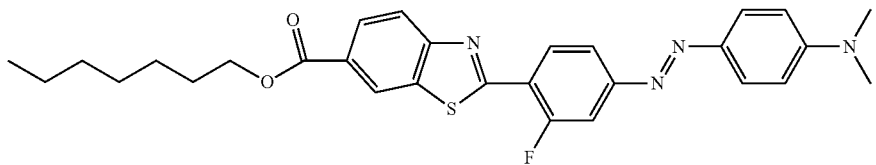
2-183
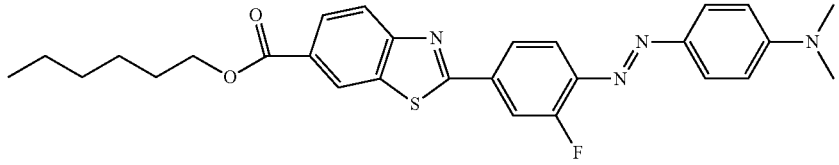
2-184
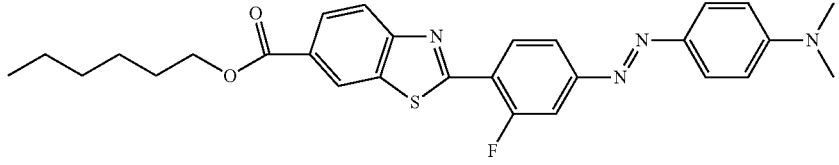
2-185
[Chemical formula 36]
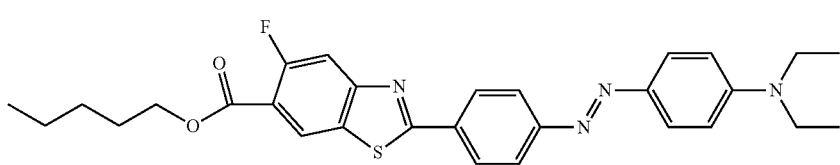
2-186

-continued

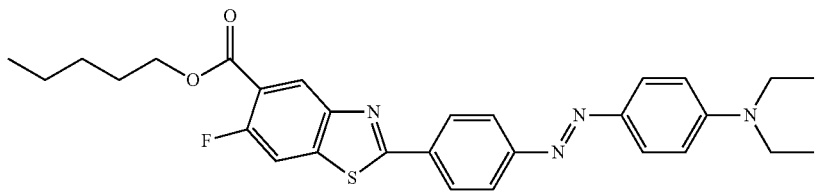

2-187

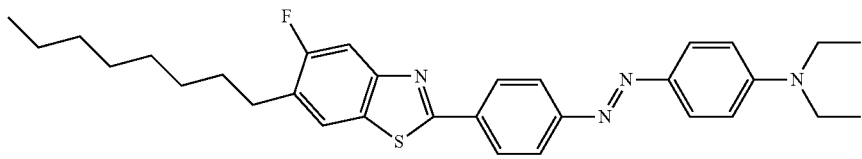

2-188

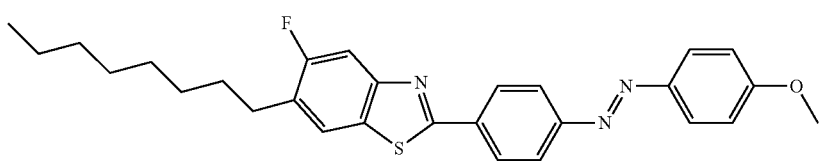

2-189

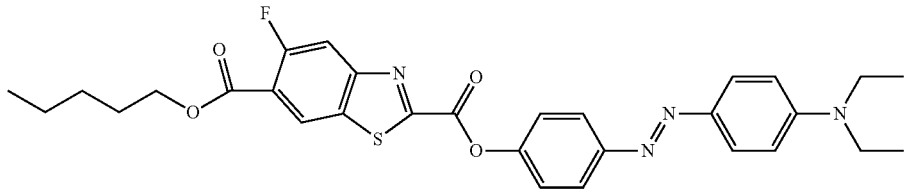

2-190

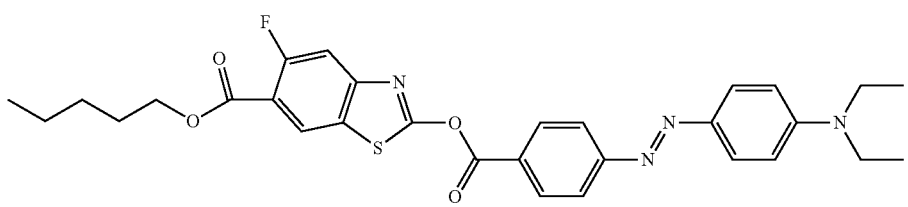

2-191

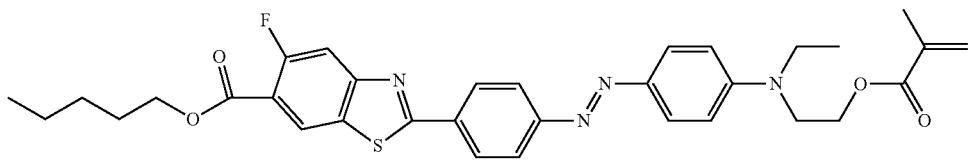

2-192

The compound represented by formula (1) (hereinafter, also referred to as compound (1)) is preferably at least one selected from the group consisting of compounds represented by any of formulae (2-2) to (2-7), (2-9) to (2-30), (2-34) to (2-106), and (2-111) to (2-192) among formulae (2-2) to (2-192), more preferably at least one selected from the group consisting of compounds represented by any of formulae (2-3) to (2-7), (2-9) to (2-30), (2-34) to (2-106), and (2-111) to (2-192), particularly preferably at least one selected from the group consisting of compounds represented by any of formulae (2-4) to (2-7), (2-9) to (2-30), (2-39) to (2-47), (2-49) to (2-83), (2-85) to (2-101), (2-104), and (2-111) to (2-192), still more preferably at least one selected from the group consisting of compounds represented by any of (2-4) to (2-7), (2-9) to (2-30), (2-39) to (2-47), (2-49) to (2-83), (2-85) to (2-101), (2-104), (2-111) to (2-130), (2-132), (2-135), (2-146) to (2-155), and (2-165) to (2-192), and more particularly preferably at least one selected from the group consisting of compounds represented by any of formulae (2-4) to (2-7), (2-9) to (2-30), (2-39) to (2-47), (2-59), (2-67), (2-111) to (2-113), (2-116) to (2-127), (2-146) to (2-153), and (2-165) to (2-192).

The content of the compound represented by formula (1) in the composition is preferably 50 parts by mass or less, more preferably 0.1 parts by mass or more and 10 parts by mass or less, and still more preferably 0.1 parts by mass or more and 5 parts by mass or less based on 100 parts by mass of the solid matter of the composition.

Within the above range, the compound represented by formula (1) can be sufficiently dispersed. As a result, it is possible to efficiently obtain a film containing the compound represented by formula (1) as a forming material and sufficiently suppressing generation of defects. Note that in the present specification, the solid matter refers to the total amount of components excluding a volatile component such as a solvent from the composition.

Method for producing compound (1)

A method for producing the compound represented by formula (1) [hereinafter, also referred to as compound (1)]

will be described. Compound (1) can be produced, for example, from a compound represented by formula (1X) [hereinafter, also referred to as compound (1X)] and a compound represented by formula (1Y) [hereinafter, also referred to as compound (1Y)] by a process represented by the following reaction formula.

[Chemical formula 37]

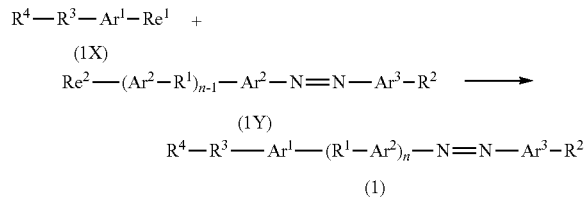

In the reaction formula, $Ar^1$, $Ar^2$, $Ar^3$, $R^1$, $R^2$, $R^3$, $R^4$, and n have the same meanings as those in formula (1). $Re^1$ and $Re^2$ are a combination of groups that can react with each other to form a group or a single bond represented by $R^1$. Examples of the combination of $Re^1$ and $Re^2$ include the following. When $R^1$ is a single bond, examples of the combination of $Re^1$ and $Re^2$ include a combination of a dihydroxyboryl group or a dialkoxyboryl group and a halogen atom. When $R^1$ is —C(=O)O— or —OC(=O)—, examples of the combination of $Re^1$ and $Re^2$ include a combination of a carboxy group and a hydroxy group, a combination of a carbonyl halide group and a hydroxy group, and a combination of a carbonyloxyalkyl group and a hydroxy group. When $R^1$ is —C≡C—, examples of the combination of $Re^1$ and $Re^2$ include a combination of a halogen atom and an ethynyl group (—C≡CH). When $R^1$ is —CH=CH—, examples of the combination of $Re^1$ and $Re^2$ include a combination of a halogen atom and an ethenyl group (—CH=CH$_2$). When $R^1$ is —CH=N— or —N=CH—, examples of the combination of $Re^1$ and $Re^2$ include a combination of a formyl group and an amino group.

In the above reaction formula, the production method using compound (1X) having $R^4$—$R^3$— and compound (1Y) having $R^2$— has been described. However, compound (1) can also be produced by causing a compound obtained by protecting $R^4$—$R^3$— with an appropriate protecting group and a compound obtained by protecting $R^2$— with an appropriate protecting group to react with each other, and then performing an appropriate deprotection reaction.

As reaction conditions for causing compound (1X) and compound (1Y) to react with each other, optimum known conditions can be appropriately selected depending on the kinds of compound (1X) and compound (1Y) to be used.

For example, when $R^1$ is a single bond, $Re^1$ is a dihydroxyboryl group or a dialkoxyboryl group, and $Re^2$ is a halogen atom, for example, the reaction conditions of Suzuki coupling can be used with reference to Netherton, M. R.; Fu, G. C. Org. Lett. 2001, 3 (26), 4295-4298 and the like. As a solvent, a mixed solvent of diethylene glycol dimethyl ether and water is used, and a Pd catalyst such as PdCl$_2$dppf is added in the presence of potassium acetate, followed by heating, whereby compound (1) can be obtained. A reaction temperature is selected depending on the kinds of compound (1X) and compound (1Y), and is, for example, in a range of room temperature to 160° C., and preferably in a range of 60° C. to 150° C. Reaction time is, for example, in a range of 15 minutes to 48 hours. Note that the same applies to a case where $Re^1$ is a halogen atom and $Re^2$ is a dihydroxyboryl group or a dialkoxyboryl group.

Note that compound (1X) in which $Re^1$ is a dihydroxyboryl group or a dialkoxyboryl group can be obtained, for example, by lithiating a bromo group in $Ar^3$ with n-butyllithium or the like and then causing trialkoxyborane to react with the lithiated product to introduce a dihydroxyboryl group or a dialkoxyboryl group. In addition, compound (1Y) in which $Re^2$ is a dihydroxyboryl group or a dialkoxyboryl group can be obtained, for example, by lithiating a bromo group in $Ar^2$ with n-butyllithium or the like and then causing trialkoxyborane to react with the lithiated product to introduce a dihydroxyboryl group or a dialkoxyboryl group.

An azo structure in compound (1Y) can be constructed, for example, by converting an aromatic amine compound having a primary amino group into a diazonium salt with sodium nitrite or the like and diazo-coupling the diazonium salt with an aromatic compound with reference to description of production examples in paragraphs [0220] to of WO-A-2016/136561.

For example, as reaction conditions when $R^1$ is —C(=O)O—, $Re^1$ is a carboxy group, and $Re^2$ is a hydroxy group, a dehydration condensation reaction can be used with reference to Jiang, L.; Lu, X.; Zhang, H.; Jiang, Y.; Na, D. J. Org. Chem. 2009, 74 (3), 4542-4546 and the like. Examples of the reaction conditions include conditions for condensation in a solvent in the presence of an esterification condensing agent. Examples of the solvent include a solvent in which both compound (1X) and compound (1Y) are soluble, such as chloroform. Examples of the esterification condensing agent include 1-ethyl-3-(3-dimethylaminopropyl) carbodiimide hydrochloride (EDC·HCl) and diisopropylcarbodiimide (IPC). Here, it is preferable to further use a base such as N,N-dimethylaminopyridine (DHAP) in combination. A reaction temperature is selected depending on the kinds of compound (1X) and compound (1Y), and is, for example, in a range of −15° C. to 70° C., and preferably in a range of 0° C. to 40° C. Reaction time is, for example, in a range of 15 minutes to 48 hours. Note that the same applies to a case where $R^1$ is —OC(=O)—, $Re^1$ is a hydroxy group, and $Re^2$ is a carboxy group.

For example, when $R^1$ is —C≡C—, $Re^1$ is an ethynyl group (—C≡CH), and $Re^2$ is a halogen group, compound (1) can be synthesized by applying Sonogashira coupling using a Pd catalyst and a Cu catalyst. Note that the same applies to a case where $Re^1$ is a halogen atom and $Re^2$ is an ethynyl group (—C≡CH).

For example, when $R^1$ is —C=C—, $Re^1$ is an ethenyl group (—CH=CH$_2$), and $Re^2$ is a halogen atom, compound (1) can be synthesized by applying a Heck reaction using a Pd catalyst and a phosphorus ligand. Note that the same applies to a case where $Re^1$ is a halogen atom and $Re^2$ is an ethenyl group (—CH=CH$_2$).

For example, when $R^1$ is —CH=N—, $Re^1$ is a formyl group, and $Re^2$ is an amino group, compound (1) can be synthesized by applying a general dehydration condensation reaction. Note that the same applies to a case where $R^1$ is —N=CH—, $Re^1$ is an amino group, and $Re^2$ is a formyl group.

When $R^3$ in the obtained compound (1) is an alkanediyloxycarbonyl group having 2 to 20 carbon atoms, $R^3$ can be changed to another alkanediyloxycarbonyi group having 2 to 20 carbon atoms by a general transesterification reaction. To the transesterification reaction, for example, with reference to Chen, C.-T.; Kuo, J.-H.; Ku, C.-H.; Weng, S.-S.; Liu, C.-Y. J. Org. Chem. 2005, 70 (4), 1328-1339 and the like, a method for heating compound (1) with an alcohol compound in a solvent using TiO(acac)$_2$ (name: bis(2,4-pentanedionato) titanium (IV) oxide) as a Lewis acid catalyst can be applied. As the solvent, a hydrocarbon-based aromatic compound such as xylene or toluene can be used. Note that the other alkanediyloxycarbonyl group having 2 to 20 carbon atoms includes a group having a different alkanediyl group moiety, and may have a different carbon number or different substituents.

The reaction time in the method for producing compound (1) can also be determined by appropriately sampling a reaction mixture in the middle of the reaction and confirming the degree of disappearance of compound (1X) and compound (1Y), the degree of generation of compound (1), and the like by a known analysis means such as liquid chromatography or gas chromatography.

From the reaction mixture after the reaction, compound (1) can be extracted by a known method such as recrystallization, reprecipitation, extraction, or various kinds of chromatography, or by appropriately combining these operations.

The composition may further contain another dye compound other than the compound represented by formula (1), for example, at least one dichroic dye. Examples of the other dye compound include an azo dye such as a monoazo dye, a bisazo dye, a trisazo dye, a tetrakis azo dye, or a stilbene azo dye, and at least one selected from the group consisting of these dyes is preferable. The composition may contain the other dye compound singly or in combination of two or more kinds thereof. For example, when the composition is used as an application type polarizing plate material, the other dye compound contained in the composition preferably has a maximum absorption wavelength in a wavelength range different from that of the compound represented by formula (1). For example, when the composition is used as an application type polarizing plate material, the composition preferably contains three or more kinds of dichroic dyes in combination, including the compound represented by formula (1), and more preferably contains three or more kinds of azo dyes in combination. When the composition contains three or more kinds of dye compounds having different maximum absorption wavelengths in combination, for example, absorption can be obtained in the entire visible light region by a film formed from the composition.

When the composition contains the other dye compound, the content of the other dye compound is preferably 50 parts by mass or less, more preferably 0.1 parts by mass or more and 10 parts by mass or less, and still more preferably 0.1 parts by mass or more and 5 parts by mass or less based on 100 parts by mass of the solid matter of the composition. Within the above range, the other dye compound can be dispersed sufficiently.

The composition contains at least one of a polymerizable liquid crystal compound and a liquid crystalline polymer compound in addition to the compound represented by formula (1). The composition may contain both a polymerizable liquid crystal compound and a liquid crystalline polymer compound. Two or more kinds of polymerizable liquid crystal compounds and two or more kinds of liquid crystalline polymer compounds may be contained in the composition. When the composition contains at least one of a polymerizable liquid crystal compound and a liquid crystalline polymer compound, it is possible to constitute a composition in which compound (1) is dispersed in the polymerizable liquid crystal compound and the liquid crystalline polymer compound.

The liquid crystalline polymer compound may constitute a thermotropic liquid crystal type polymer or a lyotropic liquid crystal type polymer. The liquid crystalline polymer compound preferably constitutes a thermotropic liquid crystal type polymer in that the liquid crystalline polymer compound constituting a thermotropic liquid crystal type polymer can accurately control a film thickness.

The liquid crystal is classified into a smectic liquid crystal, a nematic liquid crystal, and a cholesteric liquid crystal depending on the structure of a molecular arrangement in a liquid crystal state. Among these liquid crystals, a smectic liquid crystal is preferably used in an application for a polarizing film. Therefore, the polymerizable liquid crystal compound is preferably a polymerizable smectic liquid crystal compound, and the liquid crystalline polymer compound is preferably a smectic liquid crystalline polymer compound.

By using a polymerizable liquid crystal compound exhibiting smectic liquid crystallinity and a polymer compound exhibiting smectic liquid crystallinity, a polarizing film having a high degree of orientation order can be formed. The liquid crystal state exhibited by the polymerizable liquid crystal compound and the liquid crystalline polymer compound is preferably a smectic phase (smectic liquid crystal state), and more preferably a high-order smectic phase (high-order smectic liquid crystal state) from a viewpoint of being able to achieve a higher degree of orientation order. Here, the high-order smectic phase means a smectic B phase, a smectic D phase, a smectic E phase, a smectic F phase, a smectic G phase, a smectic H phase, a smectic I phase, a smectic J phase, a smectic K phase, and a smectic L phase. Among these phases, a smectic B phase, a smectic F phase, and a smectic I phase are more preferable. A polarizing film having a high degree of orientation order obtains a Bragg peak derived from a high-order structure such as a hexatic phase or a crystal phase in X-ray diffraction measurement. The Bragg peak means a peak derived from a plane periodic structure of molecular orientation.

A periodic interval (order period) of a polarizing film obtained from the composition is preferably 0.3 nm or more and 0.6 nm or less. The polymerizable liquid crystal compound or the liquid crystalline polymer compound may be a polymerizable smectic liquid crystal compound or a smectic liquid crystalline polymer compound that exhibits a Bragg peak derived from a high-order structure in X-ray diffraction measurement.

The compound represented by formula (1) can exhibit high dichroism even in a state of being dispersed between dense molecular chains formed from at least one of a polymerizable liquid crystal compound exhibiting smectic liquid crystallinity and a smectic liquid crystalline polymer compound. Therefore, a composition containing the compound represented by formula (1) and at least one of a polymerizable liquid crystal compound and a liquid crystalline polymer compound, particularly at least one of a polymerizable liquid crystal compound exhibiting a smectic liquid crystal phase and a smectic liquid crystalline polymer compound can provide a polarizing film having a high dichroic ratio.

<Polymerizable Liquid Crystal Compound>

The polymerizable liquid crystal compound is a compound having at least one polymerizable group in a molecule thereof and capable of exhibiting a liquid crystal phase by being orientated. The polymerizable liquid crystal compound is preferably a compound capable of exhibiting a liquid crystal phase by being orientated alone.

The polymerizable group means a group involved in a polymerization reaction, and is preferably a photopolymerizable group. Here, the polymerizable group refers to a group that can be involved in a polymerization reaction by an active radical, an acid, or the like generated from a polymerization initiator described later. Examples of the polymerizable group include a vinyl group, a vinyloxy group, a 1-chlorovinyl group, an isopropenyl group, a 4-vinylphenyl group, an acryloyloxy group, a methacryloyloxy group, an oxiranyl group, and an oxetanyl group. Among these groups, the polymerizable group is preferably at least one selected from the group consisting of an acryloyloxy group, a methacryloyloxy group, a vinyloxy group, an oxiranyl group, and an oxetanyl group, and more preferably an acryloyloxy group.

The polymerizable liquid crystal compound is not particularly limited as long as the polymerizable liquid crystal compound is a liquid crystal compound having at least one polymerizable group and preferably exhibiting smectic liquid crystallinity, and a known polymerizable liquid crystal compound can be used. Specific preferable examples of the polymerizable liquid crystal compound include a compound represented by the following formula (A) (hereinafter, also referred to as "polymerizable liquid crystal compound (A)"):

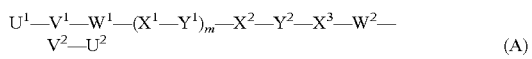
(A)

wherein m is an integer of 1 to 3; $X^1$, $X^2$, and $X^3$ each independently represent a divalent aromatic group or a divalent alicyclic hydrocarbon group; when m is 2 or 3, a plurality of $X^1$s may be the same as or different from each other; at least three selected from the group consisting of $X^1$, $X^2$, and $X^3$ each represent a divalent hydrocarbon six-membered ring group; $Y^1$, $Y^2$, $W^1$, and $W^2$ each independently represent a single bond or a divalent linking group; when m is 2 or 3, a plurality of $Y^1$s may be the same as or different from each other; $V^1$ and $V^2$ each independently represent an alkanediyl group having 1 to 20 carbon atoms and optionally having a substituent; at least one of —$CH_2$-s constituting the alkanediyl group may be substituted with —O—, —CO—, —S—, or —NH—; and $U^1$ and $U^2$ each independently represent a polymerizable group or a hydrogen atom, and at least one of $U^1$ and $U^2$ represents a polymerizable group.

Examples of the divalent aromatic group in $X^1$, $X^2$, and $X^3$ include a 1,4-phenylene group and a 1,4-naphthylene group. Examples of the divalent alicyclic hydrocarbon group include a cyclohexane-1,4-diyl group. At least one of the divalent aromatic group and the divalent alicyclic hydrocarbon group in $X^1$, $X^2$, and $X^3$ optionally has a substituent. Examples of the substituent include an alkyl group having 1 to 4 carbon atoms, such as a methyl group, an ethyl group, or a n-butyl group, a cyano group, and a halogen atom. At least one of —$CH_2$-s constituting the divalent alicyclic hydrocarbon group may be substituted with —O—, —S—, or —NR—. Here, R represents an alkyl group having 1 to 6 carbon atoms or a phenyl group.

At least three selected from the group consisting of $X^1$, $X^2$, and $X^3$ each represent a divalent hydrocarbon six-membered ring group. Examples of the divalent hydrocarbon six-membered ring group include a 1,4-phenylene group optionally having a substituent and a cyclohexane-1,4-diyl group optionally having a substituent.

The divalent aromatic group in $X^1$, $X^2$, and $X^3$ is preferably a 1,4-phenylene group optionally having a substituent, and more preferably an unsubstituted 1,4-phenylene group.

In addition, the divalent alicyclic hydrocarbon group is preferably a cyclohexane-1,4-diyl group optionally having a substituent, more preferably a trans-cyclohexane-1,4-diyl group optionally having a substituent, and still more preferably an unsubstituted trans-cyclohexane-1,4-diyl group.

$Y^1$ and $Y^2$ each independently represent a single bond or a divalent linking group. The divalent linking group is, for example, at least one selected from the group consisting of —$CH_2CH_2$—, —$CH_2O$—, —(C=O)O—, —O(C=O)O—, —N=N—, —$CR^a$=$CR^b$—, —C≡C—, and —$CR^a$=N—. Here, $R^a$ and $R^b$ each independently represent a hydrogen atom or an alkyl group having 1 to 4 carbon atoms. $Y^1$ is preferably —$CH_2CH_2$—, —(C=O)O—, or a single bond. $Y^2$ is preferably —$CH_2CH_2$— or —$CH_2O$—.

$W^1$ and $W^2$ each independently represent a single bond or a divalent linking group. The divalent linking group is, for example, at least one selected from the group consisting of —O—, —S—, —(C=O)O—, and —O(C=O)O—. $W^1$ and $W^2$ are each independently preferably a single bond or —O—.

$V^1$ and $V^2$ each independently represent an alkanediyl group having 1 to 20 carbon atoms and optionally having a substituent. At least one of —$CH_2$-s constituting the alkanediyl group may be substituted with —O—, —CO—, —S—, or —NH—.

Examples of the alkanediyl group represented by $V^1$ and $V^2$ include a methylene group, an ethylene group, a propane-1,3-diyl group, a butane-1,3-diyl group, a butane-1,4-diyl group, a pentane-1,5-diyl group, a hexane-1,6-diyl group, a heptane-1,7-diyl group, an octane-1,8-diyl group, a decane-1,10-diyl group, a tetradecane-1,1-diyl group, and an icosane-1,20-diyl group. $V^1$ and $V^2$ are each preferably an alkanediyl group having 2 to 12 carbon atoms, and more preferably an alkanediyl group having 6 to 12 carbon atoms.

Examples of the substituent optionally included in the alkanediyl group having 1 to 20 carbon atoms and optionally having a substituent include a cyano group and a halogen atom. The alkanediyl group is preferably an alkanediyl group having no substituent, and more preferably a linear alkanediyl group having no substituent.

$U^1$ and $U^2$ each independently represent a polymerizable group or a hydrogen atom, and at least one of $U^1$ and $U^2$ represents a polymerizable group. $U^1$ and $U^2$ are preferably polymerizable groups. $U^1$ and $U^2$ are preferably both polymerizable groups, and preferably both radically polymerizable groups. The polymerizable group represented by $U^1$ and the polymerizable group represented by $U^2$ may be different from each other, but are preferably the same kind of group. Examples of the polymerizable groups in $U^1$ and $U^2$ include polymerizable groups similar to those exemplified above as the polymerizable group included in the polymerizable liquid crystal compound. Among these groups, each of the polymerizable groups represented by $U^1$ and $U^2$ is preferably at least one selected from the group consisting of a vinyloxy group, an acryloyloxy group, a methacryloyloxy group, an oxiranyl group, and an oxetanyl group, and more preferably an acryloyloxy group.

Specific examples of polymerizable liquid crystal compound (A) include compounds represented by the following formulae (A-1) to (A-25). When polymerizable liquid crystal compound (A) has a cyclohexane-1,4-diyl group, the cyclohexane-1,4-diyl group is preferably a trans type.

[Chemical formula 38]
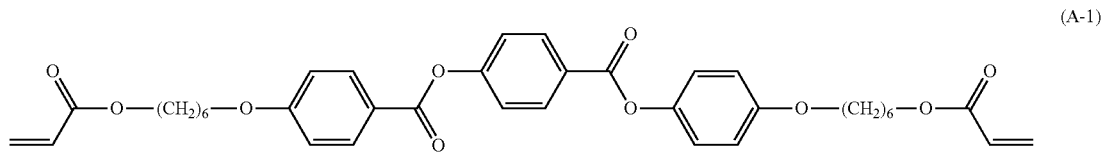 (A-1)
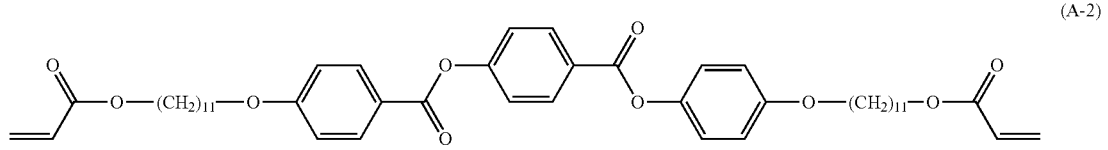 (A-2)
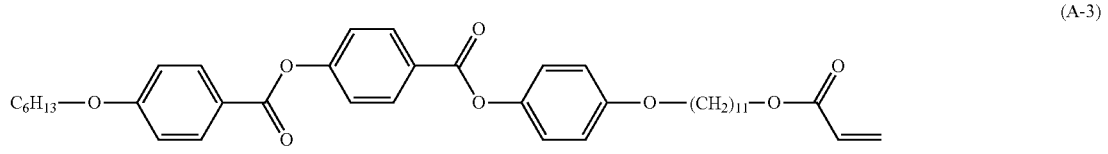 (A-3)
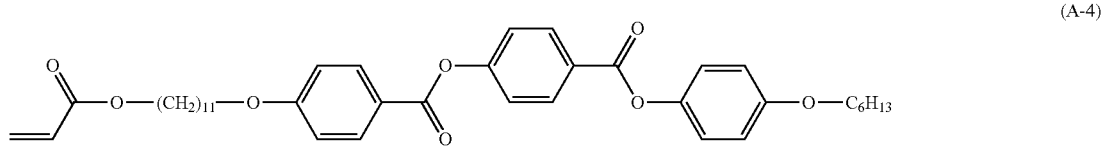 (A-4)
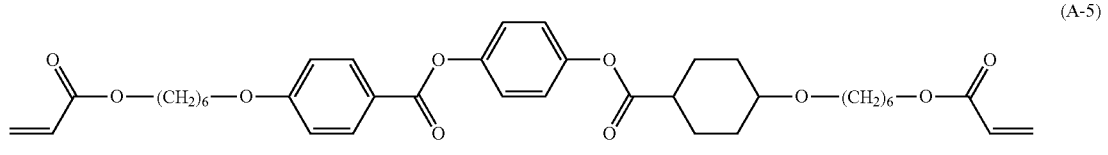 (A-5)
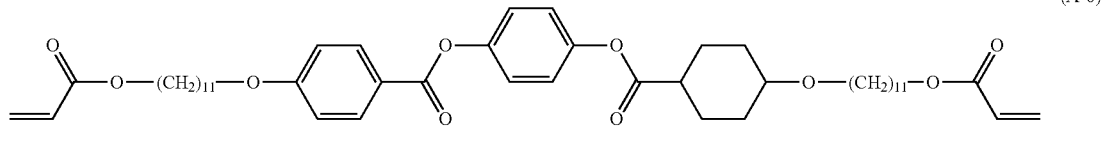 (A-6)
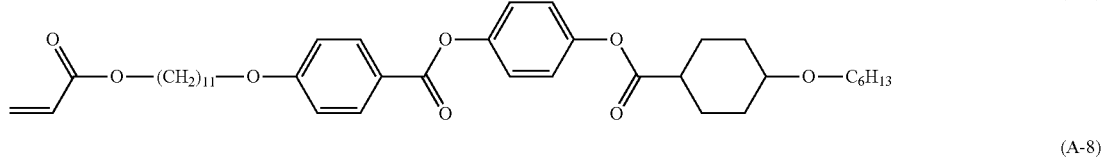 (A-7)
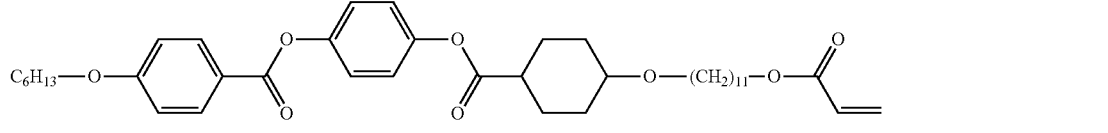 (A-8)
[Chemical formula 39]
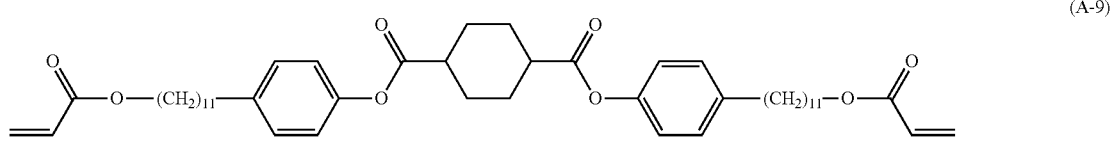 (A-9)
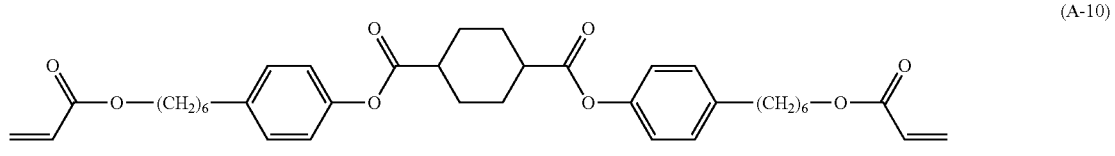 (A-10)

-continued
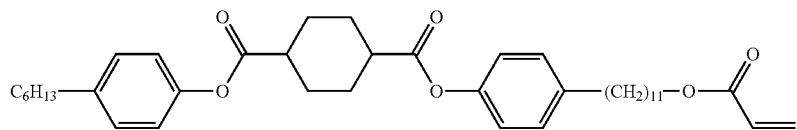
(A-11)
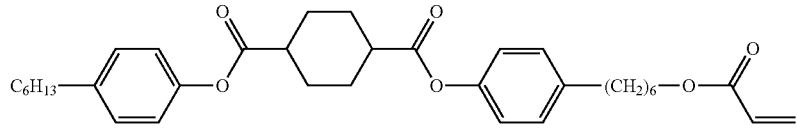
(A-12)
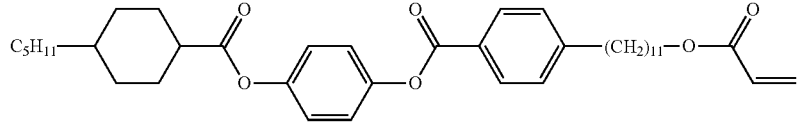
(A-13)
[Chemical formula 40]
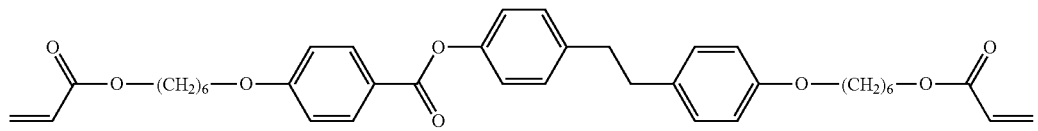
(A-14)
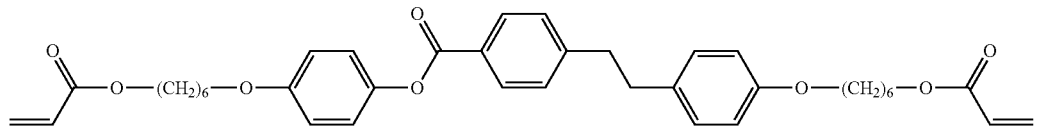
(A-15)
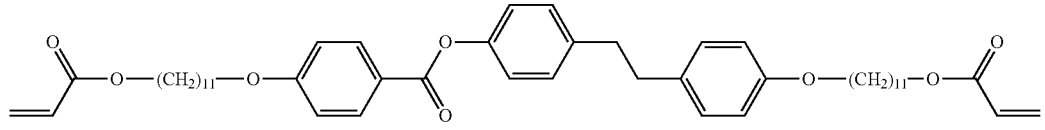
(A-16)
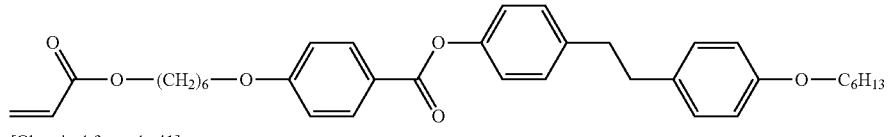
(A-17)
[Chemical formula 41]
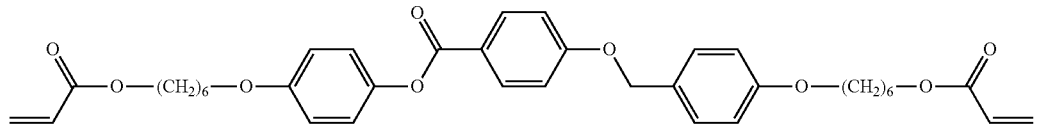
(A-18)
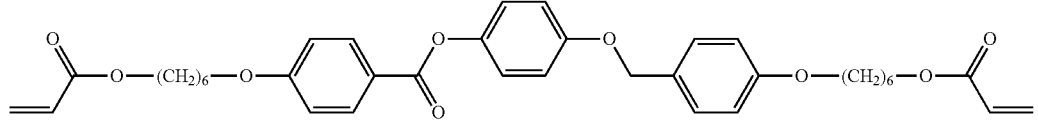
(A-19)
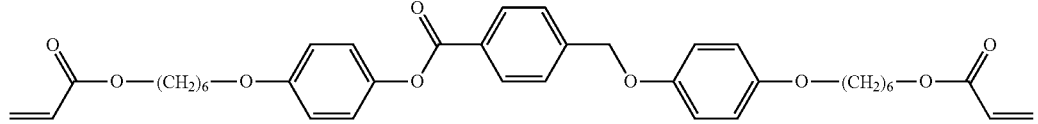
(A-20)
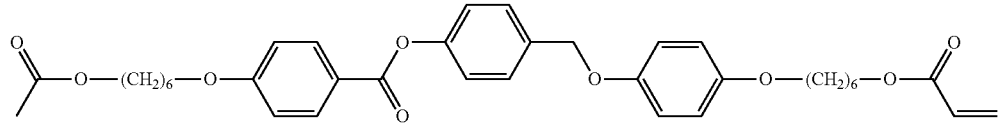
(A-21)

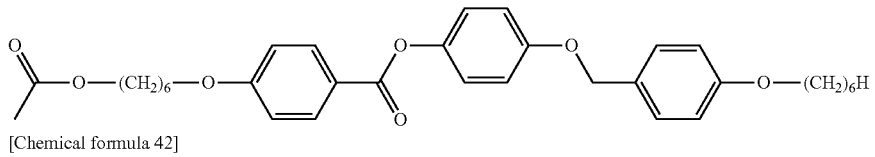

(A-22)

[Chemical formula 42]

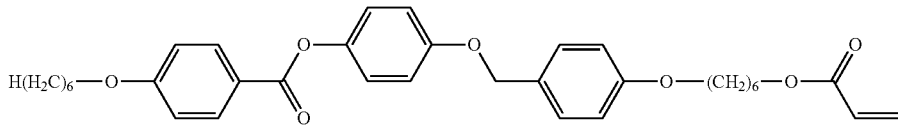

(A-23)

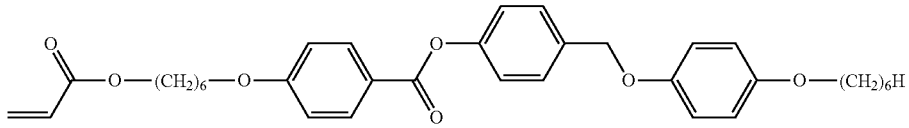

(A-24)

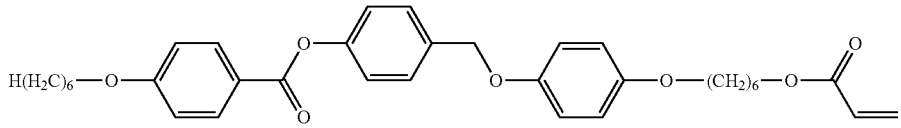

(A-25)

Among these compounds, polymerizable liquid crystal compound (A) is preferably at least one selected from the group consisting of compounds represented by any of formulae (A-2), (A-3), (A-4), (A-5), (A-6), (A-7), (A-8), (A-13), (A-14), (A-15), (A-16), and (A-17). Polymerizable liquid crystal compounds (A) may be used singly or in combination of two or more kinds thereof.

Polymerizable liquid crystal compound (A) can be produced, for example, by a method described in a known document such as Lub et al. Recl. Tray. Chim. Pays-Bas, 115,321-328(1996) or JP-B2-4719156.

<Liquid Crystalline Polymer Compound>

The liquid crystalline polymer compound may be a compound obtained by polymerizing the polymerizable liquid crystal compound (hereinafter, also referred to as a polymer of a polymerizable liquid crystal compound), or may be another liquid crystalline polymer compound, but is preferably a compound obtained by polymerizing the polymerizable liquid crystal compound.

As the polymer of the polymerizable liquid crystal compound, two or more kinds of the polymerizable liquid crystal compounds may be used as raw material monomers. In addition, the polymer of the polymerizable liquid crystal compound may contain another monomer other than the polymerizable liquid crystal compound as a raw material monomer.

The content ratio of the polymerizable liquid crystal compound in the polymer of the polymerizable liquid crystal compound is usually 1 mol % or more and 100 mol % or less based on the total amount of constituent units derived from the polymerizable liquid crystal compound constituting the polymer of the polymerizable liquid crystal compound, and is preferably 30 mol % or more and 100 mol % or less, more preferably 50 mol % or more and 100 mol % or less, and still more preferably 80 mol % or more and 100 mol % or less from a viewpoint of enhancing the orientation of the polymer of the polymerizable liquid crystal compound.

Examples of the other liquid crystalline polymer compound include a polymer compound having a liquid crystalline group. Examples of the polymer compound serving as a mother skeleton include: a polyolefin such as polyethylene or polypropylene; a cyclic olefin resin such as a norbornene polymer; polyalkylene ether and polyvinyl alcohol; a polymethacrylate; and a polyacrylate. These polymer compounds each have a liquid crystalline group. Among these compounds, a polymethacrylate and a polyacrylate each having a liquid crystalline group are preferable.

The other liquid crystalline polymer compound may contain two or more kinds of liquid crystalline groups. The liquid crystalline group may be contained in a main chain of the polymer compound serving as the mother skeleton, may be contained in a side chain of the polymer compound serving as the mother skeleton, or may be contained in both the main chain and the side chain of the polymer compound serving as the mother skeleton. Examples of the liquid crystalline group include a group formed by removing one hydrogen atom from a compound having at least two hydrocarbon six-membered ring structures, and a group formed by removing two hydrogen atoms from the compound.

The content ratio of the liquid crystalline group in the other liquid crystalline polymer compound is usually 1 mol % or more and 100 mol % or less based on the total amount of constituent units constituting the polymer compound serving as the mother skeleton of the other liquid crystalline polymer compound, and preferably 30 mol % or more and 100 mol % or less, more preferably 50 mol % or more and 100 mol or less, and still more preferably 80 mol % or more and 100 mol % or less from a viewpoint of enhancing the orientation of the other liquid crystalline polymer compound.

When two or more kinds of polymerizable liquid crystal compounds are used in combination in the composition, at least one of the polymerizable liquid crystal compounds is preferably polymerizable liquid crystal compound (A), and two or more kinds of the polymerizable liquid crystal compounds are each more preferably polymerizable liquid crystal compound (A). By using two or more kinds of polymerizable liquid crystal compounds in combination, the liquid crystal phase may be temporarily retained even at a temperature equal to or lower than a liquid crystal-crystal phase transition temperature. The total content of polymerizable liquid crystal compound (A) contained in the composition is preferably 40% by mass or more, and more preferably 60% by mass or more based on the total mass of all the polymerizable liquid crystal compounds in the composition, and all the polymerizable liquid crystal compounds may be each polymerizable liquid crystal compound (A). When the content of polymerizable liquid crystal compound (A) is within the above range, the polymerizable liquid crystal compounds are likely to be aligned with a high degree of orientation order, and the compound represented by formula (1) is orientated along the polymerizable liquid crystal compounds, whereby a polarizing film having excellent polarizing performance can be obtained.

The total content ratio of a polymerizable liquid crystal compound and a liquid crystalline polymer compound in the composition is, for example, 50 parts by mass or more, preferably 70 parts by mass or more and 99.9 parts by mass or less, more preferably 70 parts by mass or more and 99.5 parts by mass or less, still more preferably 80 parts by mass or more and 99 parts by mass or less, particularly preferably 80 parts by mass or more and 94 parts by mass or less, and still more preferably 80 parts by mass or more and 90 parts by mass or less based on 100 parts by mass of the solid matter of the composition from a viewpoint of enhancing the orientation of the polymerizable liquid crystal compound and the liquid crystalline polymer compound.

The content of compound (1) in the composition is usually 0.1 parts by mass or more and 50 parts by mass or less, preferably 0.1 parts by mass or more and 20 parts by mass or less, more preferably 0.1 parts by mass or more and 10 parts by mass or less, and still more preferably 0.1 parts by mass or more and 5 parts by mass or less based on 100 parts by mass of the total amount of the polymerizable liquid crystal compound and the liquid crystalline polymer compound. When the content of compound (1) is 50 parts by mass or less based on the total amount of a polymerizable liquid crystal compound and a liquid crystalline polymer compound, there is a tendency that it is possible to obtain a polarizing film having a small orientation disorder of the polymerizable liquid crystal compound, the liquid crystalline polymer compound, and compound (1) and having a high degree of orientation order.

Since the composition contains compound (1) and at least one of a polymerizable liquid crystal compound and a liquid crystalline polymer compound, the dichroic ratio of the composition is less likely to decrease even when UV exposure is used in an intermediate process for producing a host-guest type polarizing plate using the composition. Therefore, photocuring can be used for a processing process, and limitations on the process can be reduced.

<Polymer Compound>

The composition may further contain a polymer compound in addition to compound (1), a polymerizable liquid crystal compound, and a liquid crystalline polymer compound. When the composition contains the polymer compound, compound (1) may be easily dispersed in the composition. The polymer compound that can be contained in the composition is not particularly limited as long as the polymer compound can easily disperse compound (1). An acrylic polymer such as polymethyl methacrylate (PMMA) is preferable from a viewpoint of easily dispersing compound (1) uniformly. In addition, the polymer compound may be a polymer compound obtained by polymerizing the above-described polymerizable liquid crystal compound.

The polymer compound has a weight average molecular weight of, for example, 10,000 or more and 200,000 or less, preferably 20,000 or more and 150,000 or less in terms of polystyrene.

When the composition contains a polymer compound, the content of the polymer compound can be appropriately selected depending on a purpose and the like. The content of the polymer compound is preferably 10 parts by mass or less, more preferably 5.0 parts by mass or less, and still more preferably 3.0 parts by mass or less based on 100 parts by mass of the solid matter of the composition.

The composition preferably further contains a liquid medium such as a solvent and a polymerization initiator, and may further contain a photosensitizer, a polymerization inhibitor, a leveling agent, and the like as necessary.

<Solvent>

The solvent is preferably a solvent capable of completely dissolving compound (1), a polymerizable liquid crystal compound, a liquid crystalline polymer compound, and a polymer compound. In addition, the solvent is preferably inert to a polymerization reaction of the polymerizable liquid crystal compound.

Examples of the solvent include: an alcohol solvent such as methanol, ethanol, ethylene glycol, isopropyl alcohol, propylene glycol, ethylene glycol methyl ether, ethylene glycol butyl ether, or propylene glycol monomethyl ether; an ester solvent such as ethyl acetate, butyl acetate, ethylene glycol methyl ether acetate, γ-butyrolactone, propylene glycol methyl ether acetate, or ethyl lactate; a ketone solvent such as acetone, methyl ethyl ketone, cyclopentanone, cyclohexanone, 2-heptanone, or methyl isobutyl ketone; an aliphatic hydrocarbon solvent such as pentane, hexane, or heptane; an aromatic hydrocarbon solvent such as toluene or xylene; a nitrile solvent such as acetonitrile; an ether solvent such as tetrahydrofuran or dimethoxyethane; and a chlorine-containing solvent such as chloroform or chlorobenzene. These solvents may be used singly or in combination of two or more kinds thereof.

When the composition contains the solvent, the content ratio of the solvent is preferably 50% by mass or more and 98% by mass or less based on the total amount of the composition. In other words, the content ratio of the solid matter in the composition is preferably 2% by mass or more and 50% by mass or less. When the solid matter is 50% by mass or less, the viscosity of the composition decreases, a film obtained from the composition, for example, the thickness of the film is substantially uniform, and unevenness tends to be hardly generated in the film. The content ratio of the solid matter can be determined in consideration of the thickness of a film to be produced.

<Polymerization Initiator>

The polymerization initiator is a compound capable of initiating a polymerization reaction of a polymerizable liquid crystal compound. The polymerization initiator is preferably a photopolymerization initiator in that the photopolymerization initiator can initiate a polymerization reaction under lower temperature conditions. Specific examples of the photopolymerization initiator include a photopolymerization initiator capable of generating an active radical or an acid by action of light. Among these photopolymerization initiators, a photopolymerization initiator that generates a radical by action of light is preferable.

Examples of the polymerization initiator include a benzoin compound, a benzophenone compound, an alkylphenone compound, an acylphosphine oxide compound, a triazine compound, an iodonium salt, and a sulfonium salt. The polymerization initiator can be appropriately selected from known polymerization initiators depending on a purpose and the like. In addition, the polymerization initiator may be used singly or in combination of two or more kinds thereof.

Examples of the benzoin compound include benzoin, benzoin methyl ether, benzoin ethyl ether, benzoin isopropyl ether, and benzoin isobutyl ether.

Examples of the benzophenone compound include benzophenone, methyl o-benzoylbenzoate, 4-phenylbenzophenone, 4-benzoyl-4'-methyldiphenylsulfide, 3,3,4,4-tetra(tert-butylperoxycarbonyl) benzophenone, and 2,4,6-trimethylbenzophenone.

Examples of the alkylphenone compound include oligomers of diethoxyacetophenone, 2-methyl-2-morpholino-1-(4-methylthiophenyl) propan-1-one, 2-benzyl-2-dimethyl-amino-1-(4-morpholinophenyl) butan-1-one, 2-hydroxy-2-methyl-1-phenylpropan-1-one, 1,2-diphenyl-2,2-dimethoxyethan-1-one, 2-hydroxy-2-methyl-1-[4-(2-hydroxyethoxy) phenyl] propan-1-one, 1-hydroxycyclohexylphenyl ketone, and 2-hydroxy-2 methyl-1-[4-(1-methylvinyl) phenyl] propan-1-one.

Examples of the acylphosphine oxide compound include 2,4,6-trimethylbenzoyldiphenylphosphine oxide and bis(2, 4,6-trimethylbenzoyl) phenylphosphine oxide.

Examples of the triazine compound include 2,4-bis(trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-(4-methoxystyryl)-1,3,5-triazine, 2,4-bis(trichloromethyl)-6-[2-(5-methylfuran-2-yl) ethenyl]-1,3,5-triazine, 2,4-bis(trichloromethyl)-6-[2-(furan-2-yl) ethenyl]-1,3,5-triazine, 2,4-bis(trichloromethyl)-6-[2-(4-diethylamino-2-methylphenyl) ethenyl]-1,3,5-triazine, and 2,4-bis(trichloromethyl)-6-[2-(3,4-dimethoxyphenyl) ethenyl]-1,3,5-triazine.

Examples of the iodonium salt and the sulfonium salt include salts represented by the following formulae.

[Chemical formula 43]

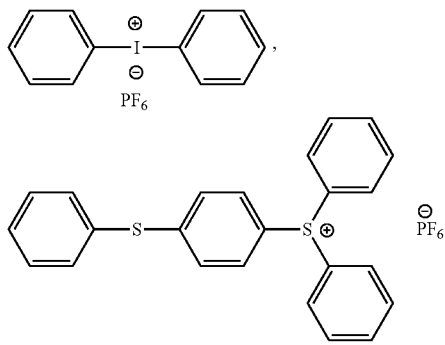

As the polymerization initiator, a commercially available product can also be used. Examples of the commercially available polymerization initiator include: Irgacure (registered trademark) 907, "Irgacure (registered trademark) 184", "Irgacure (registered trademark) 651", "Irgacure (registered trademark) 819", "Irgacure (registered trademark) 250", and "Irgacure (registered trademark) 369" (manufactured by BASF Japan Ltd.); "SEIKUOL (registered trademark) BZ", "SEIKUOL (registered trademark) Z", and "SEIKUOL (registered trademark) BEE" (manufactured by Seiko Chemical Co., Ltd.); "Kayacure (registered trademark) BP100" and "Kayacure (registered trademark) UVI-6992" (manufactured by The Dow Chemical Company); "ADEKA OPTOMER SP-152" and "ADEKA OPTOMER SP-170" (manufactured by ADEKA Corporation); "TAZ-A" and "TAZ-PP" (manufactured by Nihon SiberHegner K. K.); and "TAZ-104" (manufactured by Sanwa Chemical Co., Ltd.).

When the composition contains a polymerization initiator, the content of the polymerization initiator only needs to be appropriately determined depending on the kind and amount of a polymerizable liquid crystal compound contained in the composition. The content of the polymerization initiator is, for example, 0.001 parts by mass or more, 0.01 parts by mass or more, 0.1 parts by mass or more, or 0.5 parts by mass or more, and is, for example, 30% by mass or less, 10% by mass or less, or 8% by mass or less based on 100 parts by mass of the polymerizable liquid crystal compound. In addition, the content of the polymerization initiator is preferably 0.001 parts by mass or more and 30 parts by mass or less, more preferably 0.01 parts by mass or more and 10 parts by mass or less, and still more preferably 0.1 parts by mass or more and 8 parts by mass or less based on 100 parts by mass of the polymerizable liquid crystal compound. When the content of the polymerization initiator is within the above range, the polymerizable liquid crystal compound can be polymerized without causing orientation disorder for the polymerizable liquid crystal compound.

<Photosensitizer>

When the composition contains a photopolymerization initiator, the composition may preferably contain at least one photosensitizer. When the composition contains a photopolymerization initiator and a photosensitizer, a polymerization reaction of a polymerizable liquid crystal compound tends to be further promoted. Examples of the photosensitizer include a xanthone compound such as xanthone or thioxanthone (for example, 2,4-diethylthioxanthone or 2-isopropylthioxanthone); an anthracene compound such as anthracene or an alkoxy group-containing anthracene (for example, dibutoxyanthracene); and phenothiazine and rubrene. The photosensitizer can be used singly or in combination of two or more kinds thereof.

When the composition contains a photosensitizer, the content of the photosensitizer in the composition only needs to be appropriately determined depending on the kinds and amounts of a photopolymerization initiator and a polymerizable liquid crystal compound. The content of the photosensitizer in the composition is preferably 0.1 parts by mass or more and 30 parts by mass or less, more preferably 0.5 parts by mass or more and 10 parts by mass or less, and still more preferably 0.5 parts by mass or more and 8 parts by mass or less based on 100 parts by mass of the polymerizable liquid crystal compound.

<Polymerization Inhibitor>

The composition may contain at least one polymerization inhibitor. Examples of the polymerization inhibitor include a radical scavenger such as hydroquinone, an alkoxy group-containing hydroquinone, an alkoxy group-containing catechol (for example, butylcatechol), pyrogallol, or a 2,2,6,6-tetramethyl-1-piperidinyloxy radical; a thiophenol; and a β-Naphthylamine and a β-naphthol.

When the composition contains a polymerization inhibitor, the degree of progress of a polymerization reaction of a polymerizable liquid crystal compound can be controlled.

When the composition contains a polymerization inhibitor, the content of the polymerization inhibitor in the composition is preferably 0.1 parts by mass or more and 30 parts by mass or less, more preferably 0.5 parts by mass or more and 10 parts by mass or less, and still more preferably 0.5 parts by mass or more and 8 parts by mass or less based on 100 parts by mass of the polymerizable liquid crystal compound.

<Leveling Agent>

The composition may contain at least one leveling agent. The leveling agent has a function of adjusting fluidity of the composition and making a coating film obtained by applying the composition flatter, and specific examples of the leveling agent include a surfactant. The leveling agent is preferably at least one selected from the group consisting of a leveling agent containing a polyacrylate compound as a main component and a leveling agent containing a fluorine atom-containing compound as a main component. The leveling agent can be used singly or in combination of two or more kinds thereof.

Examples of the leveling agent containing a polyacrylate compound as a main component include "BYK-350", "BYK-352", "BYK-353", "BYK-354", "BYK-355", "BYK-358N", "BYK-361N", "BYK-380", "BYK-381", and"BYK-392" (BYK Chemie).

Examples of the leveling agent containing a fluorine atom-containing compound as a main component include "Megafac (registered trademark) R-08", "Megafac R-30", "Megafac R-90", "Megafac F-410", "Megafac F-411", "Megafac F-443", "Megafac F-445", "Megafac F-470", "Megafac F-471", "Megafac F-477", "Megafac F-479", "Megafac F-482", and "Megafac F-483" (DIC Corporation); "SURFLON (registered trademark) S-381", "SURFLON S-382", "SURFLON S-383", "SURFLON S-393", "SURFLON SC-101", "SURFLON SC-105", "SURFLON KH-40", and "SURFLON SA-100" (AGC Seimi Chemical Co., Ltd.); "E1830" and "E5844" (DAIKIN FINE CHEMICAL LABORATORIES); and "F-top EF301", "F-top EF303", "F-top EF351", and"F-top EF352" (manufactured by Mitsubishi Materials Electronic Chemicals Co., Ltd.).

When the composition contains a leveling agent, the content of the leveling agent is preferably 0.05 parts by mass or more and 5 parts by mass or less, and more preferably 0.05 parts by mass or more and 3 parts by mass or less based on 100 parts by mass of the total amount of a polymerizable liquid crystal compound and a liquid crystalline polymer compound. When the content of the leveling agent is within the above range, the polymerizable liquid crystal compound and the liquid crystalline polymer compound are easily horizontally orientated, unevenness tends to be hardly generated, and a smoother film, for example, a polarizing film tends to be obtained.

When the content of the leveling agent is within the above range, the polymerizable liquid crystal compound and the liquid crystalline polymer compound are easily horizontally orientated, and an obtained film tends to be smoother. When the content of the leveling agent based on the polymerizable liquid crystal compound and the liquid crystalline polymer compound exceeds the above range, unevenness tends to be easily generated in an obtained film.

<Antioxidant>

The composition may contain an antioxidant. The antioxidant is not particularly limited as long as the composition can exhibit the effect of the present invention, and a known antioxidant can be used. The antioxidant is preferably a so-called primary antioxidant that traps radicals and has an action of preventing automatic oxidation from a viewpoint of having a high effect of suppressing photodegradation of the compound represented by formula (1). Therefore, the antioxidant contained in the composition is more preferably at least one selected from the group consisting of a phenolic compound, an alicyclic alcohol-based compound, and an amine-based compound. The antioxidant may be used singly or in combination of two or more kinds thereof.

The content of the antioxidant in the composition is preferably 0.1 parts by mass or more and 15 parts by mass or less, more preferably 0.3 parts by mass or more, still more preferably 0.5 parts by mass or more, more preferably 12 parts by mass or less, and still more preferably 10 parts by mass or less based on 100 parts by mass of the composition. When the content of the antioxidant is the above lower limit value or more, photodegradation of the compound represented by formula (1) can be more effectively suppressed. In addition, when the content of the antioxidant is the above upper limit value or less, orientation disorder of the polymerizable liquid crystal compound is less likely to occur, and a higher suppressing effect on photodegradation of the compound represented by formula (1) can be expected.

The composition may contain another additive other than those described above. Examples of the other additive include a release agent, a stabilizer, a colorant such as a bluing agent, a flame retardant, and a lubricant. When the composition contains the other additive, the content of the other additive is preferably more than 0% and 20% by mass or less, and more preferably more than 0% and 10% by mass or less based on the solid matter of the composition.

The composition can be produced by a conventionally known method for preparing the composition. The composition can be usually prepared by mixing and stirring a compound represented by formula (1) and having a maximum absorption wavelength in a range of 420 nm or more and 520 nm or less, a polymerizable liquid crystal compound, and an additive such as an antioxidant or a leveling agent as necessary.

When a host-guest type polarizing plate is produced using the composition, the dichroic ratio is less likely to decrease even when UV exposure is used in the middle of production. Therefore, photocuring can be used in a processing process. Therefore, the composition can be suitably used for producing a polarizing film.

<Film>

A film according to the present embodiment is obtained by using, as a forming material, a composition containing a compound represented by formula (1) and having a maximum absorption wavelength in a range of 420 nm or more and 520 nm or less, and at least one of a polymerizable liquid crystal compound and a liquid crystalline polymer compound. The film formed of the composition may be formed by applying the composition to a substrate to form the film. In addition, when the composition containing the compound represented by formula (1) contains a polymerizable liquid crystal compound, a film containing a cured product obtained by polymerizing the polymerizable liquid crystal compound may be formed by applying the composition to a substrate, forming a film, and then polymerizing and curing the polymerizable liquid crystal compound.

The composition can form a film having a high degree of orientation order, for example, a polarizing film. Therefore, the film according to the present embodiment includes a polarizing film formed from a composition containing a compound represented by formula (1) and having a maximum absorption wavelength in a wavelength range of 420 nm or more and 520 nm or less and at least one of a polymerizable liquid crystal compound and a liquid crystalline polymer compound, the polarizing film having a high degree of orientation order. The polarizing film having a high degree of orientation order exhibits a Bragg peak derived from a high-order structure in X-ray diffraction measurement as described later.

Here, in the polarizing film having a high degree of orientation order, a Bragg peak derived from a higher-order structure such as a hexatic phase or a crystal phase is obtained in X-ray diffraction measurement. Therefore, the polarizing film formed from the composition is preferably orientated such that the polymerizable liquid crystal compound or the liquid crystalline polymer compound exhibits a Bragg peak in X-ray diffraction measurement, and more preferably "horizontally orientated" such that the molecules of the polymerizable liquid crystal compound or the liquid crystalline polymer compound are orientated in a light absorbing direction. The high degree of orientation order indicating a Bragg peak can be achieved by controlling the kind of a polymerizable liquid crystal compound or a liquid crystalline polymer compound to be used, the amount of a compound represented by formula (1) and having a maximum absorption wavelength in a wavelength range of 420 nm or more and 520 nm or less, and the like.

For example, the polymerizable liquid crystal compound, the liquid crystalline polymer compound, and the compound represented by formula (1) and having a maximum absorption wavelength in a wavelength range of 420 nm or more and 520 nm or less, constituting the composition used for forming a film, may be those similar to the polymerizable liquid crystal compound, the liquid crystalline polymer compound, and compound (1) that can be used for the composition described above.

The film can be produced, for example, by a method including:

forming a coating film of a composition containing compound (1), at least one of a polymerizable liquid crystal compound and a liquid crystalline polymer compound, and a solvent;

removing at least a part of the solvent from the coating film;

raising the temperature to a temperature equal to or higher than a temperature at which the polymerizable liquid crystal compound or the liquid crystalline polymer compound undergoes phase transition to a liquid phase, and then lowering the temperature to cause the polymerizable liquid crystal compound or the liquid crystalline polymer compound to undergo phase transition to a smectic phase (smectic liquid crystal state); and polymerizing the polymerizable liquid crystal compound while maintaining the smectic phase (smectic liquid crystal state).

The coating film of the composition can be formed, for example, by applying the composition onto a substrate, an orientation film described later, or the like. Alternatively, the composition may be directly applied onto a retardation film constituting a polarizing plate or another layer.

The substrate is usually a transparent substrate. Note that when the substrate is not disposed on a display surface of a display element, for example, when a laminate obtained by removing the substrate from the film is disposed on the display surface of the display element, the substrate does not have to be transparent. The transparent substrate means a substrate having transparency capable of transmitting light, particularly visible light, and the transparency refers to a characteristic that transmittance to light in a wavelength range of 380 nm or more and 780 nm or less is 80% or more. Specific examples of the transparent substrate include a translucent resin substrate.

Examples of a resin constituting the translucent resin substrate include: a polyolefin such as polyethylene or polypropylene; a cyclic olefin-based resin such as a norbornene polymer; polyvinyl alcohol; polyethylene terephthalate; polymethacrylate; polyacrylate; a cellulose ester such as triacetyl cellulose, diacetyl cellulose, or cellulose acetate propionate; polyethylene naphthalate; polycarbonate; polysulfone; polyethersulfone; polyether ketone; polyphenylene sulfide; and polyphenylene oxide. Polyethylene terephthalate, polymethacrylate, a cellulose ester, a cyclic olefin-based resin, or polycarbonate is preferable from a viewpoint of easy availability and transparency. The cellulose ester is obtained by esterifying some or all of hydroxy groups contained in a cellulose, and can be easily obtained from the market. In addition, a cellulose ester substrate can also be easily obtained from the market. Examples of a commercially available cellulose ester substrate include "Fujitac Film" (Fujifilm Corporation); "KC8UX2M", "KC8UY", and "KC4UY" (Konica Minolta Opto Co., Ltd.).

Characteristics required for the substrate vary depending on a configuration of a film. However, usually, a substrate having a retaradance as small as possible is preferable. Examples of the substrate having a retaradance as small as possible include a cellulose ester film having no retaradance, such as zero tack (Konica Minolta Opto Co., Ltd.) or Z tack (Fujifilm Corporation). In addition, an unstretched cyclic olefin-based resin substrate is also preferable. A surface of the substrate on which the film is not laminated may be subjected to a hard coat treatment, an antireflection treatment, an antistatic treatment, or the like.

The thickness of the substrate is usually 5 µm or more and 300 µm or less, preferably 20 µm or more and 200 µm or less, and more preferably 20 µm or more and 100 µm or less. When the thickness is equal to or more than the lower limit value, reduction in strength is suppressed, and workability tends to be favorable.

Examples of a method for applying the composition to the substrate or the like include known methods including: an application method such as a spin coating method, an extrusion method, a gravure coating method, a die coating method, a bar coating method, or an applicator method; and a printing method such as a flexography method.

Subsequently, the solvent contained in the coating film obtained from the composition is removed by drying or the like to form a dry coating film. In addition, when the polymerizable liquid crystal compound is contained in the coating film, drying is performed under a condition that the polymerizable liquid crystal compound is not polymerized to form a dry coating film. Examples of the method for drying the coating film include a natural drying method, a forced-air drying method, a heating drying method, and a reduced-pressure drying method.

Furthermore, in order to cause the polymerizable liquid crystal compound or the liquid crystalline polymer compound to undergo phase transition to a liquid phase, the temperature is raised to a temperature equal to or higher than a temperature at which the polymerizable liquid crystal compound or the liquid crystalline polymer compound undergoes phase transition to the liquid phase, and then the temperature is lowered to cause the polymerizable liquid crystal compound or the liquid crystalline polymer compound to undergo phase transition to a smectic phase (smectic liquid crystal state). Such a phase transition may be performed after removal of the solvent in the coating film, or may be performed simultaneously with removal of the solvent.

By polymerizing the polymerizable liquid crystal compound while maintaining the smectic liquid crystal state of the polymerizable liquid crystal compound, a film including a cured layer of the polymerizable liquid crystal composition is formed. As a polymerization method, a photopolymerization method is preferable. In photopolymerization, light with which a dry coating film is irradiated is appropriately selected depending on the kind of a photopolymerization initiator contained in the dry coating film, and the kind and the amount of the polymerizable liquid crystal compound (particularly, the kind of a polymerizable group of the polymerizable liquid crystal compound). Specific examples of the light include one or more kinds of light selected from the group consisting of visible light, ultraviolet light, infrared light, an X-ray, an α-ray, a β-ray, and a γ-ray, and an active electron beam. Among these kinds of light, ultraviolet light is preferable in that it is easy to control progress of a polymerization reaction and those widely used in the art can be used as a photopolymerization device. It is preferable to select the kinds and the like of the polymerizable liquid crystal compound and the photopolymerization initiator contained in the composition such that photopolymerization with ultraviolet light is possible. In addition, a polymerization temperature can also be controlled by irradiating the dry coating film with light while cooling the dry coating film by an appropriate cooling means during polymerization. By adopting such a cooling means, if the polymerizable liquid crystal compound is polymerized at a lower temperature, a film can be appropriately formed even if a substrate having relatively low heat resistance is used. During photopolymerization, a patterned film can also be obtained, for example, by performing masking or development.

Examples of a light source of the active energy ray include a low pressure mercury lamp, a medium pressure mercury lamp, a high pressure mercury lamp, an ultra-high pressure mercury lamp, a xenon lamp, a halogen lamp, a carbon arc lamp, a tungsten lamp, a gallium lamp, an excimer laser, an LED light source that emits light in a wavelength range of 380 nm or more and 440 nm or less, a chemical lamp, a black light lamp, a microwave-excited mercury lamp, and a metal halide lamp.

An ultraviolet irradiation intensity is usually 10 mW/cm$^2$ or more and 3,000 mW/cm$^2$ or less.

The ultraviolet irradiation intensity is preferably an intensity in a wavelength region effective for activating a photopolymerization initiator. Light irradiation time is usually 0.1 seconds or more and 10 minutes or less, preferably 0.1 seconds or more and 5 minutes or less, more preferably 0.1 seconds or more and 3 minutes or less, and still more preferably 0.1 seconds or more and 1 minute or less. When irradiation is performed once or a plurality of times with such an ultraviolet irradiation intensity, an integrated light amount thereof is preferably 10 mJ/cm$^2$ or more and 3,000 mJ/cm$^2$ or less.

By performing photopolymerization, the polymerizable liquid crystal compound is polymerized while maintaining a smectic phase liquid crystal state, preferably a high-order smectic phase liquid crystal state to form a film. The film obtained by polymerizing the polymerizable liquid crystal compound while the polymerizable liquid crystal compound maintains a smectic phase liquid crystal state advantageously has higher polarizing performance than a conventional host-guest type polarizing film, that is, a film having a nematic phase liquid crystal state due to an action of a dichroic dye. Furthermore, the film obtained by polymerizing the polymerizable liquid crystal compound while the polymerizable liquid crystal compound maintains a smectic phase liquid crystal state advantageously has better strength than a film to which only a dichroic dye or a lyotropic liquid crystal is applied.

The thickness of the film can be appropriately selected depending on a display device to be applied, and is preferably 0.5 µm or more and 10 µm or less, more preferably 1 µm or more and 5 µm or less, and still more preferably 1 µm or more and 3 µm or less.

When the film is used as a polarizing film, the film is preferably formed on an orientation film. The orientation film has an orientation controlling force for liquid crystal-orientating a polymerizable liquid crystal compound and a liquid crystalline polymer compound in a desired direction. The orientation film preferably has solvent resistance not to be dissolved by application or the like of a composition containing at least one of a polymerizable liquid crystal compound and a liquid crystalline polymer compound, and also has heat resistance in a heat treatment for removing a solvent or orientating a polymerizable liquid crystal compound. Examples of such an orientation film include an orientation film containing an orientational polymer, a photo-orientation film, and a groove orientation film having irregular patterns or a plurality of grooves on a surface thereof. A photo-orientation film is preferable from a viewpoint of the accuracy of an orientation angle and quality.

<Laminate>

A laminate according to the present embodiment includes a film containing the composition. The laminate may include a substrate and a film disposed on the substrate and containing the composition as a forming material, or may include a substrate, an orientation film disposed on the substrate, and a film disposed on the orientation film and containing the composition as a forming material. The film containing the composition as a forming material may constitute a polarizing film. In addition, the substrate may be a retardation film. The laminate can constitute, for example, a polarizing plate. The laminate can be produced, for example, by the method for producing a film described above.

The thickness of the laminate is preferably 10 µm or more and 300 µm or less, more preferably 20 µm or more and 200 µm or less, and still more preferably 25 µm or more and 100 µm or less from a viewpoint of flexibility and visibility of a display device.

When the laminate includes a retardation film as a substrate, the thickness of the retardation film can be appropriately selected depending on an applied display device.

The laminate according to the present embodiment can be produced by a production method including the following steps A and B, and further including step C as necessary. When the composition contains a liquid crystalline polymer compound in addition to a compound represented by formula (1), the liquid crystalline polymer compound is preferably further orientated in step B. When the composition contains a polymerizable liquid crystal compound in addition to the compound represented by formula (1), the production method preferably further includes step C.

The laminate is produced by a production method including:
  step A: a step of applying the composition of the present invention to a surface of a substrate to form a coating film;
  step B: a step of orientating at least one of a polymerizable liquid crystal compound and a liquid crystalline polymer compound, and compound (1) contained in the formed coating film while removing a solvent by heating; and
  step C: irradiating the orientated polymerizable liquid crystal compound with an active energy ray to polymerize the polymerizable liquid crystal compound.

(Step A)

The substrate may be any of a glass substrate, a resin substrate, and the like, and is preferably a resin substrate. In addition, a thin laminate can be obtained by using a film substrate formed of a resin.

The resin substrate is preferably a transparent resin substrate. The transparent resin substrate means a substrate having translucency capable of transmitting light, particularly visible light, and the translucency refers to a characteristic that visibility correction transmittance for light in a wavelength range of 380 nm or more and 780 nm or less is 80% or more.

Examples of the resin constituting the substrate include: a polyolefin such as polyethylene, polypropylene, or a norbornene-based polymer; a cyclic olefin-based resin; polyvinyl alcohol; polyethylene terephthalate; polymethacrylate; polyacrylate; a cellulose ester such as triacetyl cellulose, diacetyl cellulose, or cellulose acetate propionate; polyethylene naphthalate; polycarbonate; polysulfone; polyethersulfone; polyether ketone; polyphenylene sulfide; and polyphenylene oxide. The resin constituting the substrate is preferably at least one selected from the group consisting of a cellulose ester, a cyclic olefin-based resin, polycarbonate, polyethersulfone, polyethylene terephthalate, and polymethacrylate.

The thickness of the substrate is preferably thin as long as the substrate can be practically handled. However, if the substrate is too thin, the strength thereof may be reduced and workability may be poor. The thickness of the substrate is usually 5 μm or more and 300 μm or less, and preferably 20 μm or more and 200 μm or less.

(Step B)

When the composition contains a solvent, the solvent is usually removed from a formed coating film. Examples of a method for removing the solvent include a natural drying method, a forced-air drying method, a heat drying method, and a reduced-pressure drying method.

When the formed coating film contains at least one of a polymerizable liquid crystal compound and a liquid crystalline polymer compound, the coating film is usually heated to a temperature equal to or higher than a temperature at which the polymerizable liquid crystal compound or the liquid crystalline polymer compound transitions to a solution state, and subsequently cooled to a temperature at which the polymerizable liquid crystal compound or the liquid crystalline polymer compound is liquid crystal-orientated, whereby the polymerizable liquid crystal compound or the liquid crystalline polymer compound can be orientated to form a liquid crystal phase.

When the formed coating film contains at least one of a polymerizable liquid crystal compound and a liquid crystalline polymer compound, the temperature at which the polymerizable liquid crystal compound or the liquid crystalline polymer compound is orientated only needs to be determined in advance by texture observation or the like using a composition containing the polymerizable liquid crystal compound. In addition, removal of the solvent and the liquid crystal orientation may be performed simultaneously. The temperature at this time depends on the kind of a solvent to be removed and the kind of a polymerizable liquid crystal compound or a liquid crystalline polymer compound, but is preferably in a range of 50° C. or higher and 200° C. or lower, and more preferably in a range of 80° C. or higher and 130° C. or lower when the substrate is a resin substrate.

(Step C)

When the formed coating film contains a polymerizable liquid crystal compound, the polymerizable liquid crystal compound is polymerized by irradiating the orientated polymerizable liquid crystal compound with an active energy ray.

By polymerizing the orientated polymerizable liquid crystal compound, a film containing the polymerizable liquid crystal compound polymerized in an orientated state and compound (1) orientated together with the polymerizable liquid crystal compound is obtained.

A film containing the polymerizable liquid crystal compound polymerized while the polymerizable liquid crystal compound maintains a smectic liquid crystal state has higher polarizing performance than a conventional host-guest type polarizing film, that is, a polarizing film obtained by polymerizing a polymerizable liquid crystal compound or the like while the polymerizable liquid crystal compound or the like maintains a nematic liquid crystal phase, and has better polarizing performance and strength than a polarizing film to which only a dichroic dye or a lyotropic liquid crystal type liquid crystal compound is applied.

An active energy ray source may be any source that generates an ultraviolet ray, an electron beam, an X-ray, or the like. The active energy ray source is preferably a light source having a light emission distribution at a wavelength of 400 nm or less, such as a low-pressure mercury lamp, a medium-pressure mercury lamp, a high-pressure mercury lamp, an ultra-high pressure mercury lamp, a chemical lamp, a black light lamp, a microwave-excited mercury lamp, or a metal halide lamp.

<Display Device>

A display device of the present embodiment includes the laminate, and the laminate may be a polarizing plate. The display device can be obtained, for example, by bonding the laminate as a polarizing plate to a surface of the display device with an adhesive layer interposed therebetween. The display device is a device having a display element, and is a device including a light emitting element or a light emitting device as a light emitting source. Examples of the display device include a liquid crystal display device, an organic electroluminescence (EL) display device, an inorganic electroluminescence (EL) display device, an electron emission display device (for example, a field emission display device (FED) or a surface field emission display device (SED)), an electronic paper (display device using electronic ink, an electrophoresis element, and the like), a plasma display device, a projection-type display device (for example, a grating light valve (GLV) display device or a display device having a digital micromirror device (DMD)), and a piezoelectric ceramic display. The liquid crystal display device includes any of a transmissive liquid crystal display device, a semi-transmissive liquid crystal display device, a reflective liquid crystal display device, a direct view type liquid crystal display device, a projection type liquid crystal display device, and the like. These display devices may be display devices that display two-dimensional images or stereoscopic display devices that display three-dimensional images. In particular, as the display device, an organic EL display device and a touch panel display device are preferable, and in particular, an organic EL display device is preferable.

EXAMPLES

Hereinafter, the present invention will be specifically described with reference to Examples, but the present invention is not limited to these Examples.

Synthesis Example 1: Synthesis of Compound (2-1)

In order to synthesize compound (2-1), compound (2-1-a) was first synthesized. In addition, compound (2-1-c) was synthesized via compound (2-1-b). Subsequently, compound (2-1-a) and compound (2-1-c) were subjected to Suzuki coupling to obtain compound (2-1).

Synthesis of Compound (2-1-a)

To a chloroform (240 mL) solution of EDC·HCl (1-ethyl-3-(3-dimethylaminopropyl) carbodiimide hydrochloride, 4.83 g, 25.2 mmol) and DMAP (N,N-dimethylaminopyridine, 0.29 g, 2.4 mmol), n-butanol (3.57 g, 48.1 mmol) and 4-bromobenzoic acid (4.83 g, 24.0 mmol) were added in order. The mixture was stirred at room temperature for six hours. Thereafter, the reaction solution was washed with water and then with saturated saline, dried over magnesium sulfate, and concentrated with an evaporator to obtain compound (2-1-a) (5.38 g, yield 87%).

[Chemical formula 44]

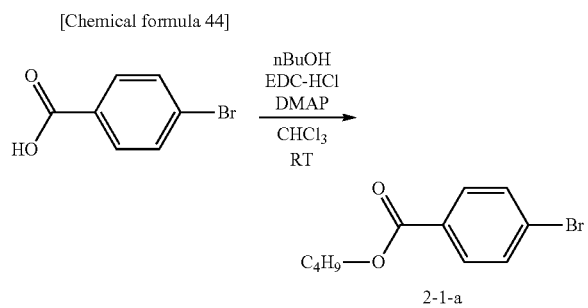

Synthesis of Compound (2-1-b)

4-Bromoaniline (13.2 g, 77.6 mmol), 35% hydrochloric acid (22.0 mL, 249 mmol), and water (200 mL) were mixed and cooled to a temperature of 0° C. to 5° C. To the mixture, a water (26 mL) solution of sodium nitrite (13.0 g, 189 mmol) was added dropwise. Thereafter, the mixture was stirred for 30 minutes while the temperature was maintained at 0° C. to 5° C., and amide sulfuric acid (11.0 g, 113 mmol) was further added thereto to prepare a diazo liquid. Meanwhile, N,N-dimethylaniline (14.0 mL, 111 mmol), sodium acetate (24.8 g, 302 mmol), methanol (200 mL), and water (100 mL) were mixed and cooled to a temperature of 0° C. to 5° C. To the mixture, the whole amount of the diazo liquid prepared above was added dropwise. After completion of the dropwise addition, the temperature was raised to normal temperature, and the precipitated solid was separated by filtration to obtain compound (2-1-b) (21.0 g, yield 90%).

[Chemical formula 45]

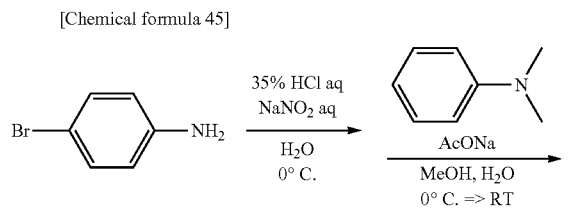

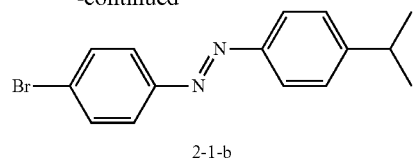

Synthesis of Compound (2-1-c)

A THF (450 mL) solution of compound (2-1-b) (18.3 g, 60.0 mmol) was cooled to −78° C. To the solution, a 1.57 M n-butyllithium hexane solution of (38.0 mL, 59.7 mmol) was added dropwise. Thereafter, the mixture was stirred for 30 minutes while the temperature was maintained at −78° C., and iPrOBpin (abbreviation of 2-isopropoxy-4,4,5,5-tetramethyl-1,3,2-dioxaborolane, 11.0 mL, 64.8 mmol) was further added dropwise thereto. After completion of the dropwise addition, the temperature was raised to normal temperature, and the mixture was stirred for 30 minutes. To the mixture, a water (400 mL) solution of ammonium chloride (60 g) was added to stop the reaction. The organic layer was separated, washed with saturated saline, then dried over magnesium sulfate, and concentrated with an evaporator. The obtained solid was purified by reprecipitation from chloroform/hexane to obtain compound (2-1-c) (16.7 g, yield 79%).

[Chemical formula 46]

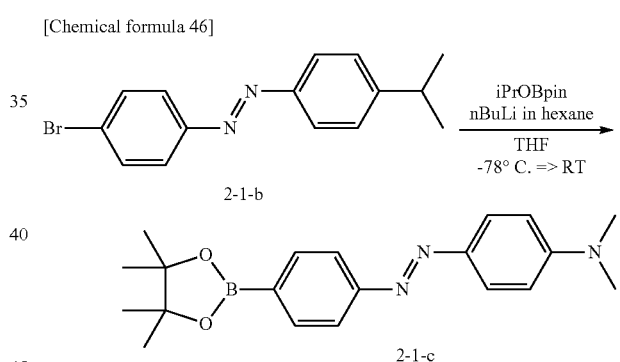

Synthesis of Compound (2-1)

To a THF (10 mL) solution of compound (2-1-a) (286 mg, 1.10 mmol) and compound (2-1-c) (352 mg, 1.00 mmol), Pd$_2$(dba)$_3$ (22.7 mg, 0.0248 mmol) and P(t-Bu)$_3$·HBF$_4$ (15.3 mg, 0.0527 mmol) were added, and the mixture was stirred. To the mixture, a 3 M potassium phosphate aqueous solution (1.0 mL, 3.0 mmol) was further added, and the mixture was heated and stirred at 60° C. for 3.6 hours. To the reaction solution, methanol (20 mL) was added, and the precipitated solid was collected by filtration and purified by silica gel column chromatography using chloroform as an eluent to obtain compound (2-1) (256 mg, yield 71%).

$^1$H-NMR (400 MHz, CDCl$_3$): δ (ppm)=8.14-8.10 (m, 2H), 7.95-7.89 (m, 4H), 7.76-7.71 (m, 4H), 6.80-6.76 (m, 2H), 4.36 (t, 2H), 3.11 (s, 6H), 1.78 (tt, 2H), 1.55-1.46 (m, 2H), 1.00 (t, 3H).

UV visible light spectrum: λmax=436 nm (in acetonitrile)

[Chemical formula 47]

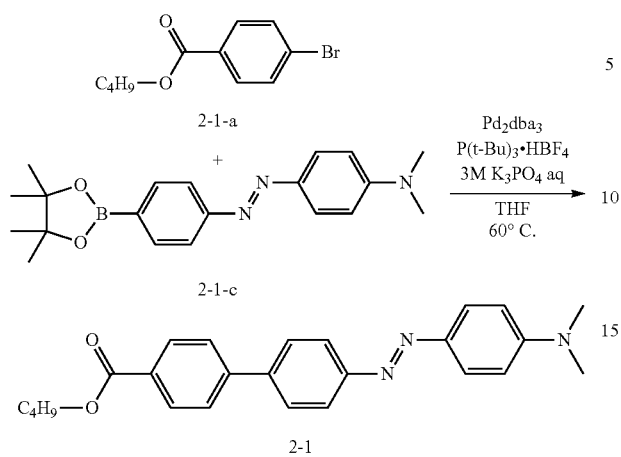

Synthesis Example 2: Synthesis of Compound (3)

In order to synthesize compound (3), compound (3-a) was first synthesized. Subsequently, compound (3-a) and the above-described compound (2-1-c) were subjected to Suzuki coupling to obtain compound (3).

Synthesis of Compound (3-a)

To a dichloromethane (60 mL) solution of EDC·HCl (1.36 g, 7.10 mmol) and DMAP (0.083 g, 0.68 mmol), n-hexanol (0.90 mL, 7.2 mmol) and 4-bromobenzoic acid (1.36 g, 6.76 mmol) were added in order. The mixture was stirred at room temperature for six hours. Thereafter, the reaction solution was washed with water and then with saturated saline, dried over magnesium sulfate, and concentrated with an evaporator to obtain compound (3-a) (1.70 g, yield 88%).

[Chemical formula 48]

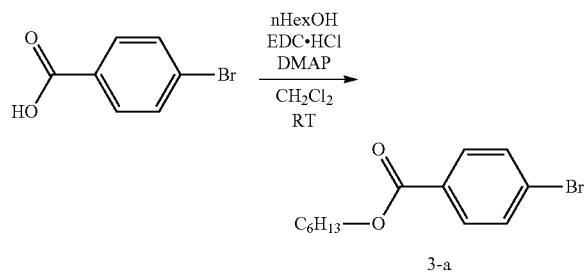

Synthesis of Compound (3)

To a diethylene glycol dimethyl ether (13 mL) and water (2 mL) mixed solution of compound (3-a) (285 mg, 1.00 mmol), compound (2-1-c) (457 mg, 1.30 mmol), potassium acetate (650 mg, 6.63 mmol), PdCl₂dppf (41.0 mg, 0.0502 mmol) was added, and the mixture was heated and stirred at 140° C. for four hours. To the reaction solution, THF was added, and the mixture was caused to pass through a silica gel short column and then concentrated with an evaporator. The obtained solid was washed with methanol/water and then purified by silica gel column chromatography (chloroform/toluene=20/80) to obtain compound (3) (238 mg, yield 55%).

¹H-NMR (400 MHz, CDCl₃): δ (ppm)=8.14-8.11 (m, 2H), 7.95-7.89 (m, 4H), 7.76-7.71 (m, 4H), 6.80-6.76 (m, 2H), 4.35 (t, 2H), 3.11 (s, 6H), 1.79 (tt, 2H), 1.51-1.44 (m, 2H), 1.37-1.33 (m, 4H), 0.92 (t, 3H).

UV visible light spectrum: λmax=430 nm (in acetonitrile)

[Chemical formula 49]

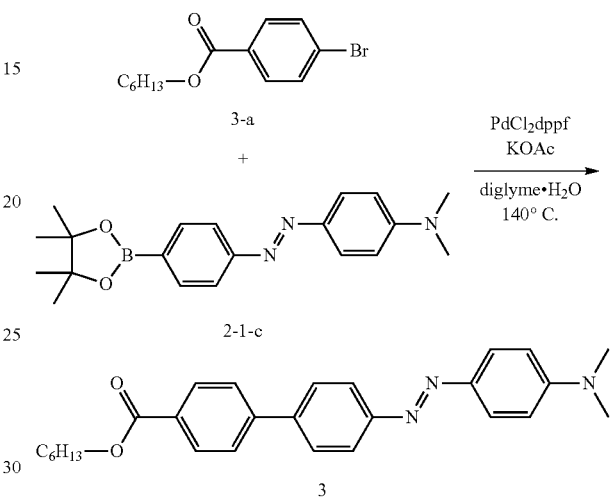

Synthesis Example 3: Synthesis of Compound (2-3)

In order to synthesize compound (2-3), compound (2-3-a) was first synthesized. Subsequently, compound (2-3-a) and the above-described compound (2-1-c) were subjected to Suzuki coupling to obtain compound (2-3).

Synthesis of Compound (2-3-a)

To a chloroform (80 mL) solution of EDC·HCl (1.61 g, 8.41 mmol) and DMAP (0.098 g, 0.80 mmol), ethanol (1.85 g, 40.1 mmol) and 4-bromo-2,6-difluorobenzoic acid (1.90 g, 8.01 mmol) were added in order. The mixture was stirred at room temperature for four hours. Thereafter, the reaction solution was washed with water and then with saturated saline, dried over magnesium sulfate, and concentrated with an evaporator. The concentrated product was dissolved in a mixed solvent of chloroform/hexane=1/1, caused to pass through a silica gel short column, and then concentrated with an evaporator to obtain compound (2-3-a) (1.32 g, yield 62%).

[Chemical formula 50]

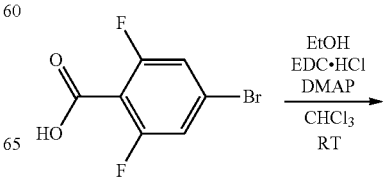

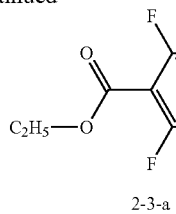

2-3-a

Synthesis of Compound (2-3)

To a THF (10 mL) solution of compound (2-3-a) (292 mg, 1.10 mmol) and compound (2-1-c) (351 mg, 1.00 mmol), $Pd_2(dba)_3$ (22.7 mg, 0.0248 mmol) and $P(t\text{-}Bu)_3 \cdot HBF_4$ (15.2 mg, 0.0524 mmol) were added, and the mixture was stirred. To the mixture, a 3 M potassium phosphate aqueous solution (1.0 mL, 3.0 mmol) was further added, and the mixture was heated and stirred at 60° C. for 4.5 hours. To the reaction solution, methanol (20 mL) was added, and the precipitated solid was collected by filtration and purified by silica gel column chromatography using chloroform as an eluent to obtain compound (2-3) (161 mg, yield 39%).

$^1$H-NMR (400 MHz, $CDCl_3$): δ (ppm)=7.95-7.89 (m, 4H), 7.69-7.66 (m, 2H), 7.26-7.22 (m, 2H), 6.79-6.75 (m, 2H), 4.45 (q, 2H), 3.11 (s, 6H), 1.42 (t, 3H).

UV visible light spectrum: λmax=437 nm (in acetonitrile)

[Chemical formula 51]

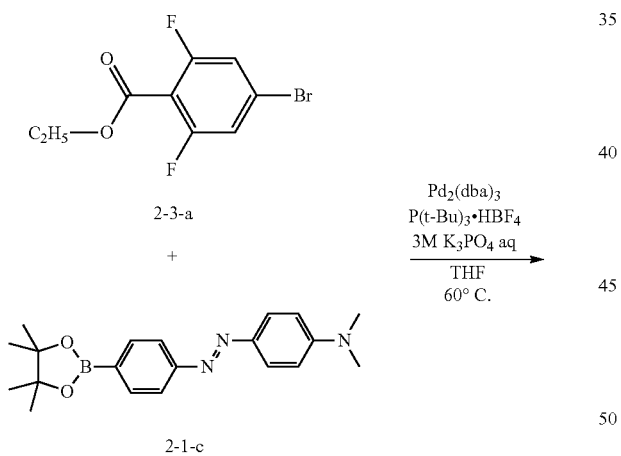

Synthesis Example 4: Synthesis of Compound (2-106)

In order to synthesize compound (2-106), compound (2-106-a) was first synthesized.

Subsequently, compound (2-106-a) and the above-described compound (2-1-c) were subjected to Suzuki coupling to obtain compound (2-106).

Synthesis of Compound (2-106-a)

To a chloroform (80 mL) solution of EDC·HCl (1.61 g, 8.41 mmol) and DMAP (0.098 g, 0.80 mmol), n-buthanol (1.19 g, 16.0 mmol) and 4-bromo-2,6-difluorobenzoic acid (1.90 g, 8.01 mmol) were added in order. The mixture was stirred at room temperature for 3.5 hours. Thereafter, the reaction solution was washed with water and then with saturated saline. The washed product was dried over magnesium sulfate and concentrated with an evaporator to obtain compound (2-106-a) (1.47 g, yield 62%).

[Chemical formula 52]

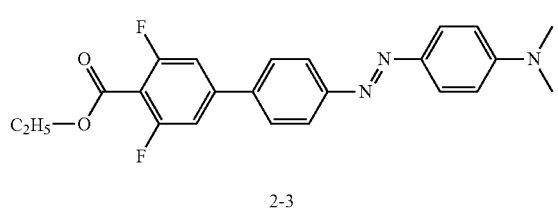

Synthesis of Compound (2-106)

To a THF (10 mL) solution of compound (2-106-a) (323 mg, 1.10 mmol) and compound (2-1-c) (352 mg, 1.00 mmol), $Pd_2(dba)_3$ (23.2 mg, 0.0253 mmol) and $P(t\text{-}Bu)_3 \cdot HBF_4$ (15.8 mg, 0.0545 mmol) were added, and the mixture was stirred. To the mixture, a 3 M potassium phosphate aqueous solution (1.0 mL, 3.0 mmol) was further added, and the mixture was heated and stirred at 60° C. for four hours. To the reaction solution, methanol (20 mL) was added, and the precipitated solid was collected by filtration and purified by silica gel column chromatography using chloroform as an eluent to obtain compound (2-106) (154 mg, yield 35%).

$^1$H-NMR (400 MHz, $CDCl_3$): δ (ppm)=7.95-7.89 (m, 4H), 7.69-7.66 (m, 2H), 7.26-7.22 (m, 2H), 6.79-6.75 (m, 2H), 4.39 (t, 2H), 3.11 (s, 6H), 1.76 (tt, 2H), 1.49 (tq, 2H), 0.99 (t, 3H).

UV visible light spectrum: λmax=436 nm (in acetonitrile)

89

[Chemical formula 53]

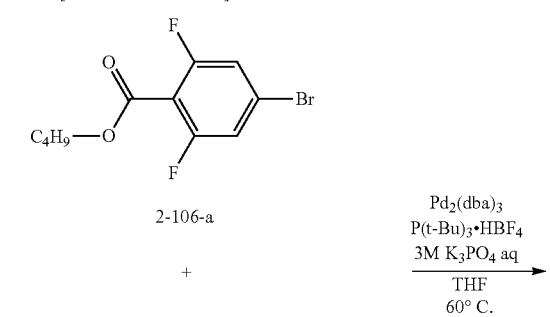

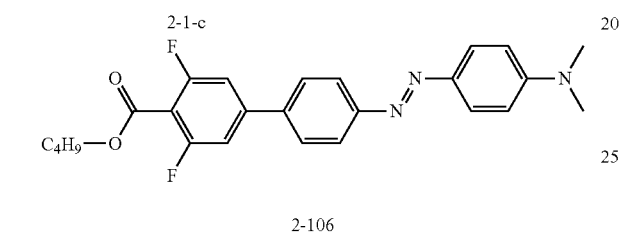

Synthesis Example 5: Synthesis of Compound (2-4)

In order to synthesize compound 2-4, compound (2-4-b) was first synthesized via compound (2-4-a). Subsequently, compound (2-4-b) and ethyl 4-bromobenzoate were subjected to Suzuki coupling to obtain compound (2-4).

Synthesis of Compound (2-4-a)

To a chloroform (80 mL) solution of EDC·HCl (1.61 g, 8.41 mmol) and DMAP (0.098 g, 0.80 mmol), ethanol (1.84 g, 40.0 mmol) and 4-bromo-2-fluorobenzoic acid (1.75 g, 8.00 mmol) were added in order. The mixture was stirred at room temperature for 3.5 hours. Thereafter, the reaction solution was washed with water and then with saturated saline. The washed product was dried over magnesium sulfate and concentrated with an evaporator to obtain compound (2-4-a) (1.60 g, yield 81%).

[Chemical formula 54]

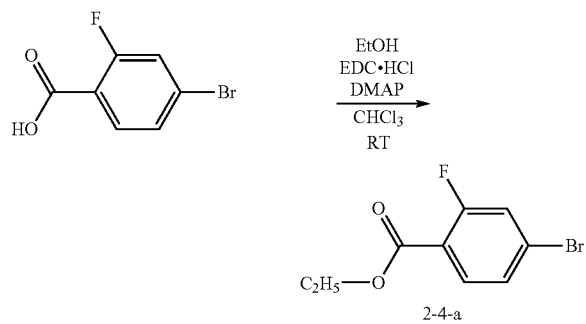

90

Synthesis of Compound (2-4)

To a THF (10 mL) solution of compound (2-4-a) (552 mg, 2.23 mmol) and compound (2-1-c) (704 mg, 2.01 mmol), $Pd_2(dba)_3$ (46.1 mg, 0.0503 mmol) and $P(t-Bu)_3 \cdot HBF_4$ (29.0 mg, 0.100 mmol) were added, and the mixture was stirred. To the mixture, a 3 M potassium phosphate aqueous solution (2.0 mL, 6.0 mmol) was further added, and the mixture was heated and stirred at 60° C. for 3.5 hours. To the reaction solution, water (20 mL) was added, and the precipitated solid was collected by filtration and purified by silica gel column chromatography using chloroform as an eluent to obtain compound (2-4) (480 mg, yield 61%).

$^1$H-NMR (400 MHz, $CDCl_3$): δ (ppm)=8.02 (dd, 1H), 7.95-7.89 (m, 4H), 7.74-7.70 (m, 2H), 7.50 (dd, 1H), 7.43 (dd, 1H), 6.80-6.76 (m, 2H), 4.43 (q, 2H), 3.11 (s, 6H), 1.43 (t, 3H).

UV visible light spectrum: λmax=436 nm (in acetonitrile)

[Chemical formula 55]

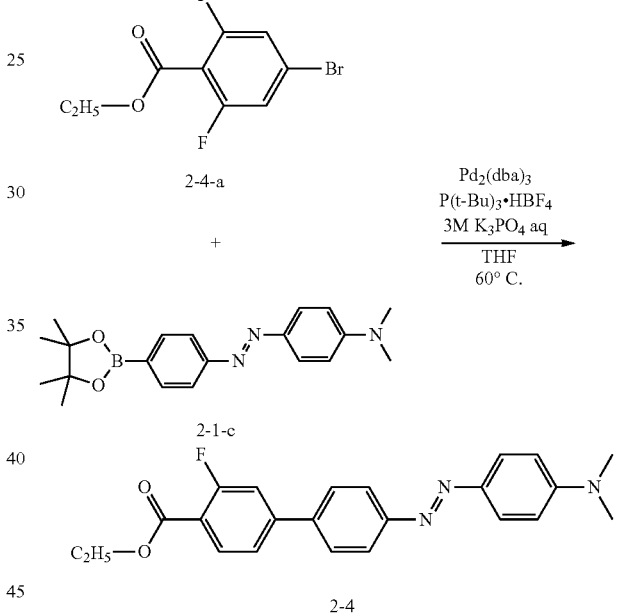

Synthesis Example 6: Synthesis of Compound (2-6)

In order to synthesize compound (2-6), compound (2-6-b) was first synthesized via compound (2-6-a). Subsequently, compound (2-6-b) and ethyl 4-bromobenzoate were subjected to Suzuki coupling to obtain compound (2-6).

Synthesis of Compound (2-6-a)

4-Bromo-2-fluoroaniline (14.3 g, 75.0 mmol), 35% hydrochloric acid (22.0 mL, 249 mmol), and water (200 mL) were mixed and cooled to a temperature of 0° C. to 5° C. To the mixture, a water (26 mL) solution of sodium nitrite (7.76 g, 112 mmol) was added dropwise. Thereafter, the mixture was stirred for 30 minutes while the temperature was maintained at 0° C. to 5° C., and amide sulfuric acid (4.36 g, 45.0 mmol) was further added thereto to prepare a diazo liquid. Meanwhile, N,N-dimethylaniline (13.6 g, 113 mmol), sodium acetate (24.6 g, 300 mmol), methanol (200 mL), and water (100 mL) were mixed and cooled to a temperature of 0° C. to 5° C. To the mixture, the whole amount of the diazo liquid prepared above was added dropwise. After completion of the dropwise addition, the temperature was raised to normal temperature, and the precipitated solid was separated by filtration to obtain compound (2-6-a) (15.8 g, yield 66%).

[Chemical formula 56]

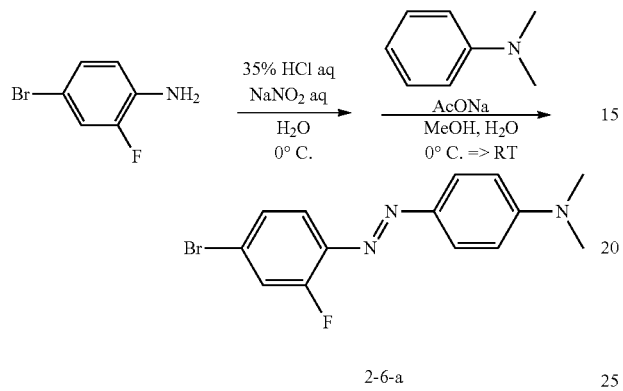

2-6-a

Synthesis of Compound (2-6-b)

To a 1,4-dioxane (60 mL) solution of compound (2-6-a) (3.23 g, 10.0 mmol), B$_2$pin$_2$ (bis(pinacolato) diboron, 2.79 g, 11.0 mmol), and potassium acetate (2.99 g, 30.4 mmol), PdCl$_2$dppf (249 mg, 0.305 mmol) was added, and the mixture was heated and stirred at 80° C. for seven hours. The reaction solution was separated with toluene/water, and the organic layer was washed with water and then with saturated saline, then dried over magnesium sulfate, and concentrated with an evaporator. The obtained solid was purified by reprecipitation from chloroform/hexane to obtain compound (2-6-b) (2.53 g, yield 69%).

[Chemical formula 57]

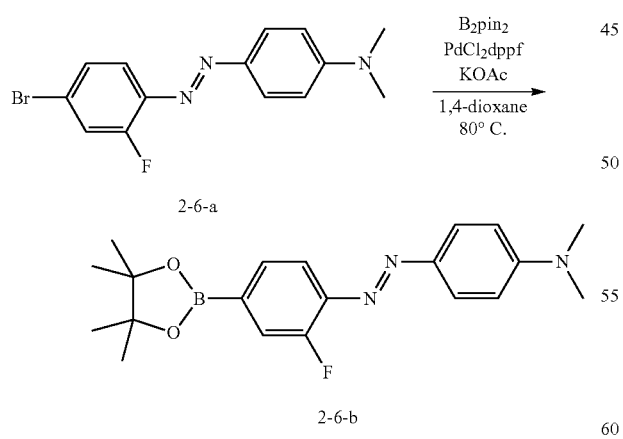

Synthesis of Compound (2-6)

To a THF (30 mL) solution of ethyl 4-bromobenzoate (0.763 g, 3.33 mmol) and compound (2-6-b) (1.11 g, 3.00 mmol), Pd$_2$(dba)$_3$ (69.8 mg, 0.0762 mmol) and P(t-Bu)$_3$·HBF$_4$ (45.0 mg, 0.155 mmol) were added, and the mixture was stirred. To the mixture, a 3 M potassium phosphate aqueous solution (4.0 mL, 12.0 mmol) was further added, and the mixture was heated and stirred at 60° C. for four hours. To the reaction solution, methanol (20 mL) was added, and the precipitated solid was collected by filtration and purified by silica gel column chromatography using chloroform as an eluent to obtain compound (2-6) (904 mg, yield 77%).

$^1$H-NMR (400 MHz, CDCl$_3$): δ (ppm)=8.15-8.12 (m, 2H), 7.95-7.91 (m, 2H), 7.84 (d, 1H), 7.72-7.68 (m, 2H), 7.52-7.45 (m, 2H), 6.79-6.75 (m, 2H), 4.42 (q, 2H), 3.12 (s, 6H), 1.43 (t, 3H).

UV visible light spectrum: λmax=452 nm (in acetonitrile)

[Chemical formula 58]

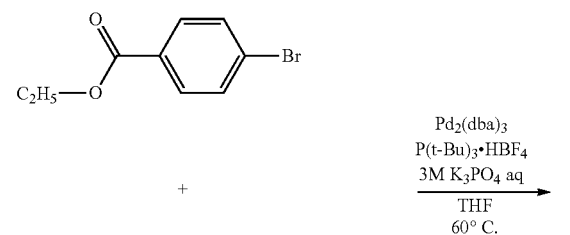

2-6

Synthesis Example 7: Synthesis of Compound (2-116)

In order to synthesize compound 2-116, compound (2-116-b) was first synthesized via compound (2-116-a). Subsequently, compound (2-116-b) and n-butyl zinc bromide were subjected to Negishi coupling to obtain compound (2-116).

Synthesis of Compound (2-116-a)

4-Bromo-3-fluoroaniline (9.50 g, 50.0 mmol), 35% hydrochloric acid (14.8 mL, 167 mmol), and water (95 mL) were mixed and cooled to a temperature of 0° C. to 5° C. To the mixture, a water (5 mL) solution of sodium nitrite (3.45 g, 50.0 mmol) was added dropwise to prepare a diazo liquid. Meanwhile, sodium (phenylamino) methanesulfonate (11.5 g, 55.0 mmol), sodium acetate (16.4 g, 55.0 mmol), and water (100 mL) were mixed and cooled to a temperature of 0° C. to 5° C. To the mixture, the whole amount of the diazo liquid prepared above was added dropwise. After completion of the dropwise addition, the temperature was raised to normal temperature, sodium hydroxide (12.0 g, 300 mmol) was added thereto, and the mixture was heated and stirred at 90° C. for 2.5 hours. The precipitated solid was collected by filtration to obtain compound (2-116-a) (13.9 g, yield 94%).

[Chemical formula 59]

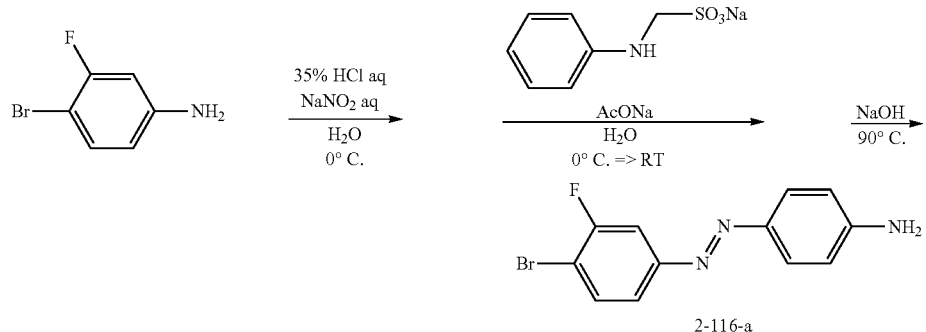

Compound (2-116-a) (1.47 g, 10.0 mmol), 35% hydrochloric acid (1.5 mL, 17 mmol), and water (9 mL) were mixed and cooled to a temperature of 0° C. to 5° C. To the mixture, a water (1 mL) solution of sodium nitrite (345 mg, 5.00 mmol) was added dropwise. Thereafter, the mixture was stirred for 45 minutes while the temperature was maintained at 10° C. to 15° C. to prepare a diazo liquid. Meanwhile, N,N-dimethylaniline (895 mg, 6.00 mmol), sodium acetate (1.64 g, 20.0 mmol), methanol (20 mL), and water (10 mL) were mixed and cooled to a temperature of 10° C. to 15° C. To the mixture, the whole amount of the diazo liquid prepared above was added dropwise. After completion of the dropwise addition, the temperature was raised to normal temperature, and the precipitated solid was collected by filtration, dissolved in chloroform, and washed with water and then with saturated saline.

The washed product was dried over magnesium sulfate and concentrated with an evaporator. The obtained solid was purified by silica gel column chromatography (chloroform/hexane=50/50) to obtain compound (2-116-b) (1.26 g, yield 55%).

[Chemical formula 60]

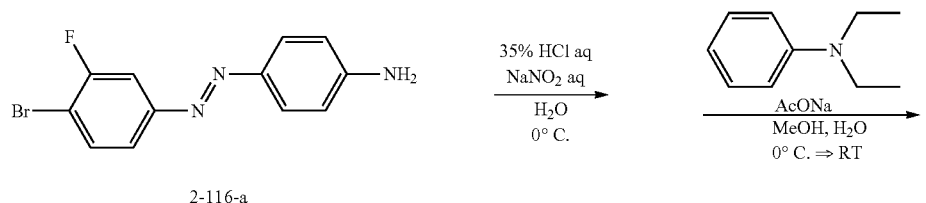

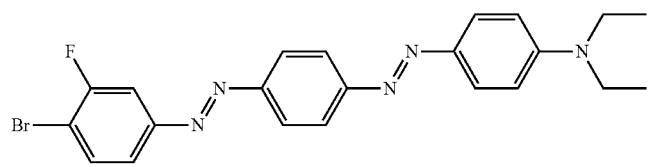

A mixed solution of compound (2-116-b) (213 mg, 0.500 mmol), PdCl$_2$dppf (8.1 mg, 0.010 mmol), and THF (5.0 mL) was heated and stirred at 55° C. To the mixed solution, 0.50 M n-butylzinc bromide (1.2 mL, 0.60 mmol) was added dropwise. Thereafter, the mixture was heated and refluxed for 3.5 hours. To the reaction solution, water (20 mL) was added, and the precipitated solid was collected by filtration and purified by silica silica gel column chromatography (chloroform/hexane=50/50). The purified solid was further purified by reprecipitation from chloroform/hexane to obtain compound (2-116) (137 mg, yield 64%).

$^1$H-NMR (400 MHz, CDCl$_3$): δ (ppm)=8.03-8.00 (m, 2H), 7.98-7.95 (m, 2H), 7.92-7.88 (m, 2H), 7.71 (dd, 1H), 7.60 (dd, 1H), 7.34 (dd, 1H), 6.76-6.72 (m, 2H), 3.46 (q, 4H), 2.72 (t, 2H), 1.65 (tt, 2H), 1.41 (tq, 2H), 1.25 (t, 6H), 0.96 (t, 3H).

UV visible light spectrum: λmax=499 nm (in acetonitrile)

[Chemical formula 61]

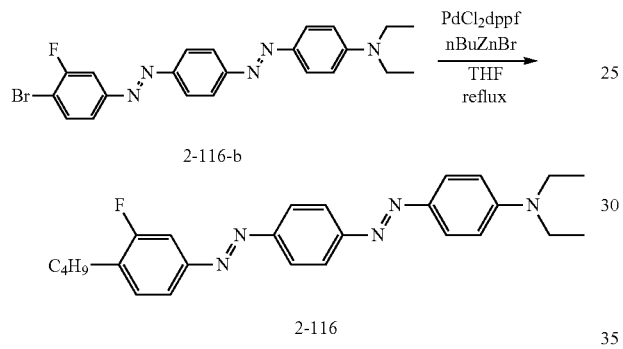

2-116-b 2-116

Synthesis Example 8: Synthesis of Compound (2-166)

2-Bromo-5-n-butylthienothiazole and the above-described compound (2-6-b) were subjected to Suzuki coupling to obtain compound (2-166).

Synthesis of Compound (2-166)

To a THF (10 mL) solution of 2-bromo-5-n-butylthienothiazole (0.304 g, 1.10 mmol) and compound (2-6-b) (0.369 g, 1.00 mmol), Pd$_2$(dba)$_3$ (0.0367 mg, 0.0400 mmol) and P(t-B)$_3$·HBF$_4$ (0.0232 mg, 0.0800 mmol) were added, and the mixture was stirred.

To the mixture, a 3 M potassium phosphate aqueous solution (2.0 mL, 6.0 mmol) was further added, and the mixture was heated and stirred for 16 hours. To the reaction solution, methanol was added, and the precipitated solid was collected by filtration and purified by silica gel column chromatography (chloroform/toluene=10/90) to obtain compound (2-166) (0.127 g, yield 29%).

$^1$H-NMR (400 MHz, CDCl$_3$): δ (ppm)=9.95-7.91 (m, 2H), 7.87-7.81 (m, 2H), 7.77 (dd, 1H), 6.95 (s, 1H), 6.78-6.74 (m, 2H), 3.12 (s, 6H), 2.92 (t, 2H), 1.74 (tt, 2H), 1.44 (tq, 2H), 0.97 (t, 3H).

UV visible light spectrum: λmax=475 nm (in acetonitrile)

[Chemical formula 62]

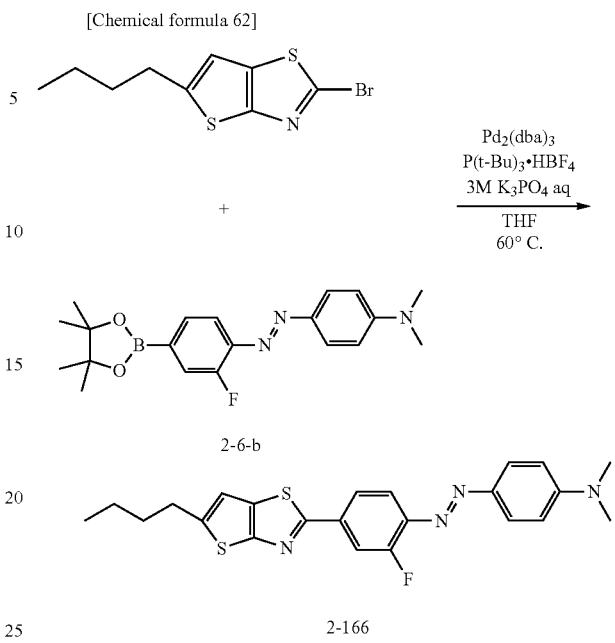

2-166

Synthesis Example 9: Synthesis of Compound (2-167)

2-Bromo-5-n-butylthienothiazole and compound (2-167-b) synthesized via compound (2-167-a) were subjected to Suzuki coupling to obtain compound (2-167).

Synthesis of Compound (2-167-a)

4-Bromo-3-fluoroaniline (1.90 g, 10.0 mmol), 35% hydrochloric acid (3.0 mL, 34 mmol), and water (25 mL) were mixed and cooled to a temperature of 0° C. to 5° C. To the mixture, a water (2.5 mL) solution of sodium nitrite (0.69 mg, 10.0 mmol) was added dropwise to prepare a diazo liquid. Meanwhile, dimethylaniline (1.33 g, 11.0 mmol), sodium acetate (3.28 g, 40.0 mmol), methanol (25.0 mL), and water (12.5 mL) were mixed and cooled to a temperature of 0° C. to 5° C. To the mixture, the whole amount of the diazo liquid prepared above was added dropwise. After completion of the dropwise addition, the temperature was raised to normal temperature, and the precipitated solid was separated by filtration to obtain compound (2-167-a) (2.59 g, yield 80%).

[Chemical formula 63]

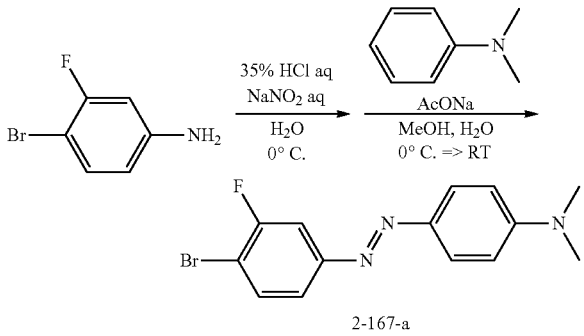

2-167-a

Synthesis of Compound (2-167-b)

To a 1,4-dioxane (35 mL) solution of compound (2-167-a) (2.26 g, 7.00 mmol), B$_2$pin$_2$ (official name is bis(pinacolato) diboron, 1.96 g, 7.70 mmol), and potassium acetate (2.06 g, 21.0 mmol), PdCl$_2$dppf (0.286 g, 0.351 mmol) was added, and the mixture was heated and stirred at 80° C. for 15 hours. The reaction solution was separated with toluene/water, and the organic layer was washed with water and then with saturated saline, then dried over magnesium sulfate, and concentrated with an evaporator. The obtained solid was purified by reprecipitation from chloroform/hexane to obtain compound (2-167-b) (1.74 g, yield 67%).

[Chemical formula 64]

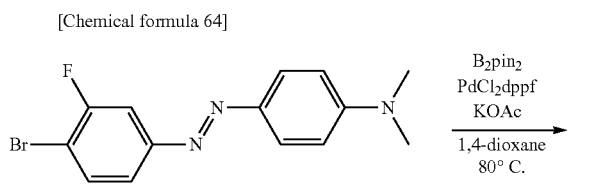

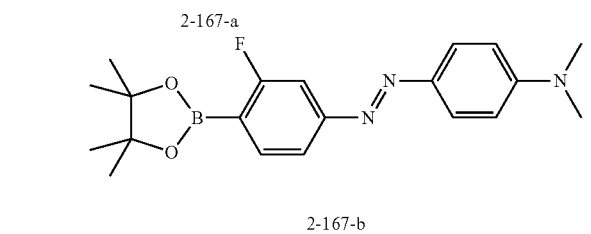

Synthesis of Compound (2-167)

To a 1,4-dioxane (10 mL) solution of 2-bromo-5-n-butylthienothiazole (0.307 g, 1.11 mmol) and compound (2-167-b) (0.370 g, 1.00 mmol), Pd$_2$(dba)$_3$ (0.023 g, 0.0251 mmol) and P(t-Bu)$_3$·HBF$_4$ (0.015 g, 0.0517 mmol) were added, and the mixture was stirred. To the mixture, a 3 M potassium phosphate aqueous solution (1.0 mL, 3.0 mmol) was further added, and the mixture was heated and stirred for four hours. To the reaction solution, methanol was added, and the precipitated solid was collected by filtration and purified by silica gel column chromatography using chloroform as an eluent, and further purified by reprecipitation from chloroform/methanol to obtain compound (2-167) (0.317 g, yield 72%).

$^1$H-NMR (400 MHz, CDCl$_3$): δ (ppm)=8.42 (dd, 1H), 7.92-7.89 (m, 2H), 7.78 (dd, 1H), 7.68 (dd, 1H), 6.97 (s, 1H), 6.79-6.75 (m, 2H), 3.12 (s, 6H), 2.93 (t, 2H), 1.75 (tt, 2H), 1.45 (tq, 2H), 0.97 (t, 3H).

UV visible light spectrum: λmax=471 nm (in acetonitrile)

[Chemical formula 65]

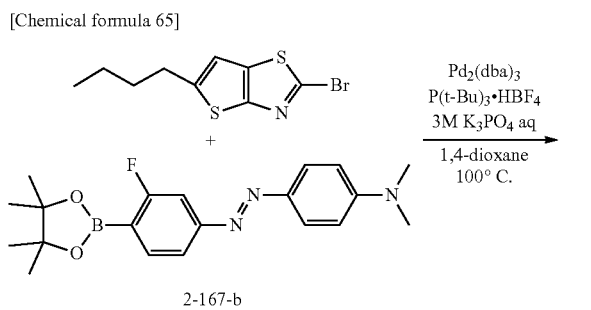

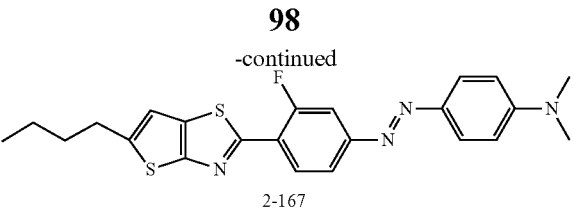

Synthesis Example 10: Synthesis of Compound (2-184)

In order to synthesize compound (2-184), compound (2-184-a) was first synthesized.

Subsequently, compound (2-184-a) and the above-described compound (2-6-b) were subjected to Suzuki coupling to obtain compound (2-184-b). Subsequently, compound (2-184-b) was subjected to a transesterification reaction to obtain compound (2-184).

Synthesis of Compound (2-184-a)

To an acetonitrile (200 mL) solution of copper (II) bromide (6.48 g, 29.0 mmol), isobutyl nitrite (4.40 mL, 37 mmol) and ethyl 2-aminobenzothiazole-6 carboxylate (5.56 g, 25.0 mmol) were added in order. The mixture was stirred at 65° C. for 1.5 hours. Thereafter, the reaction solution was cooled to room temperature, and then poured into 0.4 M hydrochloric acid (200 mL) to stop the reaction. The reaction solution was separated with chloroform/water Thereafter, the organic layer was washed with water and then with saturated saline, dried over magnesium sulfate, and concentrated with an evaporator to obtain compound (2-184-a) (6.56 g, yield 92%).

[Chemical formula 66]

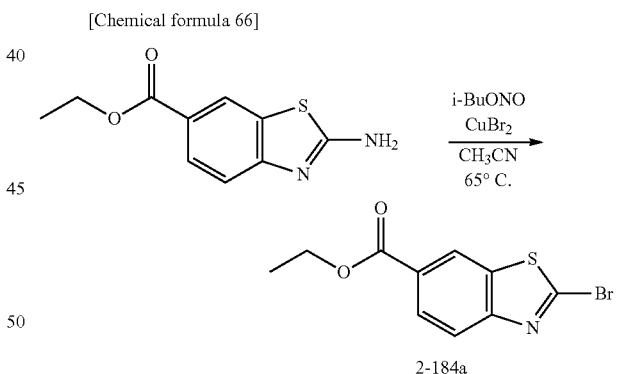

Synthesis of Compound (2-184-b)

To a THF (20 mL) solution of compound 2-184-a (0.631 g, 2.21 mmol) and compound 2-6-b (0.739 g, 2.00 mmol), Pd$_2$(dba)$_3$ (0.0464 g, 0.0507 mmol) and P(t-Bu)$_3$·HBF$_4$ (0.0290 g, 0.100 mmol) were added, and the mixture was stirred. To the mixture, a 3 N potassium phosphate aqueous solution (2.0 mL, 6.0 mmol) was further added, and the mixture was heated and stirred at 60° C. for 12 hours. To the reaction solution, methanol was added, and the precipitated solid was collected by filtration to obtain compound (2-184-b) (0.782 g, yield 87%).

[Chemical formula 67]

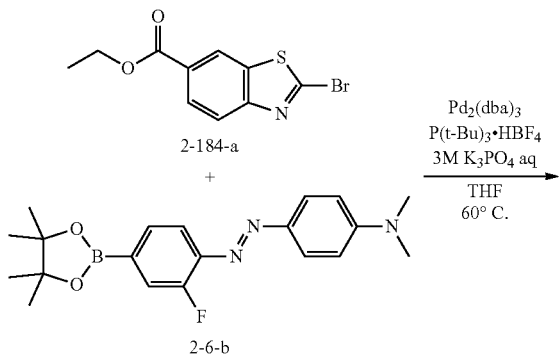

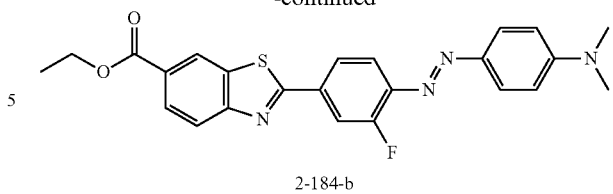

Synthesis of Compound (2-184)

A p-xylene (15 mL) solution of compound (2-184-b) (0.450 g, 1.00 mmol), TiO(acac)$_2$ (abbreviation of bis(2,4-pentanedionato) titanium (IV) oxide, 0.132 g, 0.504 mmol), and n-hexanol (0.512 g, 5.01 mmol) was heated and refluxed for four hours. To the reaction solution, methanol was added, and the precipitated solid was collected by filtration and purified by silica gel column chromatography using chloroform as an eluent to obtain compound (2-184) (0.366 g, yield 72%).

$^1$H-NMR (400 MHz, CDCl$_3$): δ (ppm)=8.65 (d, 1H), 8.19 (dd, 1H), 8.11 (d, 1H), 8.02 (dd, 1H), 7.97-7.91 (m, 3H), 7.88 (dd, 1H), 6.79-6.75 (m, 2H), 4.38 (t, 2H), 3.13 (s, 6H), 1.82 (tt, 2H), 1.52-1.45 (m, 2H), 1.40-1.34 (m, 4H), 0.92 (t, 3H).

UV visible light spectrum: λmax=482 nm (in acetonitrile)

[Chemical formula 68]

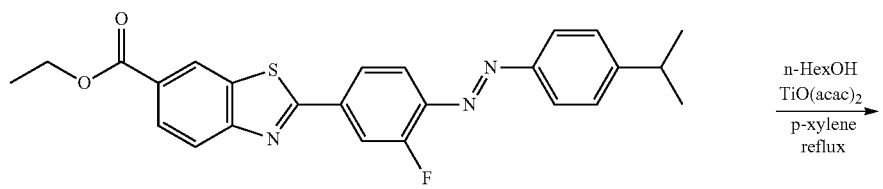

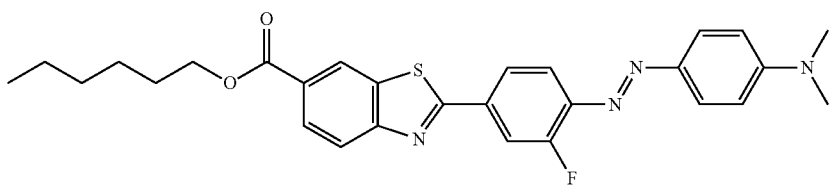

Example 11: Preparation of Composition Containing Compound (2-3)

The following components were mixed and stirred at 80° C. for one hour to obtain composition E1.
Polymerizable liquid crystal compound (A-6) 75 parts by mass
Polymerizable liquid crystal compound (A-7) 25 parts by mass
Compound (2-3) 4.0 parts by mass
Polymerization initiator: 2-dimethylamino-2-benzyl-1-(4-morpholinophenyl) butan-1-one (IRGACURE 369); manufactured by BASF Japan Ltd.)
6 parts by mass
Leveling agent: polyacrylate compound (BYK-361N; manufactured by BYK-Chemie)
1.2 parts by mass
Solvent: o-xylene 250 parts by mass
Polymerizable liquid crystal compound (A-6)

[Chemical formula 69]

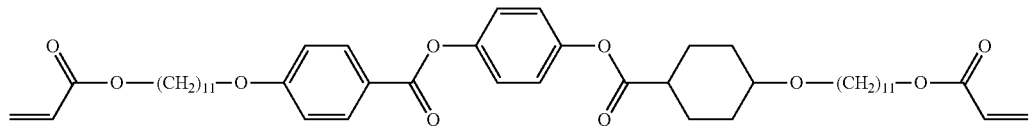

Polymerizable liquid crystal compound (A-7)

[Chemical formula 70]

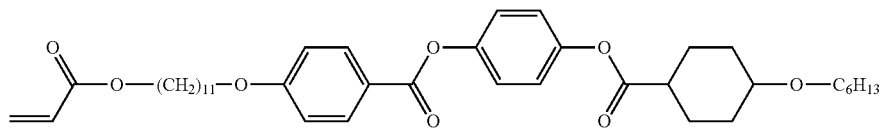

Note that polymerizable liquid crystal compound (A-6) was synthesized by a method described in Lub et al. Recl. Tray. Chim. Pays-Bas, 115, 321-328 (1996). In addition, polymerizable liquid crystal compound (A-7) was produced in accordance with this method.

Example 2: Preparation of Composition Containing Compound (2-106)

Composition E2 was obtained in a similar manner to Example 1 except that compound (2-106) was used instead of compound (2-3).

Example 3: Preparation of Composition Containing Compound (2-4)

Composition E3 was obtained in a similar manner to Example 1 except that compound (2-4) was used instead of compound (2-3).

Example 4: Preparation of Composition Containing Compound (2-6)

Composition E4 was obtained in a similar manner to Example 1 except that compound (2-6) was used instead of compound (2-3).

Example 5: Preparation of Composition Containing Compound (2-116)

Composition E5 was obtained in a similar manner to Example 1 except that compound (2-116) was used instead of compound (2-3).

Example 6: Preparation of Composition Containing Compound (2-166)

Composition E6 was obtained in a similar manner to Example 1 except that compound (2-166) was used instead of compound (2-3).

Example 7: Preparation of Composition Containing Compound (2-167)

Composition E7 was obtained in a similar manner to Example 1 except that compound (2-167) was used instead of compound (2-3).

Example 8: Preparation of Composition Containing Compound (2-184)

Composition E8 was obtained in a similar manner to Example 1 except that compound (2-184) was used instead of compound (2-3).

Comparative Example 1: Preparation of Composition Containing Compound (2-1)

Composition C1 was obtained in a similar manner to Example 1 except that compound (2-1) was used instead of compound (2-3).

Comparative Example 2: Preparation of Composition Containing Compound (3)

Composition C2 was obtained in a similar manner to Example 1 except that compound (3) was used instead of compound (2-3).

<Production of Polarizing Plate>

1. Formation of Orientation Film

A glass substrate was used as a transparent substrate. A 2% by mass polyvinyl alcohol (polyvinyl alcohol 1000 completely saponified type manufactured by Wako Pure Chemical Industries, Ltd.) aqueous solution (composition for forming an orientation layer) was applied onto the glass substrate by a spin coating method, and dried to form a film having a thickness of 100 nm. Subsequently, a surface of the obtained film was subjected to a rubbing treatment to form an orientation film, thus obtaining laminate 1 in which the orientation film was formed on the glass substrate.

2. Formation of Polarizing Film

The composition obtained above was applied onto the orientation film of laminate 1 obtained above by a spin coating method, heated and dried on a hot plate at 120° C. for three minutes, and then rapidly cooled to 70° C. (temperature at which a smectic liquid crystal phase is exhibited at the time of temperature drop) or lower to obtain laminate 2 having a first dry film formed on the orientation film.

Subsequently, using a UV irradiation device (SPOT CURE SP-7; manufactured by USHIO Inc.), the polarizing film was irradiated with an ultraviolet ray at an exposure amount of 2400 mJ/cm$^2$ (365 nm standard) to polymerize a polymerizable liquid crystal compound contained in the first dried film while the liquid crystal state of the composition was maintained to form a polarizing film from the first dried film, thus obtaining a polarizing plate as laminate 3.

<Evaluation>

For laminate 2 with the polarizing film formed on the orientation film of laminate 1, a dichroic ratio was measured as follows. Absorbance (A1) of the polarizing film of laminate 2 at a maximum absorption wavelength (λmax) in a transmission axis direction and absorbance (A2) of the polarizing film of laminate 2 at a maximum absorption wavelength (λmax) in an absorption axis direction were measured by a double beam method using a device in which a folder including laminate 1 was set in a spectrophotometer (UV-3150 manufactured by Shimadzu Corporation). In the folder, a mesh for cutting the amount of light by 50% was disposed on a reference side. From the measured values of absorbance (A1) in the transmission axis direction and absorbance (A2) in the absorption axis direction, a ratio (A2/A1) was calculated and taken as a dichroic ratio before UV exposure (DR1).

For laminate after UV exposure, absorbance of the polarizing film of laminate 3 at a maximum absorption wavelength (λmax) in a transmission axis direction and absorbance of the polarizing film of laminate 3 at a maximum absorption wavelength (λmax) in an absorption axis direction were measured in a similar manner to the above, and a dichroic ratio after UV exposure (DR2) was calculated. The dichroic ratio after UV exposure (DR2) was divided by the dichroic ratio before UV exposure (DR1) to calculate a dichroic ratio retention ratio (DR2/DR1; %). The results were summarized in Table 1. When the dichroic ratio retention ratio of laminate 3 exceeds 50%, the laminate 3 is regarded as a favorable polarizing plate.

TABLE 1

| | Compound | λmax (nm) of polarizing film of laminate 2 | λmax (nm) of polarizing film of laminate 3 | Dichroic ratio before UV exposure (DR1) | Dichroic ratio after UV exposure (DR2) | Dichroic ratio retention ratio (DR2/DR1; %) |
|---|---|---|---|---|---|---|
| Example 1 | 2-3 | 474 | 483 | 30.8 | 19.9 | 65 |
| Example 2 | 2-106 | 475 | 482 | 28.9 | 18.7 | 65 |
| Example 3 | 2-4 | 472 | 481 | 43.0 | 37.0 | 86 |
| Example 4 | 2-6 | 482 | 490 | 24.0 | 23.0 | 96 |
| Example 5 | 2-116 | 535 | 535 | 33.7 | 27.6 | 82 |
| Example 6 | 2-166 | 507 | 514 | 35.0 | 23.8 | 68 |
| Example 7 | 2-167 | 506 | 514 | 57.3 | 46.4 | 81 |
| Example 8 | 2-184 | 520 | 528 | 49.8 | 42.4 | 85 |
| Comparative Example 1 | 2-1 | 468 | 474 | 42.7 | 21.1 | 49 |
| Comparative Example 2 | 3 | 466 | 473 | 39.6 | 14.9 | 38 |

Table 1 indicates that a polarizing plate including a polarizing film formed from a composition containing a compound represented by formula (1) and having a maximum absorption wavelength in a wavelength range of 420 nm or more and 520 nm or less and at least one of a polymerizable liquid crystal compound and a liquid crystalline polymer compound has an excellent dichroic ratio retention ratio before and after UV irradiation when UV irradiation is included in a process for producing the polarizing plate.

The invention claimed is:

1. A composition comprising: a compound represented by the following formula (1) and having a maximum absorption wavelength in a range of 420 nm or more and 520 nm or less; and at least one of a polymerizable liquid crystal compound and a liquid crystalline polymer compound:

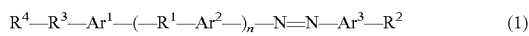  (1)

wherein n is an integer of 1 or 2;

Ar$^1$, Ar$^2$, and Ar$^3$ each independently represent a 1,4-phenylene group optionally having a substituent or a divalent sulfur-containing aromatic heterocyclic group optionally having a substituent, and at least one of Ar$^1$ and Ar$^2$ has 1 or 2 fluorine atoms as a substituent;

wherein if Ar$^2$ represents a 1,4-phenylene group optionally having a substituent, R$^1$ represents a single bond or at least one group selected from the group consisting of —OC(=O)—, —C(=O)O—, —CH=CH—, —CH=N—, —N=N—, and —N=CH—;

wherein if Ar$^2$ represents a divalent sulfur containing aromatic heterocyclic group optionally having a substituent, R$^1$ represents a single bond or at least one group selected from the group consisting of —OC(=O)—, —C(=O)O—, —CH=CH—, —CH=N—, and —N=CH—;

R$^2$ represents an alkylamino group optionally having a polymerizable group or an alkoxy group optionally having a polymerizable group;

wherein if R$^2$ represents an alkoxy group optionally having a polymerizable group, at least one of Ar$^1$, Ar$^2$ and Ar$^3$ represents a divalent sulfur-containing aromatic heterocyclic group optionally having a substituent;

R$^3$ represents at least one group selected from the group consisting of an alkanediyl group having 4 to 20 carbon atoms, an alkanediyloxy group having 2 to 20 carbon atoms, an alkanediyloxycarbonyl group having 2 to 20 carbon atoms, and an alkanediylcarbonyloxy group having 2 to 20 carbon atoms;

R$^4$ represents a polymerizable group or a hydrogen atom; and when n is 2, two R$^1$s may be the same as or different from each other, and two Ar$^2$s may be the same as or different from each other.

2. The composition according to claim 1, wherein the at least one polymerizable liquid crystal compound and the liquid crystalline polymer compound are a polymerizable smectic liquid crystal compound and a smectic liquid crystalline polymer compound, respectively.

3. The composition according to claim 1, wherein the at least one polymerizable liquid crystal compound is a compound represented by the following formula (A):

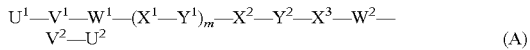  (A)

wherein m is an integer of 1 to 3;

X$^1$, X$^2$, and X$^3$ each independently represent a divalent aromatic group or a divalent alicyclic hydrocarbon group; when m is 2 or 3, a plurality of X's may be the same as or different from each other; at least three selected from the group consisting of X$^1$, X$^2$, and X$^3$ each represent a divalent hydrocarbon six-membered ring group;

Y$^1$, Y$^2$, W$^1$, and W$^2$ each independently represent a single bond or a divalent linking group;

when m is 2 or 3, a plurality of Y's may be the same as or different from each other;

V$^1$ and V$^2$ each independently represent an alkanediyl group having 1 to 20 carbon atoms and optionally having a substituent; at least one of —CH$_2$-s constituting the alkanediyl group may be substituted with —O—, —CO—, —S—, or —NH—; and U$^1$ and U$^2$ each independently represent a polymerizable group or a hydrogen atom, and at least one of U$^1$ and U$^2$ represents a polymerizable group.

4. The composition according to claim 1, wherein n is 1 in the formula (1).

5. The composition according to claim 1, wherein the polymerizable group is a radically polymerizable group.

6. A film comprising the composition according to claim 1 as a forming material.

7. A laminate comprising the film according to claim 6.

8. A display device comprising the laminate according to claim 7.

* * * * *